(12) United States Patent
Hosseini et al.

(10) Patent No.: US 12,546,771 B2
(45) Date of Patent: Feb. 10, 2026

(54) ELECTROCHEMICAL SENSORS AND METHODS OF USE THEREOF

(71) Applicant: DIGITAL SENSING LIMITED, Auckland (NZ)

(72) Inventors: Ali Hosseini, Auckland (NZ); Ashton Partridge, Auckland (NZ)

(73) Assignee: DIGITAL SENSING LIMITED, Auckland (NZ)

( * ) Notice: Subject to any disclaimer, the term of this patent is extended or adjusted under 35 U.S.C. 154(b) by 56 days.

(21) Appl. No.: 16/467,407

(22) PCT Filed: Dec. 11, 2017

(86) PCT No.: PCT/NZ2017/050161
§ 371 (c)(1),
(2) Date: Jun. 6, 2019

(87) PCT Pub. No.: WO2018/106129
PCT Pub. Date: Jun. 14, 2018

(65) Prior Publication Data
US 2020/0072825 A1    Mar. 5, 2020

Related U.S. Application Data

(60) Provisional application No. 62/511,558, filed on May 26, 2017, provisional application No. 62/432,356, filed on Dec. 9, 2016.

(51) Int. Cl.
*G01N 33/543* (2006.01)
*C12Q 1/00* (2006.01)
*G01N 27/327* (2006.01)

(52) U.S. Cl.
CPC ....... *G01N 33/54333* (2013.01); *C12Q 1/005* (2013.01); *G01N 27/3277* (2013.01); *G01N 33/5438* (2013.01); *C12Q 2565/607* (2013.01)

(58) Field of Classification Search
CPC ......... G01N 33/54333; G01N 27/3277; G01N 33/5438; C12Q 1/005; C12Q 2565/607
See application file for complete search history.

(56) References Cited

U.S. PATENT DOCUMENTS

| | | | |
|---|---|---|---|
| 5,118,403 | A | 6/1992 | Magee et al. |
| 5,512,489 | A | 4/1996 | Girault et al. |

(Continued)

FOREIGN PATENT DOCUMENTS

| | | |
|---|---|---|
| DE | 44 22 049 A1 | 1/1996 |
| JP | 2003-302403 | 10/2003 |

(Continued)

OTHER PUBLICATIONS

V. N. Goral, et al., Electrochemical microfluidic biosensor for the detection of nucleic acid sequences, Lab Chip, vol. 6, pp. 414-421 (2006) (Year: 2006).*

(Continued)

*Primary Examiner* — C. Sun
(74) *Attorney, Agent, or Firm* — Foley & Lardner LLP

(57) ABSTRACT

A sensor includes: a support substrate; at least one surface structure protruding from an upper surface of the support substrate, wherein the surface structure includes an electrode layer; a sensing surface on the electrode layer, wherein the sensing surface is adapted to contact a sample containing a target analyte; a binding region on the support substrate, wherein the binding region is separated from the sensing surface; wherein, in use, a binding agent attached to a binding layer at the binding region is also adapted to contact the sample containing the target analyte.

34 Claims, 26 Drawing Sheets

(56) References Cited

U.S. PATENT DOCUMENTS

| | | | |
|---|---|---|---|
| 5,567,301 | A | 10/1996 | Stetter et al. |
| 2006/0057023 | A1 | 3/2006 | Thompson et al. |
| 2008/0160630 | A1* | 7/2008 | Liu .............. G01N 21/76 436/164 |
| 2009/0084686 | A1 | 4/2009 | Yun et al. |
| 2010/0129812 | A1 | 5/2010 | Yoo |
| 2010/0234237 | A1* | 9/2010 | Yoo .............. C12Q 1/686 506/7 |

FOREIGN PATENT DOCUMENTS

| | | | |
|---|---|---|---|
| JP | 2007-057540 | | 3/2007 |
| JP | 2008-539419 | | 11/2008 |
| JP | 2009-543090 | | 12/2009 |
| JP | 2013-500492 | | 1/2013 |
| JP | 2013-142663 | | 7/2013 |
| JP | 2014-530366 | | 11/2014 |
| JP | 2016-106229 | | 6/2016 |
| WO | WO-00/47983 | A1 | 8/2000 |
| WO | WO-2011/129710 | A1 | 10/2011 |
| WO | WO-2013/055234 | A1 | 4/2013 |
| WO | WO-2016131574 | A1 * | 8/2016 .......... B01L 3/502761 |
| WO | WO-2018/106128 | A1 | 6/2018 |

OTHER PUBLICATIONS

V.N. Goral, Electrochemical microfluidic biosensor for the detection of nucleic acid sequences, Lab on a Chip, 2006(6), p. 414-21. (Year: 2006).*

R. B. van Varseveld, Accurate Position Control of a Pneumatic Actuator Using On/Off Solenoid Valves, IEEE/ASME Transactions on Mechatronics, 2(3), Sep. 1997, p. 195-204. (Year: 1997).*

99 Compartment Definition & Meaning—Merriam-Webster (Year: 2023).*

M. Hervas, et. al. Integrated electrokinetic magnetic bead-based electrochemical immunoassay on microfluidic chips for reliable control of permitted levels of zearalenone in infant foods, Analyst, 2011, 136, p. 2131-38. (Year: 2011).*

First Office Action issued in Chinese Application No. 201780074979.9 dated May 28, 2021.

Yanna, Ban. "Application of Horseradish Peroxidase and Immunomagnetic Beads in the Detection of Tumor Markers" Medical Science and Technology Series of Full-text Database of Chinese Excellent Masters Degree Thesis, Jan. 2013, pp. 7-39 (Year: 2013).

International Search Report and Written Opinion on International Application No. PCT/NZ2017/050161 dated Apr. 13, 2018. 16 pages.

Kling, Andre et al. "Multianalyte Antibiotic Detection on an Electrochemical Microfluidic Platform" American Chemical Society (Anal. Chem. 2016), vol. 88, pp. 10036-10043, Jul. 19, 2016 (Year: 2016).

Extended European Search Report in EP Patent Application No. 17877752.0 dated Jul. 20, 2020 (9 pages).

Reasons for Rejection for JP 2019-530163 dated Oct. 25, 2021 (14 pages).

Goral V.N. et al., "Electrochemical microfluidic biosensor for the detection of nucleic acid sequences", The Royal Society of Chemistry, Lab Chip, 6(3), Jan. 24, 2006, pp. 414-421.

* cited by examiner

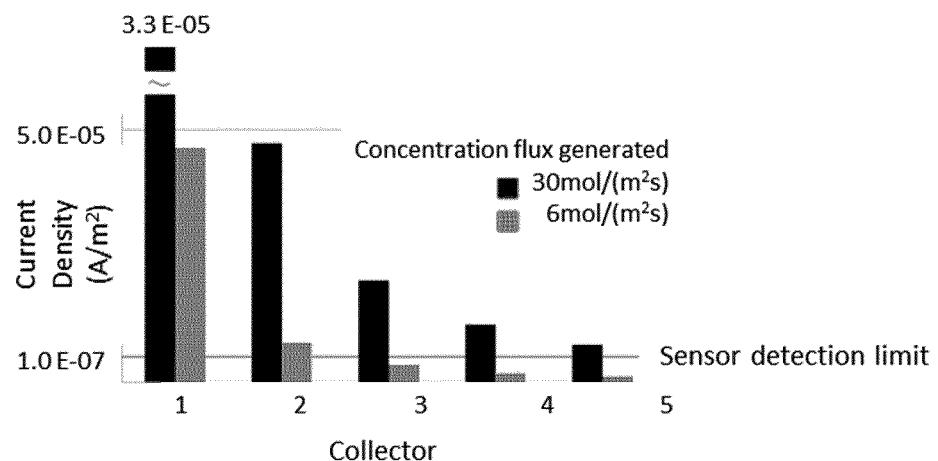
Fig. 14C
Figure 15
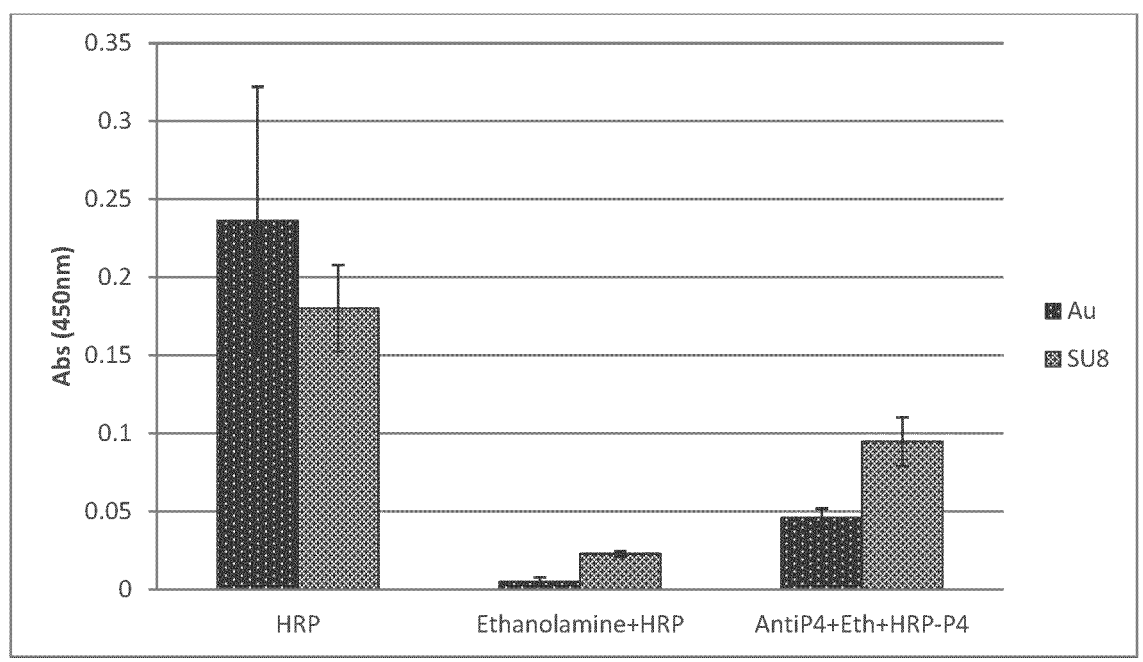

A

B

A. Fluidic Layout for a Competitive Assay

B. Fluidic Layout for a Displacement Assay

ELECTROCHEMICAL SENSORS AND METHODS OF USE THEREOF

CROSS-REFERENCE TO RELATED APPLICATIONS

This application is a U.S. national stage application under 35 U.S.C. § 371 of International Application No. PCT/NZ2017/050161, filed Dec. 11, 2017 with the same title, and published as WO 2018/106129, which in turn claims priority to U.S. Patent Application No. 62/511,558 filed May 26, 2017, and U.S. Patent Application No. 62/432,356 filed Dec. 9, 2016, the contents of all of which are incorporated herein by reference in their entireties for any and all purposes.

FIELD OF INVENTION

The invention relates to sensors for the detection of target analytes in a solution. More particularly, the invention relates to electrochemical sensors that detect binding of a target analyte to a capture agent on an array.

BACKGROUND

Many medical, biological and biotechnological applications would benefit from more accurate and reproducible measurement of biological or biochemical processes. However, converting information about a biological event to a detectable electronic signal is challenging due to the complexity of connecting an electronic device directly to a biochemical environment. Electrochemical sensors provide an attractive means to achieve quantitative analysis of the content of a sample due to the direct transduction of a biochemical event to an electronic signal.

Electrochemical sensors are designed to be highly target-specific so as to be able to detect the presence (and preferably the concentration) of the target analyte (TA) in a sample. Electrochemical sensors generally involve using a target-specific binding agent which is immobilised on a sensor substrate. Binding agents may include enzymes, nucleic acids, antibodies, whole cells or receptors.

Although there are many diagnostic sensors in use, they are generally limited to high cost pieces of equipment in a lab environment for operation by skilled operators. In many cases the main limitation in realizing point-of-care testing/sensing devices is the ability to miniaturize the transduction principle and the lack of a cost-effective production method (Grieshaber et al., 2008). The use of cheap, handheld devices for use by the patient or medical professional in the field is limited.

Electrochemical sensing relies on the target analyte (TA) interacting with the sensor surface and influencing/disrupting a measurable property of the electronic pathway. A common approach is depicted in FIG. 1 in which a gold electrode is overlaid with a mixed self-assembled monolayer (SAM). The binding agent (X) is attached to the electrode surface via a self-assembled monolayer (SAM)(FIGS. 1A and 1B). A TA/TA-horseradish peroxidase (HRP) mixture is exposed to the binding agent and competitively binds to the binding agent (FIG. 1C) in a ratio dependant on the concentration of each component. TMB (3,3',5,5'-Tetramethylbenzidine) is added (FIG. 1D) and oxidised by HRP. This results in the subsequent reduction of the TMB on the gold electrodes. Since the reduction of TMB can be measured galvanostatically (i.e. via current across electrodes), this provides a measurement of the concentration of the TA in the sample. HRP and TMB are commonly used in Elisa assays in which the chromogenic (colour producing) TMB is measured optically as opposed to galvanostatically.

Calibration of assays for the detection of target analytes in samples can be complex and prone to inaccuracies due to multiple factors including sample handling, dilution errors and/or interference by the sample matrix (e.g. milk, blood or seawater). In existing assays, considerable effort goes into minimising the impacts of these factors by a skilled technician to ensure that the observed response is accurate, and the comparison against the standards is a true reflection of concentration.

It is an object of the invention to provide an electrochemical sensor and a method of detecting a target analyte that overcomes or ameliorates at least one of the disadvantages of the prior art. Alternatively, it is an object of the invention to provide the public with a useful choice.

SUMMARY OF THE INVENTION

In a first aspect, the invention provides a sensor comprising:
 a. a support substrate;
 b. at least one surface structure protruding from an upper surface of the support substrate, wherein the surface structure includes an electrode layer;
 c. a sensing surface on the electrode layer, wherein the sensing surface is adapted to contact a sample containing a target analyte;
 d. a binding region on the support substrate, wherein the binding region is separated from the sensing surface;
wherein, in use, a binding agent attached to the binding layer at the binding region is also adapted to contact the sample containing the target analyte.

In one embodiment, the binding layer at the binding region is a planar layer attached to the support substrate.

Preferably the sensor is adapted to detect a detectable response at the sensing surface following binding of the target analyte to a binding agent attached to the binding layer.

Preferably the separation distance between the binding region and the sensing surface is between about 1 nm and 50 mm, and/or the surface structures are separated from each other by about 50 nm to about 2000 µm, and/or the width of the surface structure where it joins the support substrate is between about 20 nm to about 5000 µm, and/or the width of the apex of each surface structure is preferably between about 1 nm to about 5000 micron.

In another aspect, the invention provides a sensor comprising:
 a. a support substrate;
 b. at least one surface structure protruding from an upper surface of the support substrate, wherein the surface structure includes an electrode layer;
 c. a sensing surface on the electrode layer, wherein the sensing surface is adapted to contact a sample containing a target analyte;
 d. a binding region on the support substrate, wherein the binding region is separated from the sensing surface;
wherein, in use, a binding agent attached to the binding layer at the binding region is also adapted to contact the sample containing the target analyte; and wherein the sensor is adapted to detect a detectable response at the sensing surface following binding of the target analyte to a binding agent attached to the binding layer.

In another embodiment, attachment of the binding agent to the binding region is electrostatic, covalent or via a magnetic bead to which the binding agent has been attached.

In another embodiment, the binding layer at the binding region is a functional surface on a magnetic particle wherein the magnetic particle is attached to the support substrate by a magnetic field.

Preferably the sensor includes a magnetic element and the binding layer at the binding region is a functional surface on a magnetic particle wherein the magnetic particle is attached to the support substrate by a magnetic field created by the magnetic element.

In another embodiment the invention provides a method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach at least one binding agent either electrostatically, covalently or magnetically;
wherein the sensing surface is separated from the binding region by a separation distance sufficient, in use, for a detectable response to be detected at the sensing surface following binding of a target analyte to the binding agent.

Preferably the separation distance between the binding region and the sensing surface is between about 1 nm and 50 mm, and/or the surface structures are separated from each other by about 50 nm to about 2000 µm, and/or the width of the surface structure where it joins the support substrate is between about 20 nm to about 5000 µm, and/or the width of the apex of each surface structure is preferably between about 1 nm to about 5000 micron.

Preferably the detectable response comprises an electrochemical detectable response comprising a change in current, voltage, capacitance, resistance, conductance, impedance, magnetic flux or electric field. Preferably the binding of a target analyte to a binding agent results in an electroactive species which mediates the detectable response at the sensing surface. Preferably the binding of a labelled target analyte to a binding agent competes with, displaces, or is displaced by, the binding of an unlabelled target analyte leading to generation of an electroactive species that mediates the detectable response at the sensing surface.

Preferably the support substrate comprises a polymer, silicon or glass. Preferably the support substrate comprises a single layer or multiple layers.

Preferably the at least one surface structure is integral with the support substrate.

Preferably the electrode layer is deposited on an upper surface of the surface structure(s).

Preferably the electrode layer comprises a layer of substantially constant thickness. Preferably the electrode layer covers the surface structure(s) and optionally the support substrate.

Preferably the thickness of the electrode layer is between about 1 nm and 500 nm thick, more preferably between about 40 and 500 nm or between about 50 and 100 nm thick. More preferably between about 5 nm and 30 nm thick, between 50 and 100 nm, between 70 and 400 nm, between 900 and 300 nm.

Preferably the electrode layers on the upper surface of two or more surface structures are electrically connected within the sensor. The electrical connection may be below the binding layer or inert layer Preferably the sensing surface is on an upper surface of the electrode layer.

Preferably the sensing surface is on an upper surface of an electrode layer on a surface structure protruding from the support substrate.

Preferably the surface structure comprises a sensing surface defined by the extent of the exposed electrode layer on the support substrate. Preferably the sensing surface is bounded by an inert layer on electrode layer. Preferably the inert layer exists between the surface structures. Preferably the sensing surface is separated from other sensing surfaces by an inert layer. Preferably a sensing surface on one electrode layer is electrically connected to at least one further sensing surface on the same electrode layer. Preferably the electrical connection to the at least one further sensing surface is under the inert layer.

Preferably the sensor comprises a plurality of surface structures each with a sensing surface on the electrode layer.

Preferably a plurality of sensing surfaces are electrically connected via the electrode layer to form a sensing group. In one embodiment, the sensor comprises two or more sensing groups where each sensing group is electrically isolated from other groups.

Preferably the sensing surface is not electrochemically passivated from interacting with an electroactive species. Electrochemical passivation or attenuation of the detectable response may be caused by the binding agent(s), the binding region or a matrix effect induced by the sample.

Preferably the sensing surface comprises a protective coating. Preferably the protective coating comprises a SAM or a protein.

Preferably the protective coating is removable.

Preferably the surface structure(s) protrudes through the inert layer. Preferably the surface structure(s) protrude from the support substrate.

Preferably the surface structure(s) comprises an apex at the top of the surface structure. In some embodiments, the apex is of a surface structure that has an upper portion with a contoured surface and at least one lower portion with a differently contoured surface. In some embodiments, the surface structure or the upper portion thereof is dome-shaped, cone-shaped, pyramid-shaped, papilliform, a ridge or polyhedron-shaped.

Preferably, the ridge has a convex, papilliform, tapered, triangular or polygonal profile along a cross-section along an axis generally parallel to a top surface of the support substrate.

It will be appreciated by those of skill in the art that any surface structure with an apex is likely to be flat when viewed at very high magnification (e.g. atomic or nano-scale). Accordingly, the shapes and measurements provided herein are intended to refer to the overall shape of the surfaces structure rather being precise geometric descriptions.

Preferably the surface structure comprises an upper portion with a convex upper surface. Preferably the surface of the upper portion is tapered to an apex or rounded to an apex.

Preferably a cross-section of the surface structure along a plane orthogonal to a top surface of the support substrate is a triangle, a convex semi-circle or papilliform.

Preferably a cross-section of the surface structure along a plane parallel to a top surface of the support substrate is substantially triangular, substantially circular or substantially square.

Preferably a cross-sectional area of the surface structure diminishes along an axis that is orthogonal to a top surface of the support substrate.

In one embodiment, the surface structures are uniformly arranged on the support substrate. In one embodiment, the surface structures are randomly arranged on the support substrate.

Preferably the surface structures comprise a smooth surface. Preferably the surface structures are regular shapes. Preferably the surface structures have at least one line of symmetry, and preferably 2 lines of symmetry. Preferably all or a plurality of surface structures are substantially identical in shape. Preferably all or a plurality of surface structures are substantially identical in surface area.

In one embodiment, the binding layer is deposited as a planar layer on an upper surface of the inert layer or support substrate. Preferably the binding layer is adjacent to the electrode layer, optionally with an isolating material or gap between the binding layer and the electrode layer.

Preferably the extent of the binding layer defines an aperture through which the sensing surface is exposed to the sample.

Preferably the binding layer is deposited around the surface structures such that an upper portion of the surface structure protrudes with an exposed sensing surface thereon.

Preferably the binding layer comprises a planar surface through which the at least one surface structures protrude.

Preferably the binding layer comprises a material which binds to a binding agent. Preferably the material has molecular functionality suitable to bind a binding agent such as an antibody. Preferably the binding layer adheres to the top surface of the support substrate. Preferably the binding layer is electrically conductive. Preferably the binding layer is electrically connected to an electrode (or adapted for electrical connection) such as a measurement electrode capable of applying a potential.

Preferably the binding agent comprises an aptamer or antibody specific for a particular target analyte. Preferably the binding agent is selected from the group consisting of antigens, antibodies, antibody fragments, single-chain variable fragments, biotinylated proteins, peptides, nucleic acids (e.g. DNA, ssDNA, mRNA, miRNA, aptamers), avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST), metals and metal salts (such as lead, lead phosphate, chromium, platinum, palladium, iridium, copper etc).

Preferably the binding layer comprises a protective coating (a coating that has negligible binding by the matrix, and renders the recognition portion of the binding agent available for binding).

Where the binding layer is on the surface of an inert layer preferably the binding layer comprises a cross-linked polymer, a photo-resist or a self-assembled mono-layer (SAM). Preferably the cross-linked polymer is a photoresist such as SU-8, AZ40XT, Shipley 3612, polyimide. Preferably the binding layer is deposited by spin-coating, spray-coating, dip-coating, wiping or painting. Preferably the binding layer is deposited on the support substrate by spin coating.

In embodiments where magnetic particles are used as the binding layer, the binding region comprises a region of the support substrate adapted to attach one or more magnetic particles.

Preferably the binding region has at least one magnetic element on, in, or under the support substrate. This magnetic element attracts the magnetic particles to attach them to the binding region.

Preferably the binding region is separated from the sensing surface by a separation distance wherein the separation distance is sufficient for the detectable response to be detected at the sensing surface.

Preferably the separation distance is such that detection of the detectable response at the sensing surface can be made without being attenuated by the binding layer or binding agent(s).

Preferably the separation distance is between about 1 nm and 50 mm. In particular embodiments, the separation distance is between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

Preferably the particles are attached directly to an upper surface of the support substrate.

Preferably the particles are attached to an inert surface on the support substrate.

Preferably the magnetic particles are separated from the sensing surface by a separation distance as defined above.

Preferably the sensing surface and binding region are housed within a microfluidic system.

Preferably the sensing surface and the binding region are in separate compartments of the microfluidic system.

Preferably the binding region is inert to the components of the sample applied to the sensor.

Preferably the binding region is defined by an area of magnetic field established by a magnetic element on, in or under the support substrate.

In one embodiment, the binding layer comprises a functional surface on one or more magnetic particles attached to the support substrate. Preferably the particles are ferromagnetic or paramagnetic particles.

Preferably the attachment of the magnetic particles to the support substrate is by way of magnetic attraction between a magnetic element and the magnetic particles.

Preferably the sensing surface protrudes above the particles such that, in use, the surface structure is exposed to the sample. Preferably the sensing surface protrudes through a layer of particles such that, in use, the surface structure is exposed to the sample.

Preferably the particles are attached to a surface around the surface structures such that an upper portion of the surface structure protrudes with an exposed sensing surface thereon.

Preferably the particles are attached to a surface around the surface structures and cover the surface structure(s) itself. Preferably the magnetic element comprises an element which produces a magnetic field. Preferably the element comprises an electromagnet or a ferromagnet. Preferably the magnetic element is fixed to the sensor or it is removable.

Preferably the magnetic element is positioned so as to attach the particles around the surface structures such that an upper portion of the surface structure protrudes through the particles with an exposed sensing surface thereon.

Preferably the magnetic element is positioned so as to attach the particles adjacent to the electrode layer, optionally with an isolating material or gap between the particles and the electrode layer.

Preferably the magnetic element is positioned so as to attach the particles to the binding region which is separated from the sensing surface.

Preferably the functional surface on the particle comprises a functional material which binds to a binding agent. Preferably the functional material has molecular functionality suitable to bind a binding agent such as an antibody.

Preferably the magnetic particle comprises a functional surface comprising a carboxylate, aminated, biotinylated, or protein A or G coating. Preferably carboxylated Preferably the binding layer comprises a protective coating to eliminate non-specific binding.

Preferably a portion of the binding layer is blocked with a blocking agent. Preferably the blocking agent is ethanolamine or a surfactant (e.g. tween), Proteins, OVA, BSA, phosphates Preferably the binding agent adapted for attachment to the particle comprises an antigen or antibody specific for a particular target analyte. Preferably the binding agent is selected from the group consisting of antigens, antibodies, aptamers, antibody fragments, single-chain variable fragments, biotinylated proteins, peptides, nucleic acids, avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST), metals and metal salts (such as lead, lead phosphate, chromium, platinum, palladium, iridium, copper etc).

In one embodiment, the sensor comprises two or more sensing groups adapted to detect a response from binding of the target analyte to a binding agent.

In a further embodiment, the sensor comprises a measurement electrode electrically connected to one or more sensing surfaces or sensing groups via the electrode layer.

Preferably the measurement electrode is connected to a measuring means which measures a change in one or more of current, impedance, voltage, capacitance, resistance, conductance, magnetic flux or electric field.

Preferably the sensor comprises part of a sensor system comprising a sample container adapted to retain the sample on the sensor surface. Preferably the sensor system further comprises a reference electrode.

Preferably the sensor system further comprises a counter electrode. Preferably the counter electrode and the reference electrode contact the sample during detection of the detectable response.

In one embodiment, the sensor is adapted for deployment in a no-flow environment. In another embodiment, the sensor is adapted for deployment in a flow environment.

Preferably the sensor has a single magnetic binding region and single sensing surface.

Preferably the sensor has multiple binding regions to multiple sensing surfaces, multiple binding regions to a single sensing surface.

In a further embodiment, the binding layer or the binding region is adjacent to a first sensing surface on a first electrode layer; and
wherein the first sensing surface is adjacent to a second sensing surface on a second electrode layer; and
wherein a first separation distance of the first sensing surface from the binding layer or the binding region is less than a second separation distance of the second sensing surface from the binding layer or the binding region; and
wherein the first and second electrode layers are electrically isolated from one another.

Preferably the sensor is adapted to detect a detectable response at the first and the second sensing surfaces following binding of a target analyte to a binding agent.

Preferably the binding region adjacent to the first sensing surface is defined by an area of magnetic field established by a magnetic element on, in or under the support substrate.

Preferably the sensor further comprises a third, fourth, fifth or further sensing surface respectively situated on a third, fourth, fifth or further electrode layer, wherein each electrode layer is electrically isolated from one another;
wherein the separation distance between the binding layer or the binding region and the respective sensing surface progressively increases as the number of electrode layers increases.

Preferably the sensor is adapted to detect a detectable response at at least the first and the second sensing surfaces following binding of a target analyte to a binding agent.

In one embodiment, the first separation distance (between the sensor surface and the binding region) is between about 1 nm and 5 mm, and the second separation distance is between about 1 nm and about 5 mm. In particular embodiments, the separation distance is between about 30 nm and 1 mm, between about 100 nm and 500 µm, between about 1 µm and 200 µm or between about 20 µm and 100 µm. The separation distance may be between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

In one embodiment, a first inter-sensing surface distance between the first sensing surface and the second sensing surface is between about 30 nm and 1 mm. Subsequent inter-sensing surface distances between adjacent sensing surfaces (each connected to a discrete electrode layer) are preferably between about 30 nm and 1 mm.

In particular embodiments, the sensor comprises two or more discrete electrode layers each connected to a measurement electrode. Preferably the sensor comprises between 5 and 8 electrode layers.

In one embodiment, the electrode layers are electrically isolated from the binding region or at least one other electrode layer with an isolating material or gap.

In one embodiment of the first aspect, the invention provides a sensor comprising:
  a. a support substrate;
  b. a plurality of surface structures integral with the support substrate and protruding from an upper surface of the support substrate, wherein each surface structure comprises an electrode layer on an upper surface of the surface structure;
  c. a sensing surface on the electrode layer, wherein the sensing surface is adapted to contact a sample;
  e. a binding region on the support substrate, wherein the binding region is separated from the sensing surface;
  f. a magnetic element on, in or under the support substrate which, in use, attaches to the support substrate, wherein the magnetic particle comprises binding agents attached to a functional surface on the particle, and wherein the binding agents are adapted to contact a sample and bind to a target analyte within the sample.

Preferably, the binding region is defined by an area of magnetic field established by the magnetic element.

Preferably the sensing surface is separated from the binding layer on the magnetic particles. Preferably the sensing surface is separated from the binding layers by a separation distance sufficient for a detectable response to be detected at the sensing surface following binding of the target analyte to a binding agent attached to the binding layer. Preferably the separation distance is between about 30 nm and 1 mm, between about 100 nm and 500 µm, between about 1 µm and 200 µm or between about 20 µm and 100 µm. The separation distance may be between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

Preferably the separation distance between the binding region and the sensing surface is between about 1 nm and 50 mm, and/or the surface structures are separated from each other by about 50 nm to about 2000 µm, and/or the width of the surface structure where it joins the support substrate is between about 20 nm to about 5000 µm, and/or the width of the apex of each surface structure is preferably between about 1 nm to about 5000 micron.

In a further aspect, the invention provides a sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact a sample containing a target analyte or an electroactive species;
d. a magnetic element positioning means adapted to position a magnetic element to establish a magnetic field to attach one or more magnetic particles to the support substrate.

Preferably the magnetic positioning means is a magnet. Preferably the magnet is a permanent magnet such as formed from neodymium iron boron, samarium cobalt, alnico, and ceramic or ferrite. Preferably the magnet is an electromagnet.

Preferably the magnet positioning means is positioned to capture the particles as a monolayer on the surface of the binding region.

The features, variations and embodiments described in relation to the first aspect sensor are applicable and intended to be read in combination with the above aspect of the invention.

In a second aspect, the invention provides a sensor comprising:
a. a support substrate, optionally with surface structure(s) formed on it;
b. an electrode layer deposited on the support substrate and optionally the surface structure(s);
c. a first sensing surface on a first electrode layer, and at least a second sensing surface on a second electrode layer, wherein the sensing surfaces are adapted to contact a sample;
d. a binding region on the support substrate and optionally the electrode layer, wherein the binding region is separated from the first and second sensing surfaces;
wherein, in use, a binding agent attached to a binding layer at the binding region contacts a sample containing a target analyte.

In an embodiment of the second aspect, the binding region is defined by an area of magnetic field established by a magnetic element on, in, or under the support substrate which, in use, attracts and attaches magnetic particles to the support substrate, wherein the magnetic particles include a binding layer adapted to contact a sample containing a target analyte.

Preferably the binding region has at least one magnetic element on, in, or under the support substrate. This magnetic element attracts the magnetic particles to attach them to the binding region.

Preferably the binding region is adjacent to the first sensing surface on a first electrode layer; and wherein the first sensing surface is adjacent to the second sensing surface on the second electrode layer; and
wherein a first separation distance of the first sensing surface from the binding region is less than a second separation distance of the second sensing surface from the binding region; and wherein the first and second electrode layers are electrically isolated from one another.

The features, variations and embodiments described in relation to the first aspect sensor are applicable and intended to be read in combination with the features of the second aspect.

In a third aspect, the invention provides a method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach a magnetic particle to the support substrate by positioning a magnetic element or a magnetic element positioning means on, in, or under the support substrate to facilitate the establishment of a magnetic field capable of attracting the magnetic particle;
e. optionally attaching a magnetic particle to the binding region;
f. optionally attaching a binding agent to a functional surface on a binding layer on the magnetic particle,
wherein the sensing surface is separated from the binding region by a separation distance sufficient, in use, for a detectable response to be detected at the sensing surface following binding of a target analyte to the binding agent.

Inert layer could be a photoresist, paint, self-assembled monolayer (SAM), epoxy.

Preferably the method of production further comprises attaching a magnetic element and/or a magnetic element positioning means to the sensor.

Preferably the magnetic positioning means is a magnet. Preferably the magnet is a permanent magnet such as formed from neodymium iron boron, samarium cobalt, alnico, and ceramic or ferrite. Preferably the magnet is an electromagnet.

Preferably the magnet positioning means is positioned to capture the particles as a monolayer on the surface of the binding region.

Preferably the support substrate comprises a polymer, silicon or glass.

Preferably the at least one surface structure is integral with the support substrate.

Preferably the electrode layer is deposited on the surface structures by a technique selected from the group consisting of a sputtering technique, preferably magnetron sputtering, evaporation, painting, spray-coating or spin coating.

Preferably the electrode layer comprises a layer of substantially constant thickness that covers the surface structure(s) and optionally the support substrate.

Preferably the thickness of the electrode layer is between about 1 nm and 5 µm thick, more preferably between 40 and 500 nm or between 50 and 100 nm thick. More preferably between about 5 nm and 3 µm thick, between 50 and 100 nm, between 70 and 400 nm, between 900 and 300 nm.

Preferably a protective coating is applied to the electrode layer. Preferably the protective coating binds preferentially to the electrode layer in comparison to the binding layer. The protective coating may be any coating but in particular embodiments it consists of a SAM. In this embodiment, thiol groups in the SAM bind to the surface while not binding (or binding to a lesser degree) to the binding layer.

Preferably the electrode layer comprises a conductive material selected from the group consisting of a conductive metal, carbon, glassy carbon, carbonaceous materials, graphene, carbon nanotubes, conducting ink, loaded polymers, a conducting polymer or a layered structure. Preferably the conducting metal comprises gold, silver, nickel or platinum. Preferably the layered structure comprises titanium with gold, chromium with gold, or gold with a conducting polymer.

Preferably the sensing surfaces are formed by deposition of a binding layer or an inert layer on the support substrate/surface structures leaving an upper portion of the surface structures free of binding layer or inert layer. This results in the surface of the electrode layer on the upper portion of the surface structure being exposed as the sensing surface.

Preferably the separation distance is between about 1 nm and 50 mm. In particular embodiments, the separation distance is between about 30 nm and 5 mm, between about 100 nm and 5000 µm, between about 1 µm and 1000 µm or between about 20 µm and 100 mm. The separation distance may be between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

Preferably the method comprises the production of a plurality of surface structures each with a sensing surface formed on the electrode layer of each surface structure.

Preferably the plurality of sensing surfaces are electrically connected to form a sensing group. Preferably the electrical connection between the plurality of sensing surfaces is under the binding layer. In one embodiment, the method comprises forming two or more sensing groups where each sensing group is electrically isolated from other groups.

Preferably the method further comprises depositing a protective coating on at least one of the sensing surfaces or the binding layer/region. Preferably the protective coating comprises a SAM a photoresist or a protein (such as ovalbumin or other blocking protein with no specific activity).

Preferably the protective coating is a SAM made from an alkanethiol (HS(CH2)XCH3 where X=0 to 16 (X=0 1 2 3 4 5 6 7 8 9 10 11 12 13 14 15 16) and deposited from an ethanol solution.

Preferably the SAM comprises long-chain molecules comprising a carbon chain of C6 to C24 which may be alkane, alkene, alkyne or aromatic. Preferably, C6, 7, 8, 9, 10, 11, 12, 13, 14, 15, 16, 17, 18, 19, 20, 21, 22, 23, or 24 or mixtures of these.

Preferably the SAM comprises short-chain molecules comprising a carbon chain of C10 or less. Preferably, C1, 2, 3, 4, 5, 6, 7, 8, 9, or 10 or mixtures of these.

Preferably the SAM is a mixed SAM comprising long (C10-C24 as above) and short chain (C1-C10 as above) molecules, which may be alkane, alkene, alkyne or aromatic.

Preferably the mixed SAM comprises long-chain molecules comprising a carbon chain of C6 to C24 (as above) and short-chain molecules of C10 to C1 (as above).

Preferably the long-chain SAM comprises molecules selected from the group consisting of azides, amines, carboxylates, aldehydes, ketones, esters or carboxylic acids or mixtures thereof. Such molecules being present at the terminal end of the SAM.

Preferably the short-chain SAM comprises molecules selected from the group consisting of alkanes, azides, amines, hydroxyls, carboxylates or carboxylic acids or mixtures thereof. Such molecules being present at the terminal end of the SAM.

In one particular embodiment, the SAM comprises a mixture of long chain molecules comprising carboxylic acid molecules of greater than C6 and short chain molecules comprising hydroxyl molecules. In the above embodiments, the SAM long chain molecules are preferably selected from C6 to C24 molecules.

Preferably the surface structure is formed on the support substrate by hot embossing, CFT processing, injection moulding, stamping or lithographic techniques.

Preferably the surface structure(s) are formed with an apex at the top of the surface structure. Further embodiments of the surface structure defined previously are also applicable to the third aspect.

Preferably the binding region is formed adjacent to the electrode layer. Preferably an isolating material is deposited between the binding layer and the electrode layer. The isolating material being an inert layer isolating the binding layer from the electrode layer.

Preferably the sensing surface is formed by deposition of the inert layer defining the sensing surface that is exposed to the sample.

Preferably the sensing surface is formed by depositing a binding layer around the surface structures by way of spin coating such that an upper portion of the surface structure surface is exposed.

Preferably the binding agent is attached to the functional surface of the magnetic particles by way of electrostatic attachment or covalent bonding. Preferably the binding agent further comprises a capture agent.

Preferably a blocking agent is deposited onto the binding region. The blocking agent is to block non-specific binding to both the binding region and the binding layer. Examples of a blocking agent include, proteins (BSA, OVA) or small molecules e.g. ethanolamine Preferably the binding layer on the magnetic particle comprises a material which binds to a binding agent.

Preferably the binding layer comprises a protective coating. Preferably the protective coating comprises a SAM or a protein.

Preferably the functional surface on the particle comprises a functional material which binds to a binding agent. Preferably the functional material has molecular functionality suitable to bind a binding agent such as an antibody.

Preferably the magnetic particle comprises a functional surface comprising a carboxylate, aminated, biotinylated, or protein A or G coating.

Preferably the binding layer comprises a protective coating to eliminate non-specific binding.

Preferably a portion of the binding layer is blocked with a blocking agent. Preferably the blocking agent is ethanolamine or a surfactant (e.g. tween).

Preferably the binding agent comprises an antigen or antibody specific for a particular target analyte. Preferably the binding agent is selected from the group consisting of antigens, antibodies, antibody fragments, single-chain variable fragments, biotinylated proteins, peptides, nucleic acids, avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST), or metal and metal salts.

Preferably the SAM binding layer comprises long-chain molecules comprising a carbon chain of C6 or greater. Preferably the SAM binding layer comprises short-chain molecules comprising a carbon chain of C5 or less. Preferably the SAM binding layer is a mixed SAM comprising long and short chain molecules. Preferably the mixed SAM comprises long-chain molecules comprising a carbon chain of C6 or greater and short-chain molecules of C5 or less. Preferably the long-chain SAM comprises terminal functionality selected from the group consisting of azides, amines, carboxylates or carboxylic acids. Preferably the short-chain SAM comprises molecules selected from the group consisting of alkanes, azides, amines, hydroxyls, carboxylates or carboxylic acids Preferably the SAM comprises long-chain molecules comprising a carbon chain of C6 to C24 which may be alkane, alkene, alkyne or aromatic. Preferably, C6, 7, 8, 9, 10, 11, 12, 13, 14, 15, 16, 17, 18, 19, 20, 21, 22, 23, or 24 or mixtures of these.

Preferably the SAM comprises short-chain molecules comprising a carbon chain of C10 or less. Preferably, C1, 2, 3, 4, 5, 6, 7, 8, 9, or 10 or mixtures of these.

Preferably the SAM is a mixed SAM comprising long (C6-C24 as above) and short chain (C1-C6 as above) molecules, which may be alkane, alkene, alkyne or aromatic. Preferably the mixed SAM comprises long-chain molecules comprising a carbon chain of C6 to C24 (as above) and short-chain molecules of C6 to C1 (as above).

Preferably the long-chain SAM comprises molecules selected from the group consisting of azides, amines, carboxylates, aldehydes, ketones, esters or carboxylic acids or mixtures thereof. Such molecules being present at the terminal end of the SAM.

Preferably the short-chain SAM comprises molecules selected from the group consisting of alkanes, azides, amines, hydroxyls, carboxylates or carboxylic acids or mixtures thereof. Such molecules being present at the terminal end of the SAM.

In one particular embodiment, the SAM comprises a mixture of long chain molecules comprising carboxylic acid molecules of greater than C6 and short chain molecules comprising hydroxyl molecules. In the above embodiments, the SAM long chain molecules are preferably selected from C6 to C24 molecules. Preferably the binding layer comprises a SAM and is absent at the upper portion of the surface structure as defined above.

Preferably the step of depositing a binding layer comprises applying a SAM binding layer as described in the previous paragraph. Preferably the deposition comprises:

a. applying a long chain SAM or a mixed SAM (for example those described above) to the electrode layer;
b. applying an electrical charge to the electrode layer to selectively remove the SAM from an upper portion of the surface structure(s);
c. applying a short-chain SAM (for example those described above) to the electrode layer such that the short chain SAM predominantly attaches to the upper portion of the surface structures from b.;
d. optionally applying a binding agent to the binding layer wherein the binding agent preferentially binds to the long-chain SAM; and
e. optionally applying a further electrical charge to the electrode layer to selectively remove the short chain SAM from an upper portion of the surface structure(s) and yield a sensing surface substantially free of SAM molecules.

Preferably the sensing surface is defined by the extent of deposition of an inert layer on the support substrate and surface structures such that a sensing surface is formed on the electrode layer on the surface structures. In one embodiment, the inert layer comprises a binding layer with a blocking agent or protective coating deposited on it.

Preferably the inert layer is substantially unreactive to and resists non-specific binding of any component of a sample to be applied to the sensor.

In one embodiment, the method comprises deposition of two or more discrete electrode layers to form two or more sensing groups.

In one embodiment, the electrode layers are electrically isolated from the binding region or at least one other electrode layer with an isolating material or gap.

Preferably the separation distance between the binding region and the sensing surface is between about 1 nm and 50 mm, and/or the surface structures are separated from each other by about 50 nm to about 2000 µm, and/or the width of the surface structure where it joins the support substrate is between about 20 nm to about 5000 µm, and/or the width of the apex of each surface structure is preferably between about 1 nm to about 5000 micron.

In a fourth aspect, the invention provides a method of detecting binding of a target analyte in a sample to a binding agent, the method comprising:

a. providing a sensor comprising:
   i. a support substrate;
   ii. at least one surface structure protruding from an upper surface of the support substrate, wherein the surface structure includes an electrode layer;
   iii. a sensing surface on the electrode layer, wherein the sensing surface is adapted to contact a sample;
   iv. a binding region on the support substrate, wherein the binding region is separated from the sensing surface and comprises a magnetic field;
b. attaching a magnetic particle to the binding region, wherein the magnetic particle comprises at least one binding agent attached to a binding layer on the magnetic particle;
c. contacting the binding agent with a sample containing a target analyte;
d. allowing the target analyte to bind to the binding agent to produce a detectable response at the sensing surface;
e. measuring a change at a measurement electrode electrically connected to the at least one sensing surface;
wherein binding of the target analyte to the binding agent produces an electroactive species which mediates the detectable response at the sensing surface.

Preferably the sensing surface and binding region are housed within a microfluidic system.

Preferably the sensing surface and the binding region are in separate compartments of the sensor or microfluidic system.

Preferably the magnetic particle is attached to the binding region by activation of a magnetic field at the binding region. Preferably activation of the magnetic field comprises positioning a magnetic element on, in, or under the support substrate. Preferably activation of the magnetic field comprises activation of an electromagnet on, in or under the support substrate.

Preferably the magnetic positioning means is a permanent magnet such as formed from neodymium iron boron, samarium cobalt, alnico, and ceramic or ferrite.

Preferably the electroactive species is in an oxidative redox state that elicits a detectable response at the sensing surface which is held at a reductive or oxidative potential.

Preferably the reductive potential is between about 0 mV and −1000 mv. In one embodiment, the reductive potential is between about −350 mV and −450 mV or about −200 mV, −300 mV or −400 mV, or 0 and about −1 mV.

Preferably the oxidative potential is between about 0 mV and 1500 mv. In one embodiment, the oxidative potential is between about 150 mV and 600 mV or about 200 mV, 300 mV or 400 mV.

In one embodiment, the electroactive substrate (optionally comprising TMB) contacts a ligand labelled target analyte (optionally comprising HRP) which results in oxidation of the electroactive substrate to yield an electroactive species (optionally comprising oxidised TMB) which elicits a detectable response at the sensing surface (optionally wherein the detectable response comprises reduction of oxidized TMB) by contact with the sensing surface held at a reductive potential.

Preferably the target analyte is conjugated to a ligand.

Preferably the electroactive species is generated following exposure of the bound target analyte to an electroactive substrate.

Preferably the sample is applied by flowing the sample across the surface of the sensor. Preferably the sample is flowing in a containment apparatus. Preferably the containment apparatus comprises a microfluidic channel or an in-line sensor.

Preferably the sample is applied by automated or manual means. Preferably the sample is applied by flooding or washing the sensor with the sample. Preferably the sensor is held in a containment apparatus and the sample is applied to the containment apparatus. Preferably the containment apparatus comprises a microfluidic channel.

Preferably a protective coating on at least one of the sensing surface and the binding region is removed prior to the step of measuring a change.

Preferably the change measured at the measurement electrode is selected from the group consisting of a change in current, impedance, voltage, capacitance, resistance, conductance, magnetic flux or electric field.

In one embodiment of the fourth aspect, the invention provides a method of detecting binding of a target analyte in a sample to a binding agent, the method comprising:
 a. providing a sensor as defined in the first, second or fourth aspect;
 b. labelling the target analyte with a ligand;
 c. contacting the sensor and binding agent with a sample containing a pre-determined amount of the labelled target analyte, and an unlabelled target analyte;
 d. applying an electroactive substrate to the sensor, such that a portion of the electroactive substrate is oxidised or reduced by the bound labelled target analyte;
 e. measuring a change at a measurement electrode electrically connected to at least one sensing surface;
wherein binding of the labelled or unlabelled target analyte to the binding agent produces an electroactive species which mediates a detectable response at the sensing surface.

Preferably the embodiment in the previous paragraph comprises a direct or indirect, competitive sandwich or displacement assay.

In a further embodiment of the fourth aspect, the method further comprises regenerating a ligand catalyst by application of a reductive potential at the sensing surface.

In one embodiment of the fourth aspect, the binding layer and binding agent are on a magnetic particle and the magnetic particle is attached to the sensor surface by a magnetic field.

In another embodiment, the method comprises detachment of the magnetic particles by deactivation of the magnetic field.

The magnetic field is established by a magnetic element which is activated or deactivated by methods known to those of skill in the art.

Preferably the separation distance between the binding region and the sensing surface is between about 1 nm and 50 mm, and/or the surface structures are separated from each other by about 50 nm to about 2000 μm, and/or the width of the surface structure where it joins the support substrate is between about 20 nm to about 5000 μm, and/or the width of the apex of each surface structure is preferably between about 1 nm to about 5000 micron.

In one particular embodiment, the method comprises:
 a. attachment of a first set of magnetic particles with a first binding agent;
 b. performing the method of detecting binding of a target analyte in a sample to the first binding agent;
 c. deactivation of the magnetic field to remove the first set of magnetic particles;
 d. attachment of a second set of magnetic particles with a second binding agent; and
 e. performing the method of detecting binding of a target analyte in a sample to the second binding agent.

Preferably this method is repeated with a third or further set of magnetic particles.

Preferably the sensing surface and magnetic particles are housed in or part of a microfluidic system.

Preferably the sensing surface and the binding region are in separate compartments of the microfluidic system. Preferably the sensing surface and the binding region are separated by a separation distance as defined in relation to the first aspect.

In a further embodiment of the fourth aspect, the method comprises use of a sensor with two or more sensing surfaces on two or more electrode layers at increasing distance from a binding site on the binding region; and
wherein the step of measuring a change comprises measuring a change at two or more measurement electrodes, each measurement electrode being electrically connected to an electrode layer and at least one sensing surface, the measurement electrodes being electrically isolated from each other; wherein the method further comprises:
 a. measuring the change in the detectable response as a function of separation distance from the binding site;

b. optionally comparing the change in the detectable response with the change in response from a known concentration of a target analyte from a control sample; and
c. optionally determining the concentration of the target analyte in the sample.

The features, variations and embodiments described in relation to the sensor of previous aspects or embodiments of the invention are applicable to and intended to be read in combination with these features.

In a fifth aspect, the invention provides a method of determining the concentration of a target analyte in a sample, the method comprising:
a. providing a sensor as defined in the second aspect;
b. attaching at least one binding agent to a binding layer at the binding region;
c. contacting the sensor including the binding agent and at least one sensing surface with a sample containing the target analyte;
d. measuring a change at two or more measurement electrodes, each measurement electrode being electrically connected to an electrode layer and at least one sensing surface, the measurement electrodes being electrically isolated from each other;
e. measuring the change in a detectable response as a function of separation distance from a binding site where binding of the binding agent to the target analyte occurs;
f. comparing the change in response with the change in response from a known concentration of a target analyte from a control sample; and
g. determining the concentration of the target analyte in the sample;
wherein binding of the target analyte to the binding agent produces an electroactive species which mediates a detectable response at the sensing surface.

Preferably the sensor is deployed in a flow environment. Preferably the sensor is housed in or part of a microfluidic system.

Preferably the sensing surface and the binding region are in separate compartments of the microfluidic system. Preferably the sensing surface and the binding region are separated by a separation distance as defined in relation to the first aspect.

In one embodiment of the fifth aspect, the binding layer is on a magnetic particle attached to a binding region on the support substrate, wherein the binding region is defined by an area of magnetic field established by a magnetic element on, in or under the support substrate which, in use, attracts and attaches magnetic particles to the support substrate.

Preferably the separation distance between the binding region and the sensing surface is between about 1 nm and 50 mm, and/or the surface structures are separated from each other by about 50 nm to about 2000 µm, and/or the width of the surface structure where it joins the support substrate is between about 20 nm to about 5000 µm, and/or the width of the apex of each surface structure is preferably between about 1 nm to about 5000 micron.

The features, variations and embodiments described in relation to previous aspects and embodiments of the invention are applicable and intended to be read in combination with the features of this aspect.

Those of skill in the art will appreciate that the aspects, embodiments and features of the invention as described in this specification may be combined, individually or collectively, in any or all combinations of two or more of said aspects, embodiments or features.

Further aspects of the invention, which should be considered in all its novel aspects, will become apparent to those skilled in the art upon reading of the following description which provides at least one example of a practical application of the invention.

BRIEF DESCRIPTION OF THE FIGURES

Embodiments of the invention will now be described, by way of example only, with reference to the accompanying drawings in which:

located at the region highlighted in A.

FIG. 14C also indicates the sensor threshold and indicates that all 5 electrodes will show a response for the higher concentration, and only the first 2 electrodes will respond to the lower concentration.

FIG. 15 shows the spectrophotometric test of protein binding on gold, SU8 and lacquer surfaces.

DETAILED DESCRIPTION OF PREFERRED EMBODIMENTS

Definitions

Figure 1:
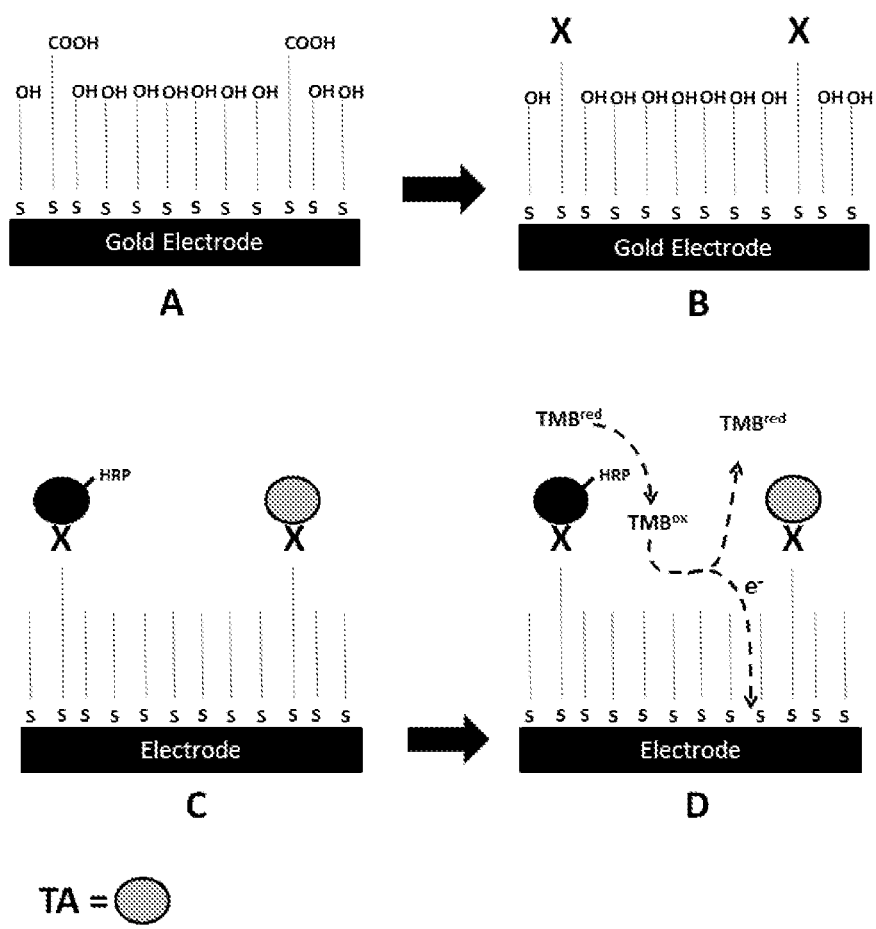
FIG. 1 shows an example from the prior art of an electrode with a self-assembled monolayer (SAM) in which the sensing surface is the same as the binding region.

"Binding agent" refers to a component of the sensor which attaches to the binding layer, and binds either directly or indirectly to the target analyte to yield an electroactive species.

"Attach" or "bind" means covalent bonding, electrostatic bonding, magnetic attraction or some other bonding mode where the species is bound or attracted in some way to the support.

"Particle" means any detachable element capable of retaining a binding agent or capture agent on its functional surface, and being sufficiently mobile to be attached to or detached from the surface of the sensor. In particular embodiments, the particle is a magnetic particle and may be attached or detached by the establishment of a magnetic field on, in or under the sensor.

"microfluidic channel" refers to a channel which small size induces laminar flow within the fluidic path.

"Tapered" means moving from a wider surface structure to a narrower surface structure.

"Smooth" means substantially no changes in the rate of change of angles of a surface.

"Ligand" refers to a component which attaches to the target analyte and either directly or indirectly causes activation (i.e. oxidation or reduction) of the electroactive substrate applied to the sample. The ligand is typically an enzyme and may be selected from the group consisting of for example horseradish peroxidase ("HRP"), alkaline phosphatase (AP), glucose oxidase, β-galactosidase, acetylcholinesterase and catalase.

"Electrochemically passivated" refers to the partial or complete masking or blocking of a sensing surface by a substance which inhibits electrochemical interaction of the surface with an electroactive species.

"Electroactive substrate" refers to a redox active compound for example 3,3',5,5'-Tetramethylbenzidine or simply "TMB", or quinone. In some embodiments, the electroactive substrate includes additional activating species such as hydrogen peroxide ($H_2O_2$) for regeneration of the HRP ligand. In these cases, the term electroactive substrate is intended to encompass such activating species. Those of skill in the art will appreciate the activating species that the electroactive substrate must comprise in order for the electroactive species to be produced and the catalyst (e.g. HRP ligand) to be regenerated.

"Electroactive species" means an electron-donating or receiving species that is generated as a result of the binding of a target analyte to a binding agent, and when coming into contact with the sensing surface elicits a detectable response. The electroactive species mediates the response by moving (by diffusion or flow) from the binding site (i.e. where the binding actually occurs) to the sensing surface creating the detectable response or change.

"Transduction" refers to the mechanism used to measure the binding event of the target analyte by the binding or capture agent. The binding event generates an electrochemical response (generated by the binding of a substrate to a ligand) which is measured as a detectable response at the sensing surface. The detectable response may be the loss or gain of electrons at a sensing surface as the substrate is oxidized or reduced.

"No-flow environment" means that there is substantially zero lateral movement of the sample across an upper surface of the sensor.

"Flow environment" means that there is a detectable, and either controlled or uncontrolled, substantially lateral movement of the sample across an upper surface of the sensor. The direction of flow will typically be in a direction from the binding agent to the sensing surface. However, the flow may simply be an agitation or shaking to assist with rapid diffusion of the electroactive species from the binding site to the sensing surface.

"Deposited" means formed on a surface and may refer to any form of formation, layering or production. In one embodiment, the deposition is achieved by sputtering. Preferably the deposited layer has some degree of adherence to the layer on which it is deposited. This adherence may be covalent, electrostatic or include Van der Waals forces.

"Substantially constant thickness" in relation to the electrode layer means that the electrode layer does not vary significantly over the extent of its coverage of the support substrate or binding layer. Unintentional variations in the thickness of the layer that have substantially no effect on function of the sensor are intended to be incorporated by the term substantially constant thickness.

"Attenuated" in relation to the effect of a binding layer or binding agent(s) means that the response detected at the sensing surface is impeded or electrically blocked by the presence of the binding layer or the presence or binding action of the binding agent(s).

"Surface structure" as referred to herein is intended to refer to a single surface structure or plural surface structures.

"Comprise", "comprising", and the like, are, unless the context clearly requires otherwise, to be construed in an inclusive sense as opposed to an exclusive or exhaustive sense, that is to say, in the sense of "including, but not limited to".

"Inert" refers to a material that is unreactive to components of an array and solutions/samples that are typically applied to it. The lack of reactivity of an "inert" surface ensures that there is minimal chemical, physical or electrostatic binding of components to the surface. For components which hybridise (such as nucleic acids) an inert surface minimizes non-specific hybridization and binding. An inert layer is in contrast to a binding layer which comprises features or characteristics which specifically encourage binding of particular components of a solution, or bind the layer to another surface.

DESCRIPTION

The inventors have developed a sensor in which binding of a target analyte to a binding agent on a binding layer results in a detectable response at a sensing surface on the sensor but which is separated from the binding layer but which is on the same sensor. The inventors have found that separating the binding layer and binding region from the sensing surface on the sensor helps to achieve a stable binding layer while also limiting interference with sensing at the sensing surface. In this way, the sensing surface is substantially unimpeded electrically by the binding agent and therefore the detectable response is not attenuated. The invention therefore seeks to enable increased response detection at the sensing surface, and, subsequently at a measurement electrode, and also a reduction or complete cessation of interference caused by one or more of the binding region, binding agents, capture agents, target analytes, matrix, or their interaction. The present invention therefore seeks to provide a sensor with increased accuracy for detection of low levels of target analyte, as well as a reproducible response both within and between sensors.

The invention is also directed to a method of increasing the accuracy of sensing a target analyte in a sample (see for example FIG. 25), the method including the steps of providing a sensor comprising:
   a. a support substrate;
   b. at least one surface structure protruding from an upper surface of the support substrate, wherein the surface structure includes an electrode layer;
   c. a sensing surface on the electrode layer, wherein the sensing surface is adapted to contact the sample;
   d. a binding region on the support substrate, wherein the binding region is separated from the sensing surface;
   e. contacting the binding agent with the sample containing the target analyte;
   f. allowing the target analyte to bind to the binding agent to produce a detectable response at the sensing surface;
   g. measuring a change at a measurement electrode electrically connected to the at least one sensing surface;
wherein binding of the target analyte to the binding agent produces an electroactive species which mediates the detectable response at the sensing surface and improves the accuracy of sensing the target analyte in the sample (in comparison to electrochemical detection for example).

It is preferred that the binding layer and binding agent are on a magnetic particle and the magnetic particle is attached to the sensor surface by a magnetic field.

The method also comprises the ability to detach and replace the magnetic particles by deactivation and reactivation of the magnetic field.

The magnetic field is preferably established by a magnetic element (as either a permanent magnet or an electromagnet) connected directly or indirectly to the sensor.

Preferably the magnetic element is a permanent magnet such as formed from neodymium iron boron, samarium cobalt, alnico, and ceramic or ferrite.

Preferably the magnetic element is positioned (thus may be referred to as a "magnetic positioning element" although the references may be read synonymously) to capture the magnetic particles as a monolayer on the surface of the binding region.

The method may also additionally comprise:
   a. attachment of a first set of magnetic particles with a first binding agent;
   b. performing the method of detecting binding of a target analyte in a sample to the first binding agent;
   c. deactivation of the magnetic field to remove the first set of magnetic particles;
   d. attachment of a second set of magnetic particles with a second binding agent; and
   e. performing the method of detecting binding of a target analyte in a sample to the second binding agent.

This method may also be repeated with a third or further set of magnetic particles for detection of the same or different target analyte(s).

The surface structures will preferably be cones, pyramids or ridges or combinations of these.

The separation distance between the sensor surface and the binding layer/region is preferably between about 30 nm and 5 mm, between about 100 nm and 5000 µm, between about 1 µm and 1000 µm or between about 20 µm and 100 µm. The separation distance may also be between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

Preferably the separation distance between the binding region and the sensing surface is between about 1 nm and 50 mm, and/or the surface structures are separated from each other by about 50 nm to about 2000 µm, and/or the width of the surface structure where it joins the support substrate is between about 20 nm to about 5000 µm, and/or the width of the apex of each surface structure is preferably between about 1 nm to about 5000 micron.

FIG. 1 shows prior art designs and depicts the typical design for a biosensor that exploits the electrochemical measurement of TMB. The electrode surface is functionalised with a SAM layer (FIG. 1A) which contains functional groups to which capture agents (X) can be attached (FIG. 1B). The target species (◉) and labelled target (●⃰) compete for binding to the capture agent (FIG. 1C), after which TMB is added and measurement of TMB' is determined electrochemically (FIG. 1D). The issues of this approach relate to the competing requirements of the electrode surface having to simultaneously bind the capture agent and perform the measurement. This is addressed by the current invention, which separates the binding from the measurement.

Figure 2:
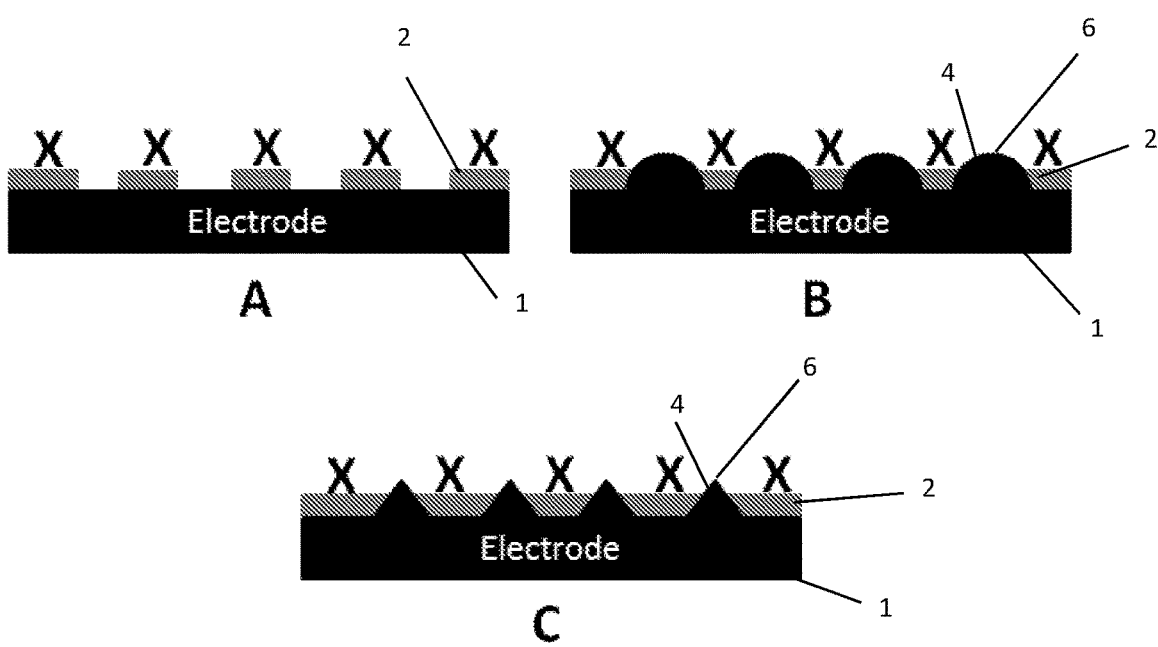
FIG. 2 shows four possible configurations of the invention. 2A illustrates sensing surfaces that are exposed areas of the electrode layer, 2B illustrates a surface structure with a convex cross-section. 2C illustrates a sensing surface with a triangular cross-section.

FIG. 2 depicts four possible embodiments of the invention each of which comprises a support substrate electrode layer and a binding layer onto which the binding agent (X) may be attached. The embodiments include:

A—Which comprises isolated sensing surfaces formed by the deposition of a binding layer onto the surface of the electrode and forming apertures to expose the sensing surface 2 of the electrode layer 1. In this embodiment, each sensing surface is defined by the surface area of the electrode layer that is exposed.

Figure 2D:
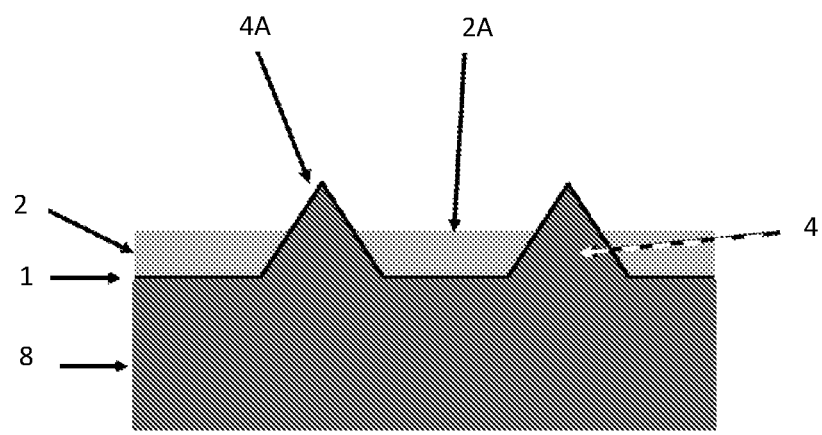
FIG. 2D shows a cross-sectional schematic of a sensor with a triangular cross-section. When represented three-dimensionally, the surface structures of this embodiment could be cone-shaped or ridges (ridge-shaped).

B and C—in these embodiments, the binding layer bounds the sensing surfaces which exist on surface structures 4 with a highpoint or apex 6. In these particular embodiments, the surface structures have a convex or triangular cross-section. In a three-dimensional embodiment, the surface structures could exist as hemispheres (B), or cones (C), or could be ridges with a semi-circular or triangular cross section. FIG. 2D has a similar surface topology to FIG. 2C but the electrode layer 1 is deposited on the support substrate 8 to create a much thinner electrode layer. A thin electrode layer has advantages including less electrode material which can be expensive (e.g. gold or platinum).

Figure 3:
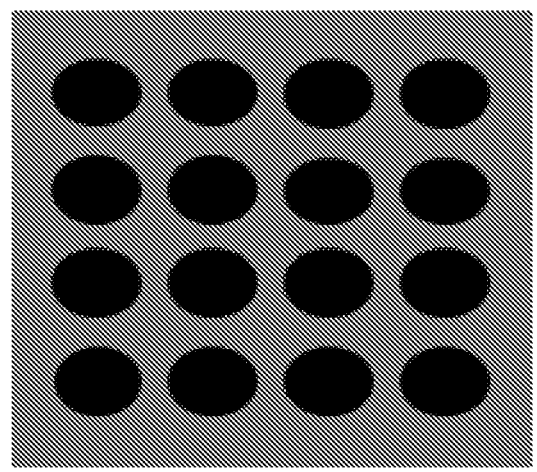
FIG. 3 shows a plan view for each of the configurations that are shown in FIG. 2, and shows the electrode as a 4×4 array.

FIG. 3 shows a plan view for each of the configurations that are shown in FIG. 2, and shows the electrode as a 4×4 array. Alternative embodiments (not shown in FIG. 3) include the use of ridges or channels with a cross-sectional profile as shown in FIG. 2A, B or C.

The invention provides a sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact a sample;
d. a binding region on the support substrate, wherein the binding region is separated from the sensing surface.

In another aspect, the invention provides a sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact a sample containing a target analyte;
d. a binding region on the support substrate, wherein the binding region is separated from the sensing surface;
wherein, in use, a binding agent attached to the binding layer at the binding region contacts a sample containing the target analyte; and wherein the sensor is adapted to detect a detectable response at the sensing surface following binding of the target analyte to a binding agent attached to the binding layer.

The invention will also preferably provide a method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach at least one binding agent electrostatically, covalently or magnetically;
wherein the sensing surface is separated from the binding region by a separation distance sufficient, in use, for a detectable response to be detected at the sensing surface following binding of a target analyte to the binding agent.

Preferably the binding region comprises a magnetic field to attract and attach a magnetic particle comprising a binding layer with a binding agent attached.

In use, the support substrate of the sensor described above has magnetic particles attached to it via a magnetic field. The magnetic field defines an area of the sensor as a binding region. The binding region is where binding between a target analyte in solution and a binding agent attached to a functional surface on a binding layer on the magnetic particle occurs.

Although not necessarily required, the sensor of the present invention may be housed in a microfluidic environment. In this environment, the sample solution can be passed over the binding region and sensing surfaces in a reproducible and homogenous way. Preferably with laminar flow characteristics.

The invention provides a method of detecting binding of a target analyte in a sample to a binding agent, the method comprising:
a. providing a sensor comprising a support substrate; at least one surface structure protruding from an upper surface of the support substrate, wherein the surface structure includes an electrode layer; a sensing surface on the electrode layer, wherein the sensing surface is adapted to contact a sample; a binding region on the support substrate, wherein the binding region is separated from the sensing surface;

b. attaching a magnetic particle to the binding region, wherein the magnetic particle comprises at least one binding agent attached to a binding layer on the magnetic particle;
c. contacting the binding agent with a sample containing a target analyte;
d. allowing the target analyte to bind to the binding agent to produce a detectable response at the sensing surface;
e. measuring a change at a measurement electrode electrically connected to the at least one sensing surface;
wherein binding of the target analyte to the binding agent produces an electroactive species which mediates the detectable response at the sensing surface.

In one embodiment, the target analyte is conjugated to a ligand which, following exposure to the electroactive substrate, produces the electroactive species. In this way, the electroactive species is produced following exposure of the ligand conjugated bound target analyte to an electroactive substrate.

In a competitive assay environment, the target analyte and the ligand-labelled target analyte (e.g. HRP labelled) compete for binding to the binding agent. Upon binding of the ligand-labelled target analyte (e.g. HRP), the electroactive species (e.g. TMB) is oxidised by the ligand (e.g. HRP). A detectable response at the sensing surface results from the reduction of the electroactive species (e.g. TMB) on the sensing surface.

Figure 4:
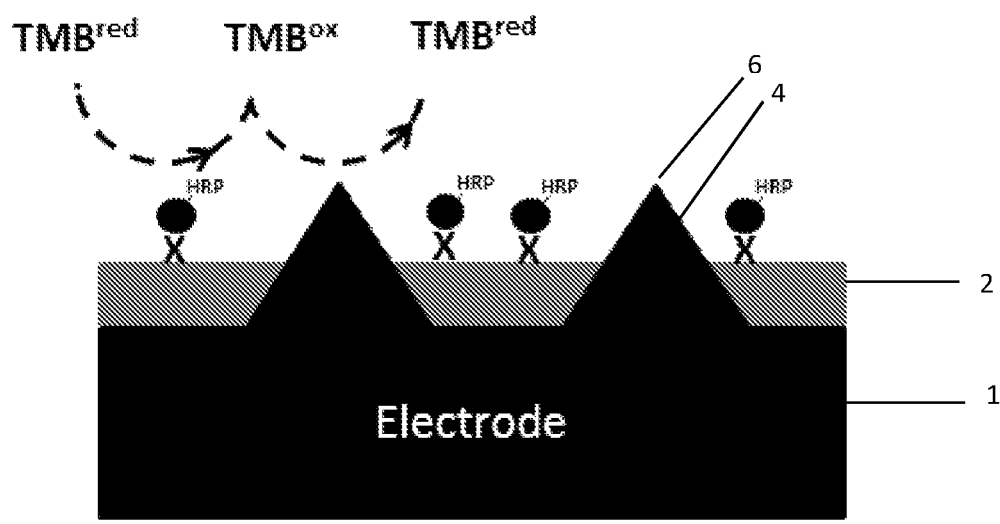
FIG. 4 shows the sensing mechanism for a sensor based on TMB reduction/oxidation and which separates the binding agent(s) from the sensing surface(s).

FIG. 4 shows an embodiment of the invention in which the sensing surface 4 is immediately adjacent the binding region/layer 2.

Figure 5:
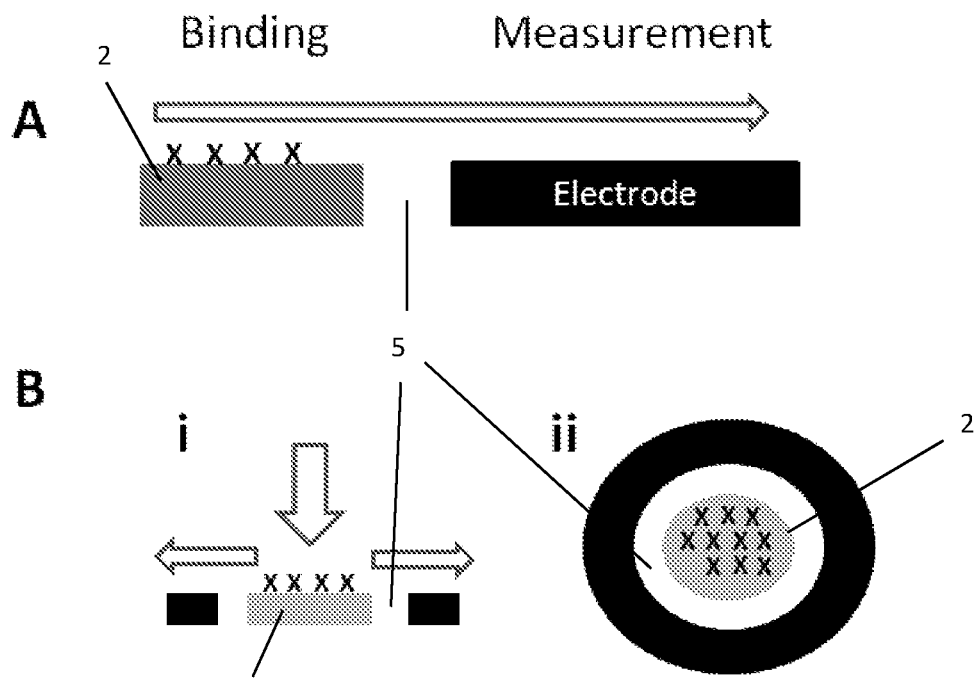
FIG. 5 shows an embodiment of the invention in which the binding region and the sensing surface are isolated yet adjacent in a linear (A) and circular (B) configuration. Configuration B is split into (i) side and (ii) plan views, and the arrows indicate a possible direction of the flow.

FIG. 5 shows an embodiment of the invention in which the binding region/layer 2 and the sensing surface 4 are isolated by gap 5 and adjacent to each other, either in a linear (FIG. 5A) or circular (FIG. 5B) arrangement.

Figure 6:
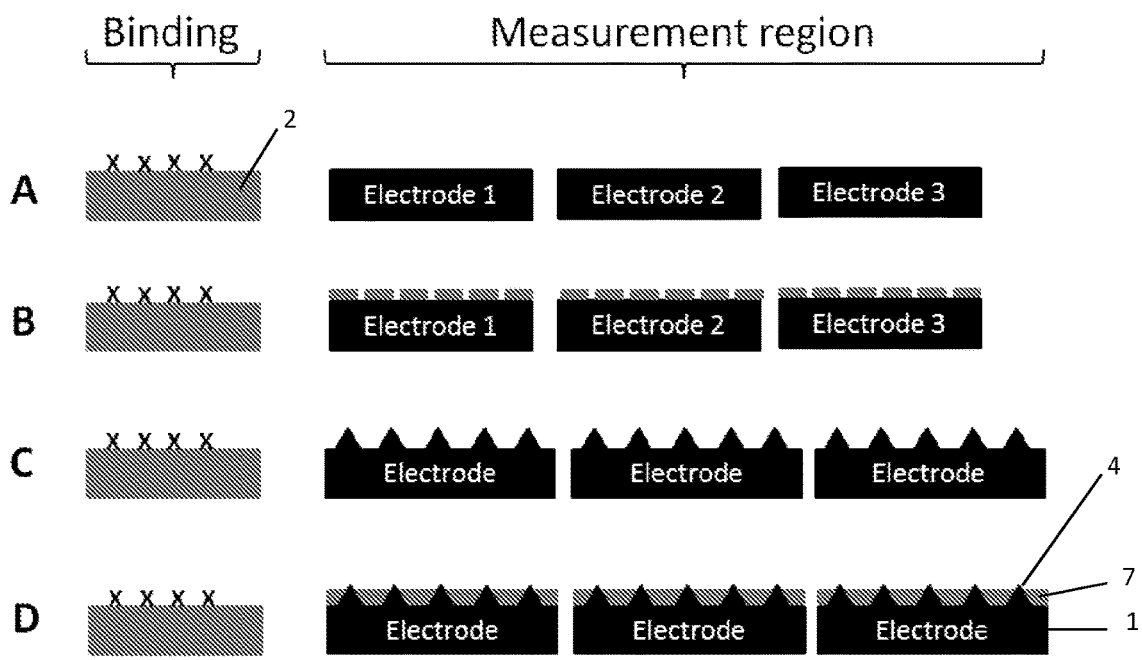
FIG. 6 shows the binding region isolated from the sensing surfaces wherein A shows multiple flat sensing surfaces, B shows multiple sensing surfaces at the base of pores, C shows multiple surface structures with a triangular cross section on support substrate/electrode layer and D. shows multiple surface structures with a triangular cross section on support substrates/electrode layers in which just the sensing surfaces are exposed above an inert layer or binding layer.

FIG. 6 shows multiple sensing groups being used to detect a response from the binding of the target analyte to a binding agent X (as will be discussed in more depth below).

Figure 7:
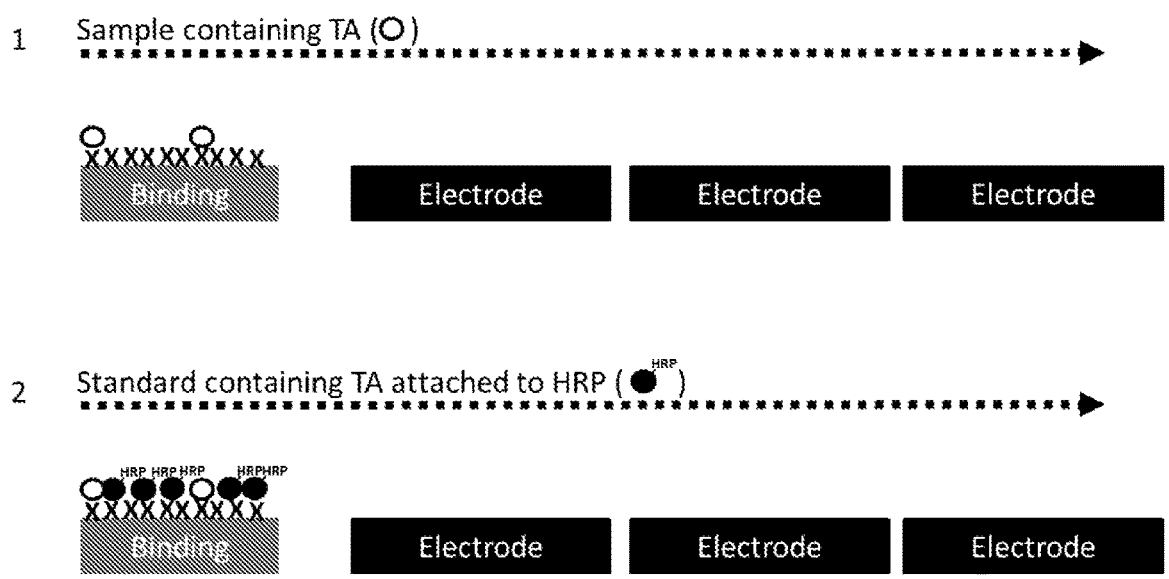
FIG. 7 shows the binding of the target analyte (TA) from a sample (7.1) followed by binding of a ligand-labelled target analyte (TA-HRP) (7.2) to the binding agents on a binding region of the sensor.

A particular embodiment of the invention is shown in FIG. 7 (which will be described in more depth below). In this embodiment, the method comprises:
a. attaching a binding agent X (for example an antibody or antigen) to the binding layer of the sensor;
b. labelling a target analyte (TA) with a ligand (for example horseradish peroxidase (HRP));
c. adding a fixed amount of the labelled target analyte to a sample comprising an unlabelled target analyte (TA (O));
d. applying the sample to a sensor such that a competitive assay between the labelled target analyte and the unlabelled target analyte occurs;
e. applying an electroactive substrate to the sensor, for example TMB in the presence of $H_2O_2$, such that a portion of the electroactive substrate is oxidised or reduced by the bound labelled target analyte;
f. measuring a response signal corresponding to the oxidation or reduction of the electroactive substrate at the sensing surface.

Figure 8:
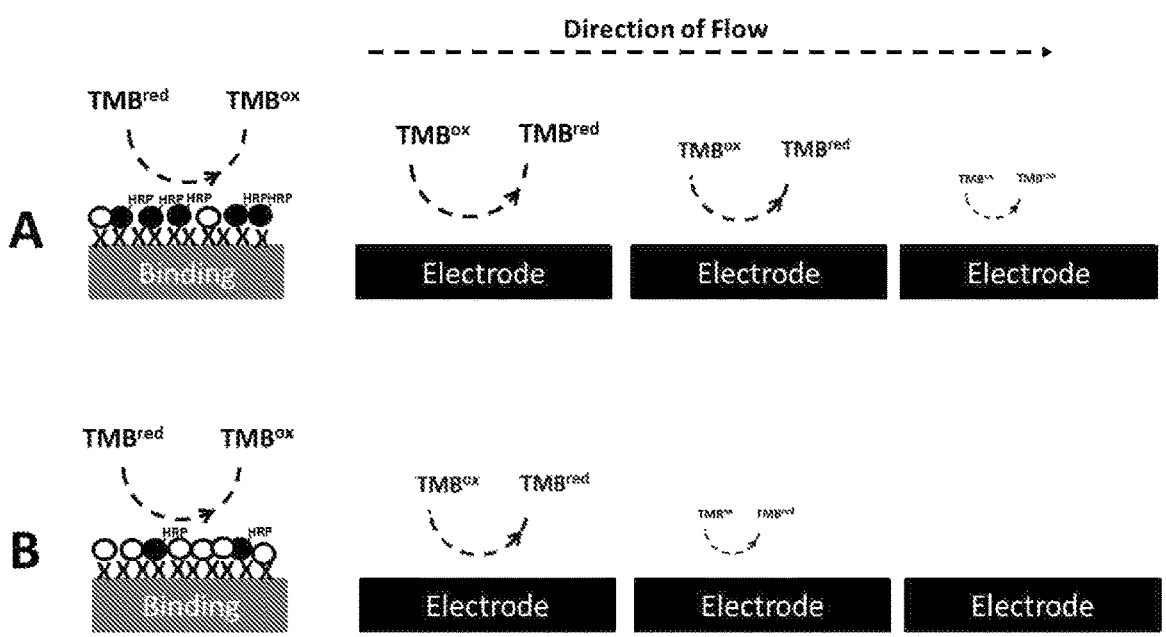
FIG. 8 shows exposure of the bound target analyte (TA) or bound ligand labelled target analyte (TA-HRP) to the same concentration of electroactive substrate ($TMB^{red}$) under A. low TA loading, and B. high TA loading, and the resulting reduction of the electroactive substrate $TMB^{ox}$ on the surface of successive electrodes for each case.

FIG. 8 shows the introduction of an electroactive substrate in the presence of an activating species (in this embodiment TMB plus H2O2) to the sensor which is passed over the binding layer then the sensing surfaces. This is again discussed in more detail below.

Figure 9:
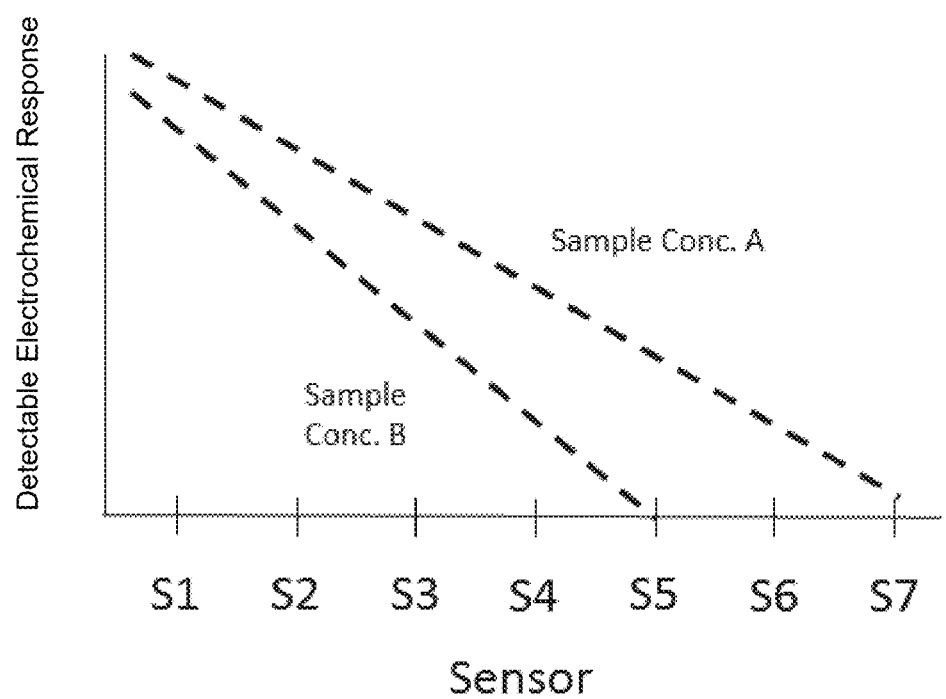
FIG. 9 shows response curves for low (Sample Conc. A) and high (Sample Conc. B) TA concentration.

FIG. 9 shows the type of data that would be expected to be obtained from the multiple electrode response at low TA concentration (Sample Conc. A) and high TA concentration (Sample Conc. B). Each decays at a point corresponding to the amount of the electroactive species (in this case TMBox) generated following binding of the labelled target analyte to the binding agent in solution. This is again discussed in more detail below.

FIGS. 10 A and B show a similar arrangement to FIG. 8 although in these embodiments, an array of tips (surface structures with sensing surfaces protruding above the binding/inert layer) is used to achieve greater sensitivity of the multiple electrode layer sensor. This is again discussed in more detail below.

In one embodiment requires the binding layer is on a magnetic particle attached to the binding region on the support substrate (sensor surface) by a magnetic field. In either embodiment, of a competitive assay, the sample is brought into contact with the binding agent at the binding region and the labelled target analyte competes for binding agents with the unlabelled target analyte. According to the law of mass action, the amount of bound labelled target analyte is a function of the total concentration of the labelled and unlabelled target analyte. As the concentration of unlabelled target analyte increases, less labelled target analyte binds to the binding agent and the response signal decreases. The electroactive substrate is applied and the response measured. The response is measured at a sensing surface separated from the binding region. Thus the lower the response signal, the more unlabelled target analyte there is in the sample. In this way, the concentration of the unlabelled target analyte can be calculated based on the known labelled target analyte concentration and the measured response signal.

To detect the electroactive species, a potential is applied across the measurement and counter electrodes. The potential may be a reductive or oxidative potential. In one embodiment, the potential is between −100 mV and −300 mV. In one embodiment, where TMB is the electroactive species, the potential is between −100 mV and −300 mV. In one embodiment, the potential is between −150 mV and −1000 mv, or between −180 mV and −450 mV. In one embodiment, the potential is between −350 mV and −450 mV or about −200 mV, −300 mV or −400 mV.

In one embodiment, a current of −400 mV is applied across the measurement electrode/electrode layer(s) and the counter electrode. In this embodiment, when using HRP as a ligand, the current is sufficient to generate peroxide in the sample (from $H_2O$) which propagates the reaction of the electroactive substrate with the ligand-labelled target analyte. The system is allowed to settle to an equilibrium for a period then a measurement of the detectable response is taken.

The reaction scheme of the mechanism for HRP and TMB as the electroactive substrate is shown in the reaction below:

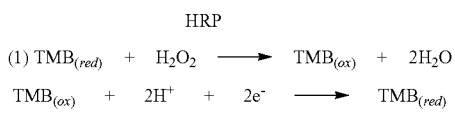

Therefore in the presence of HRP and peroxide, the catalysis shown above takes place. This equation shows that the reaction is an electroactive process generating the electroactive species, allowing an electrochemical signal to be detected at the sensing surface of the electrode layer where the electrons are transferred and measured at the measurement electrode.

In the embodiment described above relating to measurement of an electrochemical response, the system is not limited to the reduction and oxidation of TMB by HRP but is also applicable to any electroactive species that relies on a redox process. Other examples of ligand-substrate pairs include for example HRP/quinone, HRP/DAB, HRP/aec, HRP ABTS, HRP/homovanillic acid, HRP/OPD, HRP/AmplexRed or glucose oxidase reduction of glucose for diabetes monitoring.

Preferably the detectable response comprises an electrochemical detectable response comprising a change in current, impedance, voltage, capacitance, impedance, resistance or conductance. Measurement of such response using electrodes will be known to those of skill in the art. Preferably the binding of a target analyte to a binding agent releases an electroactive species which mediates the detectable response at the sensing surface. This means that the electroactive species moves from the binding site (i.e. where the binding agent contacts the target analyte) and contacts the sensing surface thus donating or receiving electrons to produce a detectable response.

The support substrate forms a base of the sensor and supports the surface structures. Preferably the support substrate comprises a polymer, silicon or glass. Where a polymer is used, it is typically amorphous but could be a semi-crystalline polymer. Preferably an extrudable polymer is used. Suitable forms of polymer will be known to those of skill in the art but include, for example polycarbonate and PMMA. It may be flexible or rigid and is preferably planar. As will be known to a skilled person in the art, the thickness of the support substrate is primarily governed by the thickness required to ensure proper handling. Therefore, preferably, the support substrate is between about 50 microns to about 5 mm thick, or between about 500 microns to about 2 mm thick, or between about 50 microns to about 100 microns thick.

In one embodiment, the support substrate is a conducting material. In another embodiment, the support substrate is a non-conducting material. Where the support substrate layer is a non-conducting material, it may also act as an insulating material. Examples of suitable flexible materials for use in the present invention include thermoplastic polyurethane, rubber, silicone rubber, and flexible epoxy. Examples of suitable rigid substrate materials for use in the present invention include glass, PMMA, PC, PS, ceramic, resin, composite materials, loaded polymers and rigid epoxy. The substrate material may also be formed from a metal such as gold, silver, nickel or the like, as discussed in more detail below.

The surface structures may be joined to one another where they meet the support substrate, or they may be situated apart from one another such that a substantially planar upper surface of the support substrate is present between the base of each surface structure.

In one embodiment, the surface structure(s) are integral with the support substrate. This means the surface structures are formed from the same material as the support substrate and protrude from it. In this embodiment, the upper surface of the support substrate may comprise an array of surface structures arranged in an ordered or random configuration. In this embodiment, the electrode layer may be formed on the upper surface of the surface structures (and support substrate where it is exposed). The support substrate with integrated surface structure(s) may be formed by known methods, for example hot embossing, CFT processing, injection moulding, stamping or lithographic techniques.

In an alternative embodiment, the surface structures are formed from a different material than the support substrate and are deposited on or attached to the support substrate. In this embodiment, the surface structures may be integral to the electrode layer. This means that the surface structures are part of the electrode layer and are formed from the same material as the electrode layer.

Alternatively, an electrode layer may be deposited or otherwise formed on the surface structures, and said surface structures are deposited on, integral with or otherwise formed on the support substrate. The support substrate with surface structure(s) formed from different materials may be formed by known methods, for example hot embossing, CFT processing, lasering of a photoresist, stamping or lithographic techniques.

The electrode layer comprises any suitable conducting material. Preferably the electrode layer comprises a conductive material selected from the group consisting of a conductive metal, carbon, glassy carbon, carbonaceous materials, graphene, carbon nanotubes, conducting ink, loaded polymers, a conducting polymer, gold, silver, nickel, platinum, fluoride doped tinoxide (FTO), indium tinoxide (ITO), doped silicon, titanium dioxide or a layered structure. Preferably the conducting metal comprises gold, silver, nickel or platinum. Preferably the layered structure comprises titanium with gold, chromium with gold, or gold with a conducting polymer.

In one embodiment, an inert layer or a binding layer is deposited on the electrode layer.

In one embodiment the electrode layer is deposited on the surface structure(s). In this embodiment, any flat support substrate surface that is exposed will also be covered by the electrode layer, subject to the bounds of the electrode layer. Preferably the electrode layer comprises a layer of substantially constant thickness. Where the electrode layer is deposited on an upper surface of the surface structures, the upper surface topology of the electrode layer will preferably correspond to the topology of the underlying surface structure(s) and optionally support substrate. This correspondence in surface topologies can be seen in FIG. 2D in which the electrode layer 1 is deposited on the support substrate 8.

Although the thickness of the electrode layer may be any suitable thickness, it is preferably between about 1 nm and 5 µm thick, more preferably between 40 and 500 nm or between 50 and 100 nm thick. More preferably between about 5 nm and 3 nm thick, between 50 and 100 nm, between 70 and 400 nm, between 900 and 300 nm. The inventors have found that using a layer that is less than about 15 nm is less desirable due to problems with conductivity of electrical charge. In addition, layers greater than 500 nm thick provide an economic disadvantage due to the cost of the material used to make the electrode layer which is typically gold.

Preferably the electrode layer comprises one or more terminal connection means adapted to electrically connect the electrode layer to a measurement electrode. Preferably the terminal connection means is adapted to engage a connector such as a slot connector. Preferably the terminal connection means comprises a region of the support substrate with surface structures protruding above the surface of the support substrate, binding layer or inert layer.

Figure 12:
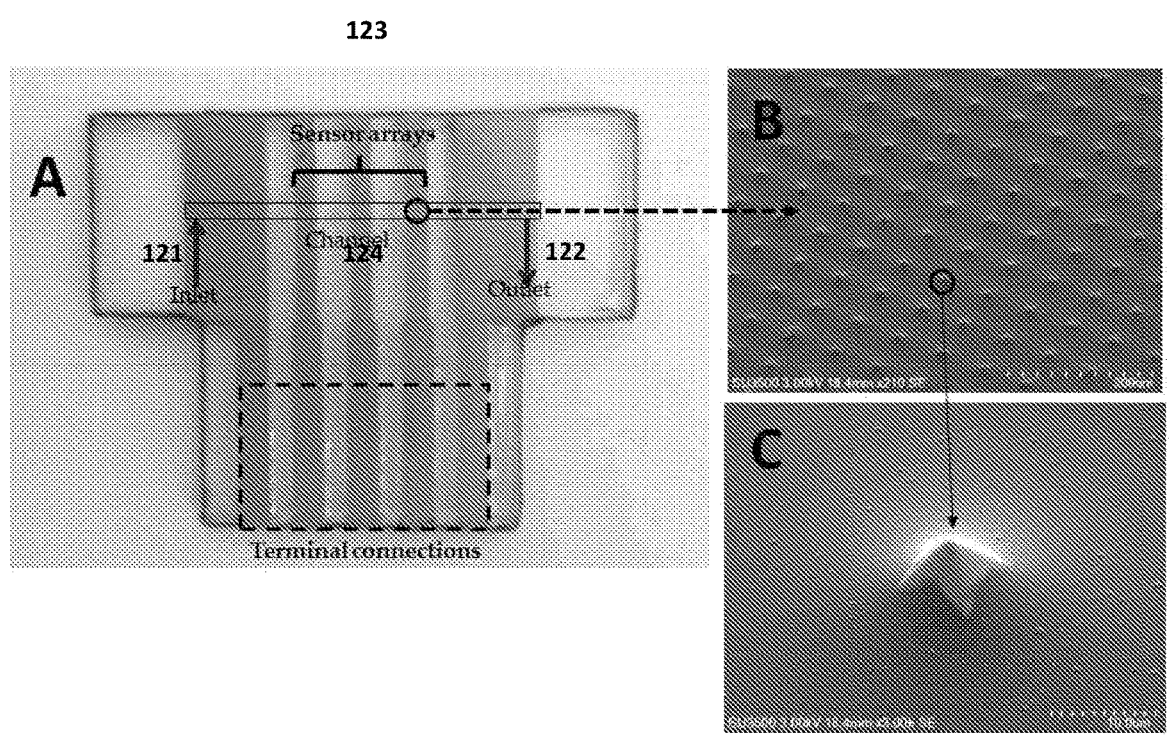
FIG. 12A shows a multi-analyte sensor with five electrode layers and a channel which defines the area of the sensors.
FIG. 12B shows a uniformly arranged sensing group (array)
FIG. 12C shows a single sensing surface with a gold electrode tip protruding through the binding layer.

In one embodiment, for example the sensor shown in FIG. 12, the electrode layer(s) extends onto a terminal connection means. The inventors have found that a convenient mechanism for connecting the sensor arrays to an external circuit comprises providing a first region of the sensor with a binding region and an electrode with corresponding surface structures (as described herein), a second region of the sensor without surface structures and with the electrode completely covered by the inert layer such as SUB, and a third region with surface structures and in which the electrodes correspond to the electrodes on the connector and allows electrical connection to be made. Preferably the second region comprises exposure of only the binding layer or inert layer while the electrode layer passes under the binding layer or inert layer. The second region is adapted to seal with a connection seal when the sensor is employed in a microfluidics environment. Preferably the third region comprises exposure of the binding layer or inert layer, wherein the surface structures comprising the electrode layer are also exposed and facilitate a connection with an external circuit. The inventors have found that this arrangement of regions on the sensor surface facilitates a particularly good seal in a microfluidics environment while still enabling an effective connection to the sensor array.

Sensors of the present invention include at least one sensing surface separated from the binding region or binding layer. Preferably the binding region is separated from the sensing surface by a separation distance wherein the separation distance is sufficient for the detectable response to be detected at the sensing surface.

Preferably the separation distance is between about 1 nm and 50 mm. In particular embodiments, the separation distance is between about 30 nm and 5 mm, between about 100 nm and 5000 μm, between about 1 μm and 1000 μm or between about 20 μm and 100 μm. The separation distance may be between about 30 nm and about 5 mm, between about 100 nm and about 5000 μm, between about 1 μm and about 1000 μm or between about 20 μm and about 100 μm, about 30 nm and about 5000 μm, about 100 nm and about 5 mm, about 1 μm and about 100 μm, about 20 μm and about 1000 μm, about 20 μm and about 5000 μm; 1 μm and about 5 mm.

The separation distance appropriate for a sensor depends to some degree on the time taken for the electroactive species to reach the sensing surface. This time is affected by a number of factors including the viscosity of the sample, the flow speed of the sample over the sensor or the agitation rate.

In one embodiment, the sensor is adapted for use in a no-flow environment. In this embodiment, the ability of the sensing surface to detect a response depends on the diffusion characteristics of the electroactive species in the sample. This in turn is dependent on the nature of the sample (taking into account matrix effects), and the concentration of the electroactive species and therefore the concentration of the target analyte and binding agent density. Preferably, the sensing surface is immediately adjacent the binding region as shown for example in FIG. 4. Preferably the separation distance in a no-flow environment is between about 30 nm and 500 μm, between about 1 μm and 200 μm or between about 20 μm and 100 μm.

In another embodiment, the sensor is adapted for use in a flow environment. In this embodiment, the sample flows across an upper surface of the sensor such that the speed of the electroactive species from the binding site to the sensing surface is accelerated. Alternatively, a flow environment may include an agitated sample, which assists with rapid diffusion to the sensing surface. Preferably, the sensing surface is immediately adjacent the binding region as shown for example in FIG. 4. Preferably the separation distance in a flow environment is between about 30 nm and 50 cm. In particular embodiments, the separation distance is between about 30 nm and 50 mm, between about 100 nm and 5000 μm, between about 1 μm and 2000 μm or between about 20 μm and 100 μm.

In one embodiment, the sensing surface comprises an exposed surface of the electrode layer wherein the area of the sensing surface is defined by the extent of the inert layer or binding layer. For example, FIG. 2A illustrates sensing surfaces that are exposed areas of the electrode layer 1. Preferably the inert layer exists between the surface structures. Where the inert layer exists between surface structures, this is intended to mean that the inert layer may partially cover the surface structures such that a portion of the electrode layer is exposed as a sensing surface.

With reference to FIGS. 2A, B, C, and as is described further herein, layer 2 starts as the inert layer, but when it is functionalized by the capture agent it becomes the binding layer, the full extent of which is the binding region.

In alternative embodiments, the sensing surface is on an upper surface of a surface structure protruding from the support substrate. For example, FIG. 2B illustrates a sensing surface (defined as the exposed an upper portion of the surface structure) with an apex 6 on a surface structure 4 with a convex cross-section and FIG. 2C illustrates a sensing surface on a surface structure 4 with a triangular cross-section having an apex 6.

Preferably the surface structure comprises a sensing surface defined (i.e. bounded by) the binding layer or inert layer. Preferably each surface structure comprises a single sensing surface. Preferably the sensing surface is separated from other sensing surfaces by the binding layer or inert layer. Preferably the surface structure protrudes through the binding layer or inert layer. The inventors have found that one advantage of the invention where it comprises surface structures extending above the binding layer or inert layer is that the detection of electroactive species at the sensing surface is enhanced compared to a sensing surface that is flush with or below the upper surface of the binding layer or inert layer. This enhancement is a beneficial feature of preferred aspects of the invention.

Figure 11:
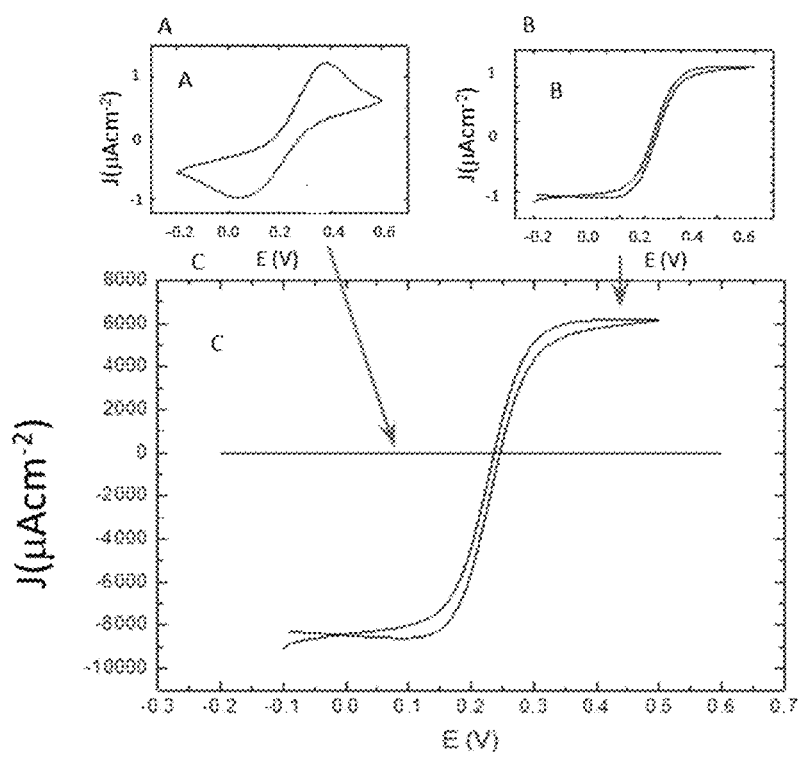
FIG. 11 shows a comparison between the current density ranges observed for a flat sensing surface versus an array of sensing surfaces on tips.
Figure 26:
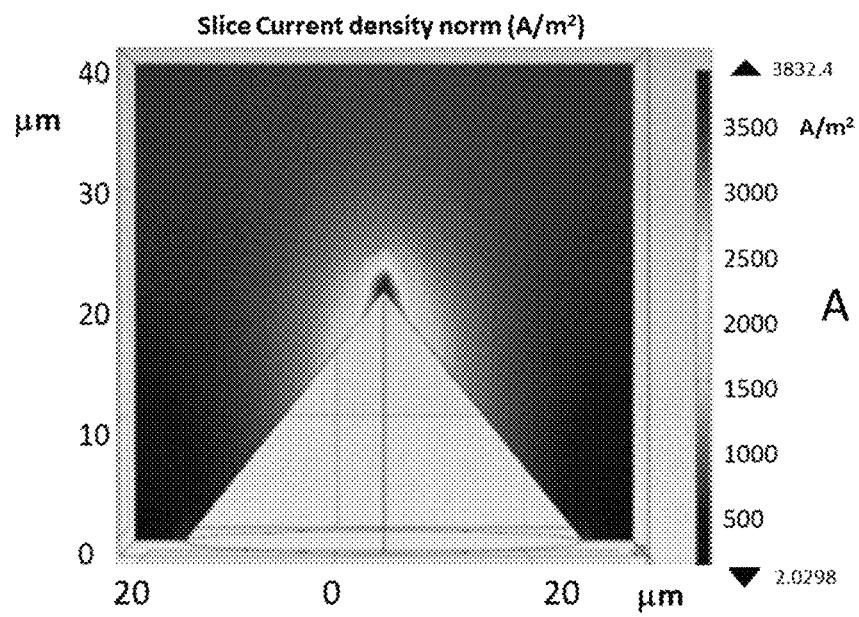
FIG. 26 shows a computer model of current density on a conductive surface having a surface structure with a triangular cross-section. The darker colour at the apex of the structure indicates a greater focusing of current density. The same figures are shown in colour (A) and black and white (B).
Figure 26:
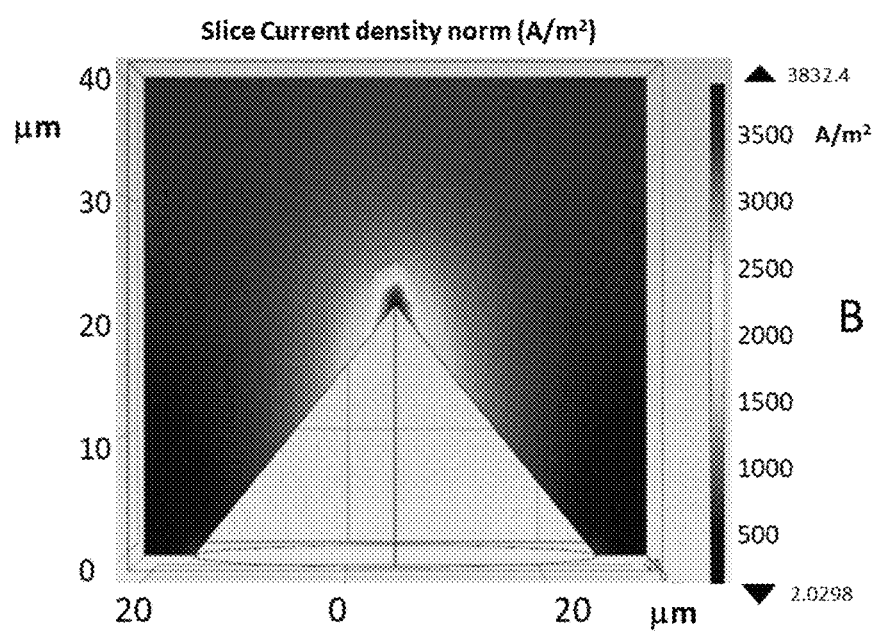
Figure 27:
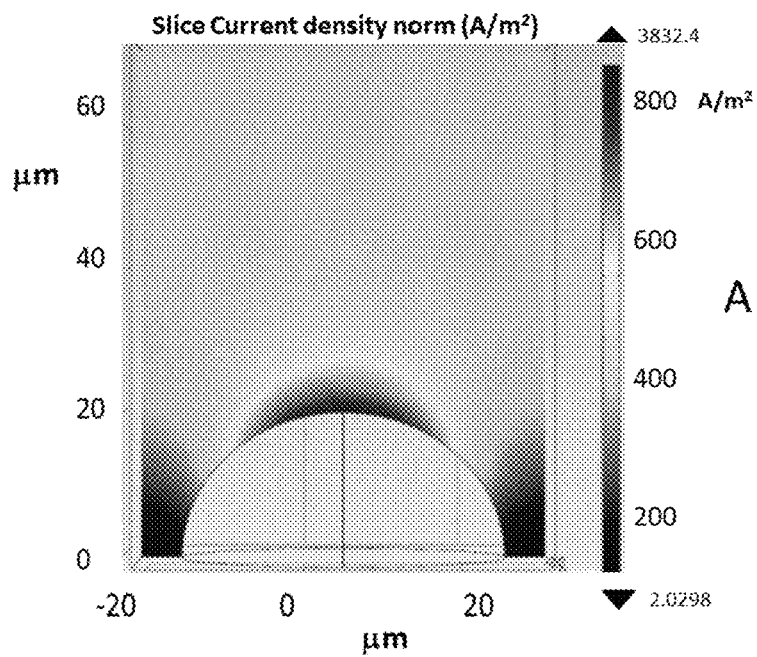
FIG. 27 shows a computer model of current density on a conductive surface having a surface structure with a semicircular cross-section. The darker colour at the apex of the structure indicates a greater focusing of current density. The same figures are shown in colour (A) and black and white (B).
Figure 27:
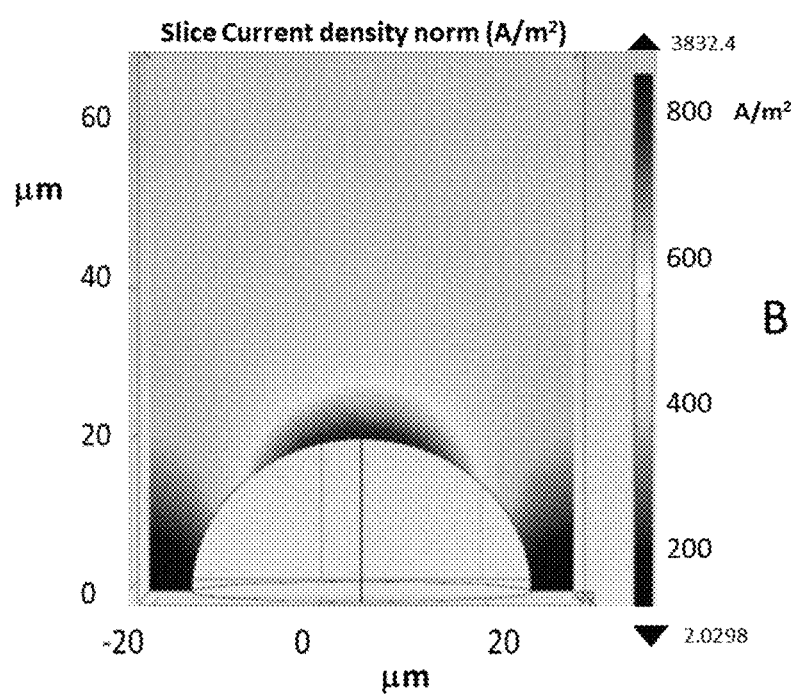

FIG. 11 shows the separate (A and B) and overlapped (C) cyclic voltammograms for both flat (A) and tip (B) electrodes for Ferrocyanide (0.1 mol) in phosphate buffer relative to a Ag/AgCl reference electrode. The cyclic voltammetry traces shown take into account the relative area of the electrodes and demonstrates the dramatic increase in the signal, and hence signal to noise obtained for an array of 7 μm tips verses a flat electrode. The tips are pyramids with a base that is a 7 micron×7 micron square and the height is around 5 micron. The inset figure A shows a response range of approximately 2 $\mu Acm^{-2}$. In contrast, the inset figure B shows a response range nearly 8000 times larger at $-16000$ $\mu Acm^{-2}$ for the same surface area. This effect occurs in microelectrodes due to spherical diffusion towards the tips, rather than planar diffusion which is seen for a flat electrode (refer also to FIGS. 26 and 27).

Preferably, the surface structures are separated from each other by about 50 nm to about 2000 μm; about 50 nm to about 1000 μm; about 100 nm to about 1000 μm; about 250 nm to about 1000 μm; about 5 nm to about 750 μm; about 5 nm to about 500 μm; about 5 nm to about 100 μm, apex to apex. Preferably the separation distance is uniform.

Preferably, the width of the surface structure of any embodiment of the invention where it joins the support substrate is between about 20 nm to about 5000 μm. More preferably, about 40 nm to about 4000 μm; about 55 nm to about 3000 μm; about 75 nm to about 2500 μm; about 100 nm to about 4000 μm; about 250 nm to about 3500 μm about 20 nm to about 3500 μm; about 2 nm to about 4000 μm; about 20 nm to about 2500 μm; about 20 nm to about 4000 μm; about 20 nm to about 3000 μm; about 20 nm to about 2000 μm.

Preferably the width of the apex of each surface structure is preferably between about 1 nm to about 5000 micron, more preferably between about 10 nm to about 10 micron, or about 20 nm to about 2 micron, or about 30 nm to about 1 micron. The width of the apex of each surface structure being less than where it joins the support substrate, for example for an apex of width of about 1 nm, the width where it joins the support substrate could be great than about 20 nm.

The sensing surface is adapted to contact a sample. This means that when the sensor is in use, the sensing surface is exposed to the sample without impediment which would hinder detection of a detectable response. Preferably the sensing surface is on an upper surface of the electrode layer. The sensing surface is the surface that receives or donates electrons to the electroactive species thus resulting in a detectable response. Preferably the sensor comprises a plurality of surface structures each with a sensing surface. The plurality of sensing surfaces are connected to each other and to a measurement electrode to measure the detectable response caused by binding of the target analyte to the binding agent. In some embodiments, the connected sensing surfaces will form a sensing group and there may be one, two or more sensing groups. The sensing surfaces of each sensing group may be clustered in a particular region of the sensor, or they may be interspersed with other sensing surfaces from other sensing groups. The sensing groups are electrically isolated from each other and the detectable response at each sensing group may be measured independently of other sensing groups. This arrangement of sensing groups enables the sensor to provide control groups, internal replication, and sensing groups which detect different target analytes or are connected to different binding agents. Multiple electrode layers or sensing groups may be formed by splitting the electrode layer. This can be achieved according to any means known to those of skill in the art, but may include lithographic etching, lasering, or shadow masking.

FIG. 12A shows a sensor adapted to detect three different target analytes on three electrode layers 123 electrically isolated from one another. A channel 124 is defined to allow the sample to pass from the inlet 121 to the outlet 122 over the sensing surface shown in FIGS. 12B and 12C. FIGS. 12B and 12C are the scanning electron microscopy images of a single array (sensing group) and a single sensing surface respectively.

In one embodiment, the binding region is on a different plane to the sensing surface. In this embodiment, the support substrate would have a planar arrangement, for example a channel with the sensing surface on one side of the channel and the binding region on the bottom of the channel. This configuration is intended to be within the scope of the invention and other embodiments described herein may be adapted to achieve any form of planar arrangement of the sensor.

In another embodiment, the binding region is in a separate compartment of the sensor or in a different position, orientation or level to the sensing surface such that the two are separated by the separation distance as described herein. Preferably the binding region and sensing surface are within a microfluidic or fluidic channel and adapted to be connected via a microfluidic or fluidic channel. The connection of these components enables the electroactive species generated following binding to diffuse or be otherwise transported (e.g. by pumping) to the sensing surface to generate a detectable response.

In one embodiment, the method comprises deposition of two or more discrete electrode layers to form two or more sensing groups. During production of the sensor, the electrode layers are separated by using a masking process, for example a shadow mask during sputtering of the electrode layer onto the support substrate/surfaces structures. The shadow mask prevents the conductive electrode layer from being deposited in defined areas therefore ensuring that the electrode layers are electrically isolated from one another. This is shown in the example in FIG. 12A.

In one embodiment, the electrode layers are electrically isolated from the binding region or at least one other electrode layer with an isolating material or gap.

The width of the gaps can range from adjacent (nanometer distance) to about 50 cm and can be connected via tubing.

In one configuration, the solution goes from the magnetic bead capture to a solenoid valve and then to the measurement electrode. As such there is tubing between the magnetic bead collector and the solenoid valve and back to the sensor, this tubing could be about 20-50 cm. In another configuration the magnetic bead capture is connected to the measurement electrode via a microfluidic channel which is much shorter (about 2-5 cm)

The isolating material can be the inert material, but may also be formed by the tubing lying between the electrode layer and the binding layer.

Preferably the surface structure(s) comprises an apex at the top of the surface structure. The apex may be on any form of surface structure with a highpoint. An apex allows rapid diffusion of electroactive species to the sensing surface on a surface structure.

In some embodiments, the apex is on a surface structure that has an upper portion with a contoured surface and at least one lower portion with a differently contoured surface. The upper portion is intended to refer to a portion of the surface structure that extends above an upper surface of the binding layer or inert layer. In some embodiments, the surface structure or the upper portion thereof is dome-shaped, cone-shaped, pyramid-shaped, papilliform, ridge-shaped, polyhedron-shaped or flat.

Preferably a cross-section of the surface structure along a plane orthogonal to a top surface of the support substrate is a triangle, a convex semi-circle or papilliform.

Preferably a cross-section of the surface structure along a plane parallel to a top surface of the support substrate is a substantially triangular, substantially circular or substantially square.

Preferably a cross-sectional area of the surface structure diminishes along an axis that is orthogonal to a top surface of the support substrate.

Most preferably the surface structure is a cone, pyramid, or ridge or combinations of these.

Preferably the surface structure comprises an upper portion with a surface that is convex. Preferably the surface of the upper portion is tapered to an apex (e.g. like a pencil) or rounded to an apex (e.g. a dome).

Preferably a cross-section of the upper portion is a triangle, a square, a convex semi-circle, papilliform or flat.

In one embodiment, the surface structures are uniformly arranged on the support substrate. In another embodiment, the surface structures are randomly arranged on the support substrate.

In another embodiment, the surface structure comprises a smooth surface. Using a smooth surface structure means that the sensing surface tracks the contours of the surface structure which enables reproducible measurements to be made from the sensing surface. In addition, where a binding layer, a SAM, an inert layer or a protective coating is attached to the sensing surface, the thickness of said layer, SAM or coating will be substantially constant thickness. In addition, it is preferable that the surface structures are regular shapes. Preferably a plurality of surface structures are substantially identical in shape and surface area. Regular surface structures with replicate shape and surface area enable reproducible measurements across sensing surfaces on the same array, and also between arrays.

The number of surface structures (and therefore sensing surfaces) that make up the sensor will depend on the application. In one embodiment, the sensor comprises at least one surface structure. In some embodiments, a plurality of surface structures are employed, each with a sensing surface to form a sensor array. Such arrays may range from a 2×2 array to arrays of billions×billions, to arrays of 1×billions or any other arrangement of surface structures. Preferably the sensor comprises an array comprising greater than 100, greater than 10000 or greater than 1000000 surface structures.

The size of each sensing surface can be measured by its surface area. Preferably the area is between 1 $nm^2$ and 10 $mm^2$. In one embodiment, the area of each sensing surface is between about 30 $nm^2$ and 50 $\mu m^2$ or between about 50 $nm^2$ and 10 $\mu m^2$. Where the surface structure comprises a ridge, the ridge is preferably between about 100 nm and 1 cm long. The preferred area of a single tip is between about 1 $\mu m$ and about 20 $\mu m$ as it has been found that this range is easily made. It is preferred to have a total areas of tips at 1 mm-3 mm as from a practical perspective this is relatively easy to measure in the nA range.

Preferably the surface structure is formed on the support substrate by hot embossing, CFT processing, injection moulding, laser induced crosslinking, roll forming, stamping or lithographic techniques.

Preferably the surface structure(s) are formed with an apex at the top of the surface structure. Further embodiments of the surface structure are defined in the first aspect and are relevant to the second aspect.

Preferably the sensing surface comprises a protective coating. In alternative embodiments, the binding layer or inert layer is the protective coating. The protective coating functions to minimise or prevent non-specific binding of binding agents and sample components to the surface which it protects. Preferably the protective coating comprises a self-assembled monolayer (SAM), ethanolamine or protein layer such as BSA or OVA The protective coating is preferably applied to the sensor before the binding agent is applied to the sensor. The protective coating is then preferably removed prior to detection of the electroactive substrate. This ensures that any interference of the protective coating with the detection of the response at the sensing surface is minimised. The protective coating also minimises the binding of proteins and matrix effects that result from application of the sample (e.g. blood, milk etc.) to the sensing surface.

Methods of application of the SAM will be known to those of skill in the art. In one embodiment, the SAM is applied by dissolving the SAM in ethanol then applying the SAM/ethanol mixture to the sensor surface for a period, for example 10 minutes to 1 hour. The excess is then washed off. The SAM can then be removed from the sensing surface by the application of a reductive potential of −400 mV relative to Ag/AgCl. If the protective coating is a protein such as avidin or BSA or even the antibody capture agent, it may not be removed prior to measurement, but it does not impede the electrical measurement.

In one embodiment, a protective coating is applied to the sensing surface prior to application of the binding agent. Preferably the protective coating is a SAM made from an alkanethiol ($HS(CH_2)_xCH_3$ where X=0 to 16, (X=0 1 2 3 4 5 6 7 8 9 10 11 12 13 14 15 16 in alkane, alkene, alkyne, aromatic form, and combinations of these) and deposited from an ethanol solution. Preferably the removal of the protective coating is carried out prior to the final measurement of the electroactive species (e.g. TMB).

In another embodiment, the protective coating is applied as a binding layer to minimise or prevent non-specific binding of binding agents and sample components to the electrode layer. In this embodiment, the functionality of the tips to concentrate charge density (current or voltage) is utilised to enable deprotection of the sensing surfaces prior to conducting the sensing assay.

Preferably the protective coating is removed by applying a reductive potential of between −200 mV and −1V, and preferably −400 mV relative to a silver/silver chloride reference electrode. The application of the −400 mV also generates $H_2O_2$ which is preferable to regenerate the ligand catalyst (e.g. HRP).

In one embodiment of the invention, the inventors have found that binding agents (including capture agents) can be effectively attached to the binding region by attaching them to magnetic particles. The magnetic particles are attracted to the surface of the binding region by way of a magnetic field and while the magnetic field is active, the particles are "attached" to the binding region. Once the magnetic field is removed or deactivated, the particles become "detached" from the binding region surface and are free to be removed in a washing fluid. In this embodiment, the binding agent essentially comprises two or more agents, the first part interacting with the binding layer to attach to the binding layer, and the second or further part (a "capture agent") interacting with the target analyte in the sample while being attached to the first part of the binding agent.

In this embodiment of the invention, the binding layer is attached to the surface of the magnetic particles rather than on the surface of the binding region itself. The features of the binding layer and the binding agents and capture agents that may attach to it are otherwise the same as those described herein. The sensing surfaces and surface structures have been shown by the inventors to be effective in detecting a detectable response following binding of target analytes to the binding/capture agents.

The adaptation of the binding region to accommodate magnetic particles eliminates the need to attach binding/capture agents to a binding layer/region during production of the sensor. This has significant advantages such as reduced cost of materials. The ability to quickly attach and detach different binding/capture agents to the sensor allows easy testing for multiple target analytes on the same sensor and within the same sensor system or microfluidics device.

In one embodiment, the invention provides a method of detecting binding to a target analyte in a sample to a binding agent, the method comprising:
 a. attachment of a first set of magnetic particles to the binding region with a first binding agent;
 b. performing the method of detecting binding of a target analyte in a sample to the first binding agent including activation of a first magnetic field;
 c. deactivation of the first magnetic field to remove the first set of magnetic particles;
 d. attachment of a second set of magnetic particles to the binding region with a second binding agent via activation of a second magnetic field; and
 e. performing the method of detecting binding of a target analyte in a sample to the second binding agent.

The method of detection of binding of a target analyte is as previously described but preferably comprising: providing a sensor comprising a support substrate; at least one surface structure protruding from an upper surface of the support substrate, wherein the surface structure includes an electrode layer; a sensing surface on the electrode layer, wherein the sensing surface is adapted to contact a sample; a binding region on the support substrate, wherein the binding region is separated from the sensing surface and comprises a magnetic field; attaching a magnetic particle or particles to the binding region, wherein the magnetic particle or particles comprises at least one binding agent attached to a binding layer on the magnetic particle or particles;

contacting the binding agent with a sample containing a target analyte; allowing the target analyte to bind to the binding agent to produce a detectable response at the sensing surface; measuring a change at a measurement electrode electrically connected to the at least one sensing surface; wherein binding of the target analyte to the binding agent produces an electroactive species which mediates the detectable response at the sensing surface.

The first set of magnetic particles may have a binding agent/capture agent thereon suitable to detect a particular target analyte in a sample. The second set may have a binding agent/capture agent thereon suitable to detect the same or another target analyte in the sample. Further sets and steps of attachment and detachment are also envisaged. The convenient method of attaching and detaching the by activation/deactivation of the magnetic field enables the same generic sensor to be used for multiple detection assays.

Figure 23:
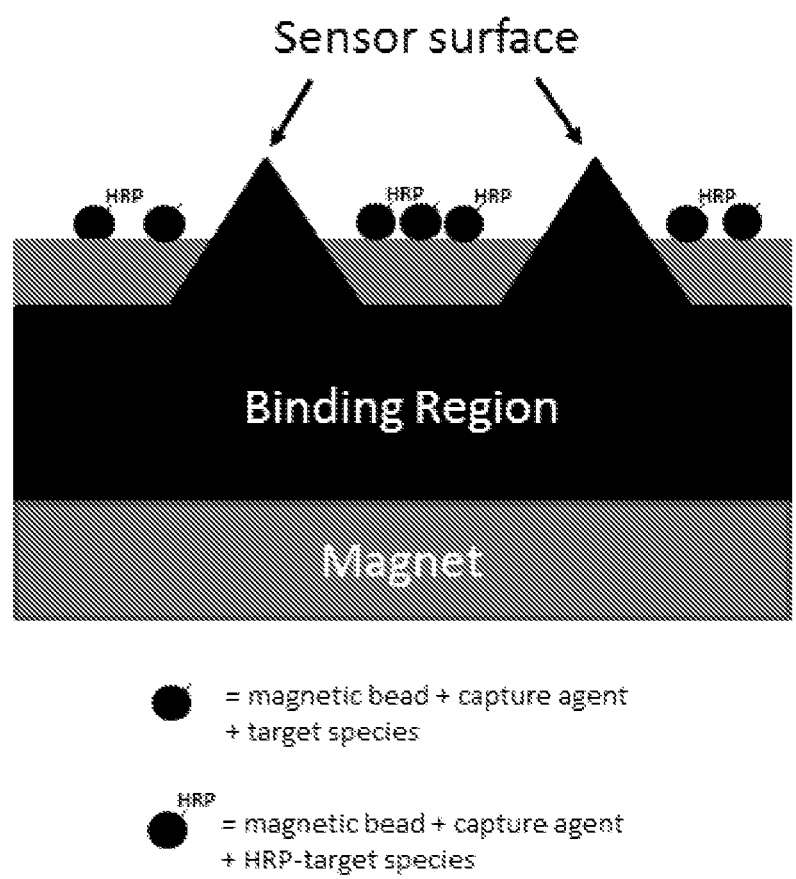
FIG. 23 shows an embodiment of the invention in which magnetic particles are attached to a binding region established by a magnet under the support substrate.
Figure 24:
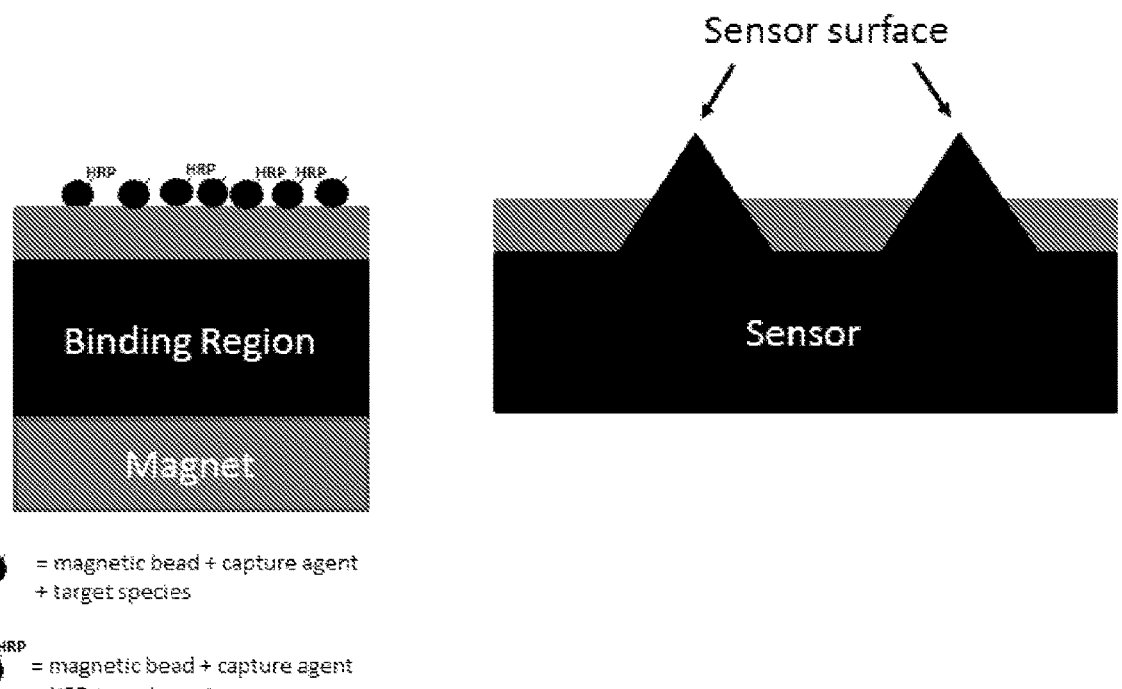
FIG. 24 shows an embodiment of the invention in which magnetic particles are attached to a binding region established by a magnet under the support substrate, and where the sensing surface is separated from the binding region by a separation distance.

FIGS. 23 and 24 show examples of the attachment of magnetic particles. FIG. 23 has the magnetic element directly under the surface of the sensor. In this configuration it is anticipated that the magnetic particles will reside between adjacent surface structures. The depth of the particles will depend on the relative sizes of the surface structures and the particles.

As can be seen in FIG. 23, the use of a magnetic field to attach the particles to the surface of the sensor enables a layer of substantially constant depth across the surface of the sensor into which the surface structures of the array protrude. In some embodiments, the surface structures protrude above the layer of the particles. In other embodiments, the surface structures protrude into the layer of particles. In both these embodiments, the surface structures are effective at detecting a detectable response elicited following binding of a target analyte in a sample to a binding agent attached to the magnetic particles.

FIG. 24 has the magnetic element separated from the sensing surface. Preferably the configuration depicted in FIG. 24 would be within a microfluidic environment and the sensing surfaces would be downstream from the binding region with the magnetic element.

In alternative embodiments, the surface structures and their respective sensing surfaces are located away from the binding region where binding of the target analyte to the binding agent occurs. Preferably the sensing surface is separated from the binding region by a separation distance as described herein. In one embodiment, the sensing surface(s) is on one surface of a compartment and the binding region is on an opposing or adjacent surface of the same compartment. The surfaces may be on the same plane or a different plane or in different orientations to each other.

Figure 30:
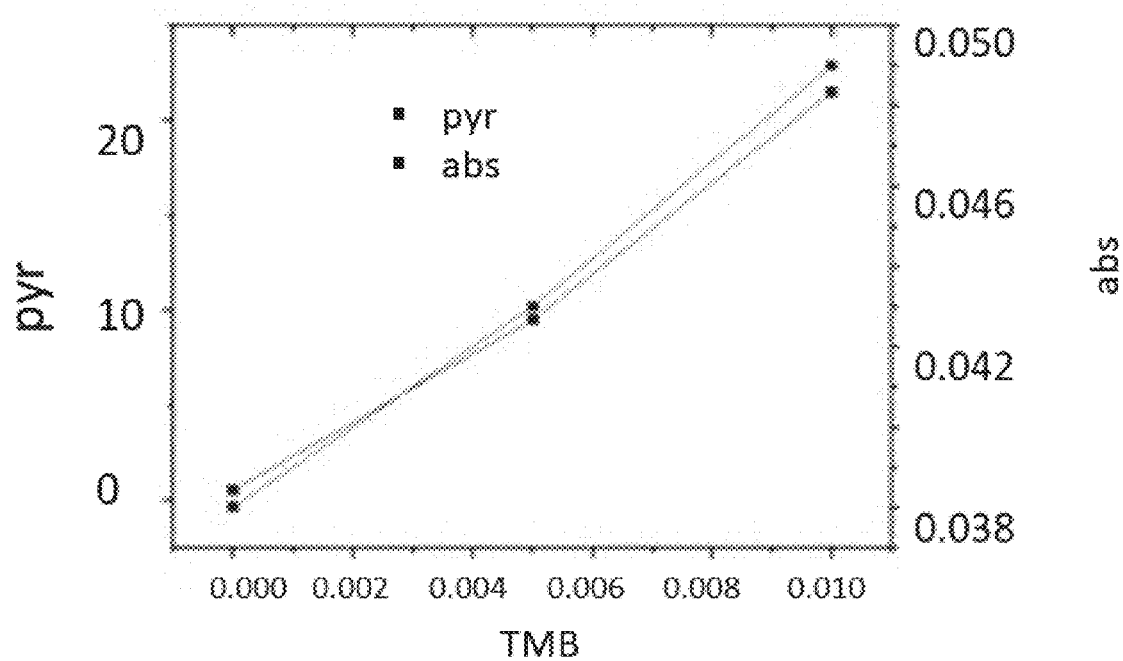
FIG. 30 shows the correlation between the optical and electrochemical response for different TMB concentrations generated by initial capture and wash, followed by release and recapture under the electrochemical sensor—Example 10.

A further embodiment, as discussed in example 10 and FIG. 30, would be to capture the magnetic beads on a first capture site as in FIG. 24, and wash the beads. Then to release the beads and capture them on a second magnetic region placed under the sensor as in FIG. 23 where the sensing is performed.

The magnetic field is established by a magnetic element on, in, or under the sensor support substrate. For this embodiment of the invention, the binding region is defined as the area to which the magnetic particles are attracted and "attached" to the surface of the sensor.

The magnetic element may be any suitable element which produces a magnetic field and attracts the magnetic particles. For example the magnetic element may be a ferrimagnet or an electromagnet.

Magnetic particles suitable for use in the present invention will be known to those of skill in the art including Dynabeads (Invitrogen/ThermoFisher Scientific), Chromospheres, Biocloneand associated literature. Such particles may be paramagnetic or ferromagnetic and will have a binding layer on their surface. This binding layer is also referred to herein as a functional surface. The binding layer is adapted to bind one or more binding agents as described hereinbelow.

In order to establish the magnetic field, the magnetic element is positioned close to the surface of the substrate, preferably in a microfluidic environment the magnetic element is sufficiently close to the channel to cause any magnetic particle within the flow path to achieve attachment to the upper surface of the binding region. In some embodiments, a magnetic element positioning means is held to a lower surface of the sensor to achieve accurate positioning of the magnetic element and resultant field (as seen in FIG. 23). Accordingly, in some embodiments, the sensor of the invention comprises a magnetic element positioning means. Preferably the magnetic positioning means is a magnet. Preferably the magnet is a permanent magnet such as formed from neodymium iron boron, samarium cobalt, alnico, and ceramic or ferrite. Preferably the magnet is an electromagnet. Preferably the magnetic positioning means is positioned in such a way as to maximise the influence of the field to capture the particles as a monolayer on the surface of the binding region.

As referred to herein, the binding layer is a layer on a magnetic particle. It will be appreciated by those of skill in the art that the term "above" or "on" the support substrate does not imply that the magnetic particle is attached directly onto the support substrate. Layers, magnetic particles or sensing surface may be indirectly on the support substrate with one or more intervening layers, for example an electrode layer.

It could also be on the encapsulating layer of a microfluidic device In use, the binding agent binds with a particular target analyte to generate a detectable response.

In other embodiments of the present invention, (shown in FIGS. 2A to 2C), the binding layer 2 is deposited on an upper surface of the electrode layer. In a further embodiment shown in FIG. 2D, an upper portion of the surface structure 4 is exposed to form a sensing surface 4a. The binding layer 2 is deposited on an electrode layer 1 on a support substrate 8. In an alternative embodiment shown in FIGS. 5A and 5B, the binding layer is deposited on an upper surface of a support substrate (not shown). In these embodiments, the binding layer is not in contact with the electrode layer 3. Instead, it is adjacent to the electrode layer 3, optionally with an isolating material or gap 5 between them. In these embodiments of a similar invention, the binding layer has a similar purpose to the binding layer found on the magnetic particles and shown in the embodiment shown in FIGS. 23 and 24.

In one embodiment, a binding layer or inert layer is deposited around the surface structures such that an upper portion of the surface structure surface is exposed as the sensing surface (around the apex of the surface structure). In one embodiment, the extent of the binding layer or inert layer defines an aperture through which the sensing surface is exposed to the sample. Where surface structures with a generally tapering configuration are used, the thickness of the binding layer and the angle of the taper determines the area of the sensing surface exposed to the sample. For example, FIGS. 2B, 2C, 2D, 4, and 6D show that the binding layer or inert layer 2 covers a portion of the surface structure 4 protruding from the support substrate or electrode layer 1. This feature of the invention enables very small sensing surfaces to be defined with only an upper portion of the surface structure exposed as a sensing surface. The surface structure 4 preferably has an apex 6. The inventors have found that using very small sensing surfaces increases the sensitivity of the sensor to changes in the response detected at the sensing surface as shown in FIG. 11 and as previously described in relation to that Figure. The small size of the electrodes (at less than about 30 µm square; preferably 5 µm to 30 µm, 10 µm to 30 µm, 15 µm to 25 µm, 5 µm to 25 µm square) it has been found, results in microelectrode behaviour, which as the size reduces provides increasingly rapid diffusion times and greater signal to noise.

Preferably the binding layer comprises a material which binds to a binding agent. Preferably the binding layer comprises a cross-linked polymer, a photo-resist or a self-assembled monolayer (SAM). Preferably the cross-linked polymer is an epoxy-based negative photoresist such as SU-8. Other suitable binding layer materials will be known to those of skill in the art such as alternative positive and negative photoresists and SAMs comprising terminal molecules selected from the group consisting of azides, amines, carboxylates, aldehydes, ketones, esters or carboxylic acids or mixtures thereof. Such molecules being present at the terminal end of the SAM. The binding layer may be multiple layers, but preferably the binding layer comprises a single layer of the aforementioned materials. It is also important that the attachment of the binding agent to the binding layer is strong and not removed by washing or exposure to the sample. Preferably the attachment is covalent, however it could also be electrostatic.

The binding layer may be deposited with a pre-coating for efficiently binding particular binding agents. For example the pre-coating may comprise protein A, G or A/G, Protein L, Secondary Antibodies, NeutrAvidin Protein or Streptavidin, Biotin, Biotin-Binding Protein Ni2+ or Glutathione, Maleic Anhydride, Maleimide or anti-GST. Without wishing to be bound by existing knowledge or theory, the pre-coating may comprise protein A, G or A/G for binding antibodies via their Fc regions. Protein L for binding Fab antibody fragments and single-chain variable fragments (ScFvs) through the kappa light chain. Secondary Antibodies for binding antibodies as an alternative to Protein A, G or L. NeutrAvidin Protein or Streptavidin for binding biotinylated proteins, peptides or nucleic acids. Biotin for binding avidin, streptavidin or NeutrAvidin. Biotin-Binding Protein Ni2+ or Glutathione for binding recombinantly expressed proteins containing polyhistidine or glutathione S-transferase. Maleic Anhydride for binding large or small amine-containing molecules. Maleimide for binding sulfhydryl-containing molecules or anti-GST for capturing proteins expressing glutathione S-transferase (GST).

Preferably the binding layer thickness is from about 0.1 µm to about 1 µm, more preferably from to 0.2-0.4 µm. the thickness may also be between about 0.2 µm and about 0.8 µm, about 0.4 µm and about 0.7 µm, about 0.3 µm and about 0.9 µm, about 0.1 µm and about 0.6 µm.

The binding region is an area of the support substrate where binding of the target analyte to the binding agent occurs. In some embodiments, the extent of the binding region is defined by the extent of a magnetic field used to attract and attach magnetic particles to the support substrate. In embodiments where magnetic particles are intended to be attached, the binding region comprises a region of the support substrate adapted to attach one or more magnetic particles. Preferably the binding region is defined by an area of magnetic field established by a magnetic element on, under or within the support substrate. Alternatively, the magnetic particles may be attached to an inert layer on the support substrate. The inert layer is preferably a photoresist or SAM. The binding region may also be defined by a magnetic element positioning means intended to receive a magnetic element, or hold a component that is used to direct or focus a magnetic field to a specific region—i.e. the binding region. Preferably the magnetic positioning means is a magnet. Preferably the magnet is a permanent magnet such as formed from neodymium iron boron, samarium cobalt, alnico, and ceramic or ferrite. Preferably the magnet is an electromagnet. Preferably it is a magnet placed so that the influence of the field is maximised to ensure capture of all the beads as a mono-layer on the surface.

In the present invention, the binding region is separated from the sensing surface by a separation distance. The separation distance is limited to a distance that still enables the sensing surface to sense the electroactive species generated (e.g. TMB) following binding of the target analyte to the binding agent(s). This aspect of the invention is key to providing a sensor which reduces the detection interference caused by binding of a binding agent to the binding region, or the target analyte to a binding agent.

Preferably the separation distance is such that detection of the detectable response at the sensing surface can be made without being attenuated by the binding layer or binding agent(s).

Preferably the separation distance is between about 1 nm and about 50 mm. In particular embodiments, the separation distance is between about 30 nm and 5 mm, between about 100 nm and 5000 µm, between about 1 µm and 1000 µm or between about 20 µm and 100 µm. The separation distance may be between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

Preferably the binding region is inert to the components of the sample applied to the sensor.

Suitable binding agents will typically comprise antigens specific for a particular antibody (target analyte). However alternative binding agents will be known to those of skill in the art, for example antibodies, aptamers or antisense, antibody fragments, single-chain variable fragments, biotinylated proteins, peptides, nucleic acids (ssDNA, RNA, mRNA, miRNA), avidin, streptavidin, NeutrAvidin, recombinantly expressed proteins containing polyhistidine or glutathione S-transferase, large or small amine-containing molecules, sulfhydryl-containing molecules or proteins expressing glutathione S-transferase (GST).

Preferably a blocking agent is applied to the sensor following deposition of the binding agent. The effect of the blocking agent is to minimise or prevent non-specific binding of sample components on other portions of the binding layer, or any unreacted areas of the binding region or binding layer or electrode layers. Preferably the blocking agent is ethanolamine or a protein such as BSA or OVA.

Preferably a protective coating is applied to the sensor. Preferably the protective coating binds preferentially to the electrode layer or the binding layer due to an electrical potential being applied to the binding layer or electrode layer. The protective coating may be any coating but in particular embodiments it consists of a SAM. In this embodiment, thiol groups in the SAM bind to the surface while not binding (or binding to a lesser degree) to undesired areas for example those areas where an electrical potential is not applied.

Figure 13:
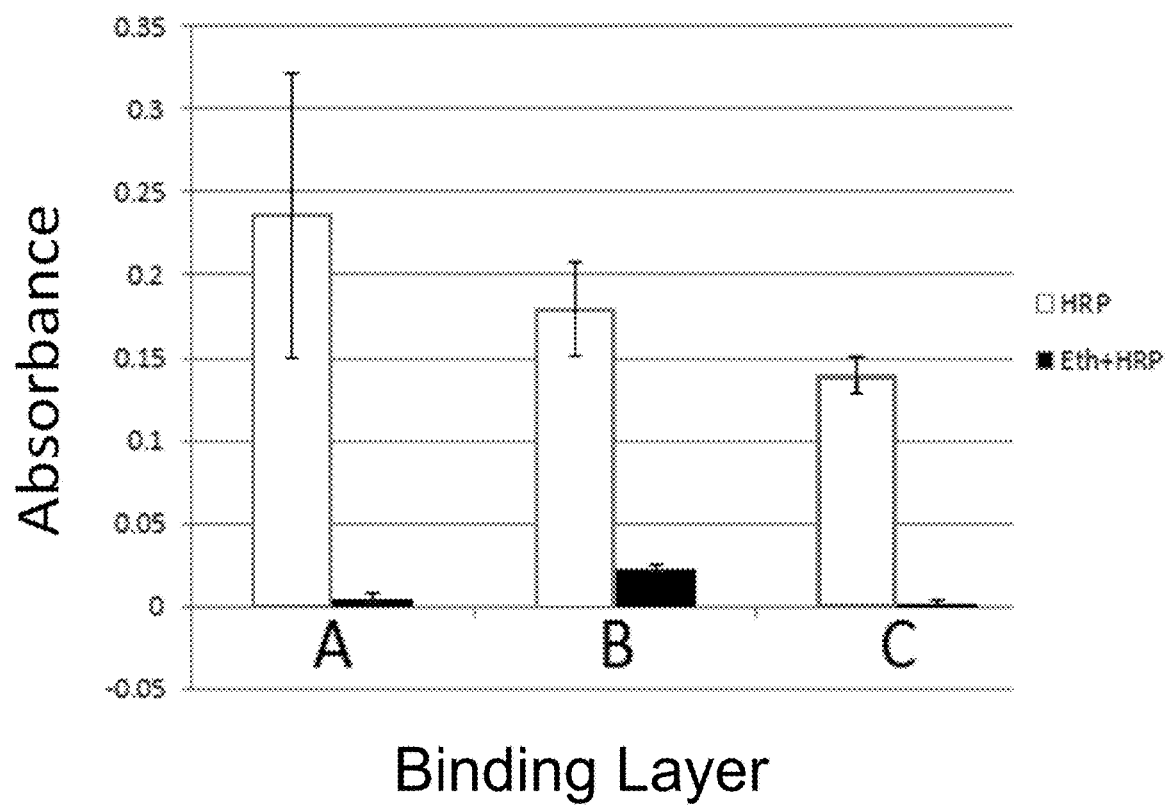
FIG. 13 shows the effect of blocking with ethanolamine on HRP absorption on (A) Gold, (B) SU8, (C) SU8 after reactive ion etching, both without (left hand column, no shading) and with (right hand column, with black shading) a blocking agent.

FIG. 13 shows the effect of a blocking agent (ethanolamine) on ligand (HRP) absorption on different binding layers. In this embodiment, the binding layers are A—Gold, B—SU8, and C—SU8 after reactive ion etching. Clearly the blocking agent has a substantial and significant effect in reducing the absorption of the ligand onto various surfaces.

The application of the binding agent to the binding layer (e.g. the functional surface on a magnetic particle), and the location of the application is controlled according to known processes. For example the application may be controlled by an automated control system or defined microfluidically. In an alternative embodiment, the particles may be prepared by washing/flooding the particles with the binding agent. In some embodiments, the sensor may be positioned on the support substrate with other sensors to produce a microelectrode array.

The binding agent undergoes binding to the functional surface on the binding layer according to known protocols (for example those outlined in Blagoi et al. 2008 to which the reader is directed by way of reference and support). Preferably the binding agent is attached to the binding layer by way of electrostatic attachment or covalent bonding. In one embodiment, the binding layer comprises SU8 with pendant epoxy groups which bind to amines on the protein capture agents.

Preferably the binding agent further comprises a capture agent. In this embodiment, the binding agent essentially comprises two or more agents, the first part interacting with the binding layer to attach to the binding layer, and the second or further part (a "capture agent") interacting with the target analyte in the sample while being attached to the first part of the binding agent. Where binding agents are referred to herein, it will be appreciated by those of skill in the art that such binding agents may be composed of multiple parts and the term "binding agent" is intended to include these multiple parts or additional capture agents, which may be applied in different steps to make up the binding agent.

In one embodiment, the binding agent comprises a biotin-binding protein, for example avidin. In this embodiment, the capture agent comprises an aptamer. In another embodiment, the binding agent comprises an antibody adapted to bind to an antigen present in the sample to generate an electroactive species.

In one embodiment, the binding region of the sensor is isolated from the sensing surface on the electrode. FIG. 5 shows an embodiment of the invention in which the binding layer 2 and the sensing surface are isolated (at 5) and adjacent to each other, either in a linear (FIG. 5A) or circular (FIG. 5B) arrangement.

The sensors of the present invention can be deployed in a no-flow environment, for example in an open container. The proximity of the sensing surface to the binding region ensures that sufficient electroactive species generated as a result of binding will result in a detectable response.

However, in some embodiments it is preferable to use the sensor in a flow environment. For example if the sensor is used in a fluidic/microfluidic environment in which channels direct the flow of the sample. In a flow environment, the electroactive substrate reaches the sensing surface quickly which should ensure that maximum detectable response is detected. FIG. 5 shows an embodiment of the invention in a flow environment in which the arrows indicate the direction of the flow. In this embodiment, in which the sensing surface on the electrode is isolated from the binding region by a gap 5 or an isolating material such as a photoresist or SAM layer, it is preferable to have a flow to enhance the number of electroactive species detected at the sensing surface.

The sensors of the present invention will preferably be deployed in an electrolyte solution. Preferably the solution of any embodiment of the invention comprises an electrolyte. Preferably the solution is water but can also be an organic solvent such as alcohol, ether, acetone and DMSO. Preferably the electrolyte comprises a buffer used typically in biology, including non-buffered salt solutions such as NaCl, or acid and base solutions H2SO4, HNO3, NaOH. Preferably the solution of any embodiment of the invention is selected from the group consisting of fresh water, sea water, blood, urine, milk or saliva. In one embodiment, the solution of any embodiment of the invention further comprises a reference electrode.

In one embodiment, the solution further comprises a reference electrode. The reference electrode assists with measurement and control of the voltage while current is flowing, for example during the sensing process. Properties and positioning of the reference electrode will be known to those of skill in the art.

Preferably the electrode array and methods of its use further comprises a reference electrode in contact with the solution. Preferably the reference electrode comprises an electrode formed from Ag/AgCl, SHE, NHE, RHE, SCE.

An extension of the concept of isolating the sensing surface from the binding region is shown in FIG. 6. In these embodiments, multiple sensing groups (electrodes 1, 2, 3 for example) are used to detect a response from the binding of the target analyte on binding layer 2 to a binding agent X.

The binding layer 2 may be produced by methods known to those of skill in the art and described in more detail above. Although the surface structures (FIGS. 6C and 6D) are shown as having a triangular cross-section, it will be appreciated that other shapes and forms (as described above) will also be effective.

FIG. 6D shows a binding layer 7 between the sensing surfaces 4 of the surface structures that isolates the sensing surfaces from each other and bounds the sensing surfaces. This layer is masked or blocked with a blocking agent such as ethanolamine during application of binding agents so that it does not become a binding region. In effect, this portion of the binding layer can be thought of as an inert layer to prevent non-specific binding of target analytes or other sample components. The inert layer shown in FIG. 6D differs from the binding layer shown in FIG. 2C in that there is no functionalization with a binding agent of the inert material between the tips.

Preferably the inert layer is made from the same material as the binding layer. However, in another embodiment, the inert layer is made of a different material from the binding layer.

Where magnetic particles are attached to the surface of the sensor, the surface is ideally inert to the components of the sample fluid including the analyte to be detected. This means that it is substantially unreactive to typical components of the sample fluid.

If an electrically responsive inert layer or protective coating is also applied to the sensing surfaces on the surface structures, an electrical potential may be applied to selectively deprotect the sensing surface prior to sensing.

The inventors have found that having multiple sensing surfaces all electrically connected to form a microelectrode array enables a greater signal response to be detected. In addition, the inventors have found that minimising the surface area of the sensing surfaces increases the sensitivity of each sensing surface. This means that the signal to noise ratio of a sensing surface increases as the sensing surface area decreases (for example see FIG. 11). Electrical noise is present in any circuit, and becomes more evident at very small currents. As such, it is important to minimise the noise and to maximise the signal to noise ratio.

Accordingly, the inventors have found that a flat electrode is about 8000 times less sensitive than a sensing surface of the same nominal total area but reduced to an array of about 7 μm (plan view diameter) sensing surface tips by addition of a binding layer to define an upper portion of the surface structures as the sensing surface (as demonstrated in FIG. 11). Microelectrode behaviour starts to occur in the electrode as it gets smaller than about 30 μm (as previously referred to), and the size of the tip becomes sharp at the apex of less than 10 μm (1 μm to 10 μm; 1 μm to 8 μm; 3 μm to 7 μm; or 1 2 3 4 5 6 7 8 9 10 μm)

In use, the sensor comprises a measurement electrode electrically connected to one or more sensing surfaces or sensing groups. Preferably the measurement electrode is connected to a measuring means which measures a change in one or more of current, impedance, voltage, capacitance, resistance, conductance, magnetic flux or electric field. Suitable measuring means will be known to those of skill in the art, however, by way of example, the measurement electrode comprises an Ivium Compactstat, or Palmsens MultiEmStat. In some embodiments, the measurement electrode is used to protect or deprotect the sensing surface with a protective coating or inert layer. This embodiment has use in minimising non-specific binding of reaction components to the sensing surface and providing specific protection or deprotection of the sensing surface.

In one embodiment, an electrode is electrically connected to the magnetic element. This electrode will have the same functionality as the measurement electrode and may be used to attach or detach the magnetic particles to/from the binding region The measurement electrode is typically configured to also apply a positive or negative potential to the electrode layers. This can facilitate protection, deprotection or charge transfer to or from the electroactive species.

Preferably the sensor comprises part of a sensor system. The sensor system contains suitable wiring, electrodes and solutions to enable a sample to contact the sensing surface and a detectable response to be detected. The sensor system preferably comprises a container to retain the sample on the sensor surface. The sensor system also preferably further comprises a reference electrode and a counter electrode configured so as to contact the sample during detection of the detectable response. Preferably the reference and/or counter electrode are stationary and at a fixed distance from the sensing surface. Suitable systems and configurations would be known to those of skill in the art.

Preferably the counter electrode of any embodiment of the invention comprises a substantially inert conductive material. In this instance the term inert means that the counter electrode is substantially unchanged in mass and state following the establishment and passing of the current from the sensor to the counter electrode. Therefore an "inert" counter electrode is substantially unreactive with respect to the components of the solution. Preferably the counter electrode is formed from a material selected from the group consisting of a metal, Pt, Gold, carbon, graphite, graphene, carbon fibre, carbon nano-tubes, Bucky Balls, conducting polymer PPy, PA, PAcetylene. The counter electrode may be made of a solid layer or the conducting layer deposited onto a suitable support e.g. polymer glass, metal. Preferably the counter electrode of any embodiment of the first aspect is in a fixed orientation with respect to the surface structure.

Preferably the counter electrode of any embodiment of the first aspect is attached to the sensor. Preferably the counter electrode is held in an orientation to minimise differential in distance between each of the surface structures of the array. Preferably the orientation of the counter electrode is above an upper surface of the array. In these embodiments, the distance from the counter electrode to the apex of each surface structure is substantially equidistant. This minimises detection noise caused by the placement of the counter electrode.

Preferably the counter electrode of any embodiment of the invention comprises a substantially inert conductive material. In this instance the term inert means that the counter electrode is substantially unchanged in mass and state following the establishment and passing of the current from the electrode layer to the counter electrode. Therefore an "inert" counter electrode is substantially unreactive with respect to the components of the solution. Preferably the counter electrode is formed from a material selected from the group consisting of a metal, Pt, Gold, nickel, copper, iron, carbon, graphite, graphene, carbon fibre, carbon nano-tubes, Bucky Balls, conducting polymer PPy, PA, Polycetylene, stainless steel. The counter electrode may be made of a solid layer or the conducting layer deposited onto a suitable support e.g. polymer glass, metal. The counter electrode may be made of a solid layer or the conducting layer deposited onto a suitable support e.g. polymer glass, metal. Preferably the counter electrode is a bare metal (such as Au, Pt, Stainless steel, and/or copper), or an Au or Pt plated substrate (such as metal, polymer and/or glass). Preferably the counter electrode of any embodiment of the invention is in a fixed orientation with respect to the surface structure.

Preferably the counter electrode of any embodiment of the invention is attached to the electrode array.

Preferably the counter electrode is held in an orientation to minimise differential in distance between each of the surface structures of the array. Preferably the orientation of the counter electrode is above an upper surface of the array. In these embodiments, the distance from the counter electrode to the apex of each surface structure is substantially equidistant. This minimises detection noise caused by the placement of the counter electrode.

One embodiment is shown in FIG. 12A in which the reference electrode is shown on the left, three electrode layers (adapted to be connected to measurement electrodes) are shown in the middle and the counter electrode is shown in the right. Referring to FIG. 12A: there are 5 gold electrodes. The outer 2 are wider and are counter electrodes. The inner 3 are measurement electrodes and do the sensing. Each measurement electrode has an array of tips within a channel which do the actual measurement, it then continues under the epoxy layer as a flat gold, and then comes up to form the tips of the connector. The spacing of the different electrodes align with the electrodes within the off the shelf plug connector.

In some embodiments, the sensor system further comprises a magnetic element positioning means as described herein.

The sample itself may be prepared according to known methods. Although pre-processing of the sample is not generally required, the presence of certain proteins or other components may make a degree of pre-processing desirable to reduce viscosity or limit reactions or adherence to the sensor surface.

A buffer is typically added to the sample to ensure constant pH and an electrically conductive solution.

In another aspect, the invention provides a method of production of a sensor as described herein. In one embodiment, the method comprising:
   a. providing a support substrate with at least one surface structure protruding from an upper surface of the support substrate;
   b. depositing an electrode layer on an upper surface of the at least one surface structure;
   c. depositing an inert layer on the electrode layer to form at least one sensing surface on the electrode layer, wherein the inert layer comprises a material substantially inert to the components of a sample to be analysed;
   d. forming a binding region on the support substrate wherein the binding region is adapted to attach a magnetic particle to the support substrate by positioning a magnetic element on, in, or under the support substrate to establish a magnetic field capable of attracting the magnetic particle;
   e. optionally attaching a magnetic particle to the binding region;
   f. optionally attaching a binding agent to a functional surface on a binding layer on the magnetic particle,
wherein the sensing surface is separated from the binding region by a separation distance sufficient, in use, for a detectable response to be detected at the sensing surface following binding of a target analyte to the binding agent.

Preferably the method of production further comprises attaching a magnetic element and/or a magnetic element positioning means to the sensor.

A further step in the method of using the sensor and production of the sensor comprises the exposure of the magnetic particles to a binding agent as described above. In one embodiment, the binding agent comprises a biotin-binding protein, for example avidin. Optionally a capture agent is applied as part of the binding agent which potentiates the binding agent to binding with the target analyte. In one embodiment, the capture agent comprises an aptamer or antibody.

Once the sensor has been exposed to the sample, and the target analyte has bound to the binding agent, a reductive potential is applied to one or more electrodes in the sensor system. In particular embodiments, the reductive potential applied is between about −350 mV and −450 mV or about −200 mV, −300 mV or −400 mV. This has the effect of removing the protective coating on the sensing surface and optionally the binding region thus de-protecting it to enable improved sensitivity to the electroactive species generated following addition of the electroactive substrate. Thus the sensor includes a protective layer on the binding layer but not on the sensing surface.

Preferably a SAM layer is deposited on the sensor surface. In one embodiment, the SAM layer comprises long-chain molecules comprising a carbon chain of C6 or greater. Preferably the SAM comprises long-chain molecules comprising a carbon chain of C6 to C24 which may be alkane, alkene, alkyne or aromatic. Preferably, C6, 7, 8, 9, 10, 11, 12, 13, 14, 15, 16, 17, 18, 19, 20, 21, 22, 23, or 24 or mixtures of these.

Preferably the SAM comprises short-chain molecules comprising a carbon chain of C5 or less. Preferably, C1, 2, 3, 4, 5 or mixtures of these.

Preferably the SAM is a mixed SAM comprising long (C6-C24 as above) and short chain (C1-C5 as above) molecules, which may be alkane, alkene, alkyne or aromatic.

Preferably the mixed SAM comprises long-chain molecules comprising a carbon chain of C6 to C24 (as above) and short-chain molecules of C5 to C1 (as above).

Preferably the long-chain SAM comprises molecules selected from the group consisting of azides, amines, carboxylates, aldehydes, ketones, esters or carboxylic acids or mixtures thereof. Such molecules being present at the terminal end of the SAM.

Preferably the short-chain SAM comprises molecules selected from the group consisting of alkanes, azides, amines, hydroxyls, carboxylates or carboxylic acids or mixtures thereof. Such molecules being present within at the terminal end of the SAM.

In one particular embodiment, the SAM comprises a mixture of long chain molecules comprising carboxylic acid molecules of greater than C6 and short chain molecules comprising hydroxyl molecules. In the above embodiments, the SAM long chain molecules are preferably selected from C6 to C24 molecules (as described previously). In particular embodiments, the SAM long chain molecules are preferably selected from the group consisting of C6, C8, C10, C12, C14, C16, C18 or C20 molecules. Long-chain SAM molecules are preferable for permanently attached SAMs (i.e. those that are not intended to be removed by application of an electrical charge) because they are more stable when prepared as a monolayer.

In another embodiment the SAM layer comprises short-chain molecules comprising a carbon chain of C5 or less. Preferably the short-chain SAM comprises molecules selected from the group consisting of alkanes, azides, amines, hydroxyls, carboxylates or carboxylic acids and combinations of these. Short chain SAMs are preferable where the SAM layer is intended to be removed because they are less stable.

In one embodiment, the SAM layer comprises a mixture of long- and short-chain molecules. Preferably the mixed SAM comprises long-chain molecules comprising a carbon chain of C6 or greater and short-chain molecules of C5 or less. The long and short chain SAMs may comprise the molecules described above. In one particular embodiment, the SAM comprises a mixture of long chain molecules comprising carboxylic acid molecules of greater than C6 and short chain molecules comprising hydroxyl molecules. Other suitable SAM molecules will be known to those of skill in the art. The inventors have found that using a mixture of long- and short-chain molecules in the SAM provides previously unrecognised benefits in reducing non-specific binding on the binding layer. Without wishing to be bound by theory, it is believed that the long chain molecules take up more area on the surface therefore applying short chain molecules allows the gaps between the long-chain molecules to be filled so that the surface is protected. Preferably the ratio of short:long chain molecules is between 2:1 to 20:1, more preferably about 10:1. Also 4:1 to 16:1, 7:1 to 14:1, 9:1 to 11:1.

Preferably the SAM is deposited as a monolayer.

Preferably the method of producing the array comprises depositing a layer on either the electrode layer or the support substrate for example one as described in the previous paragraph. Preferably the deposition comprises:
 a. applying a long chain SAM or a mixed SAM (long and short chain as above) to the electrode layer;
 b. applying an electrical charge to the electrode layer to selectively remove the SAM (long or mixed long and short) from an upper portion of the surface structure(s);
 c. applying a short-chain SAM (for example those described above) to the electrode layer such that the short chain SAM predominantly attaches to the upper portion of the surface structures from b.;
 d. optionally applying a binding agent to the binding layer wherein the binding agent preferentially binds to the long-chain or mixed long and short chain SAM; and
optionally applying a further electrical charge to the electrode layer to selectively remove the short chain SAM from an upper portion of the surface structure(s) and yield a sensing surface substantially free of SAM molecules.

Preferably the separation distance between the binding region and the sensing surface is between about 1 nm and 50 mm, and/or the surface structures are separated from each other by about 50 nm to about 2000 μm, and/or the width of the surface structure where it joins the support substrate is between about 20 nm to about 5000 μm, and/or the width of the apex of each surface structure is preferably between about 1 nm to about 5000 micron.

As described herein, applying a charge to the electrode layer will result in the charge density being concentrated at the tips (or the upper portion) of the surface structures (see FIG. 11). This results in the selective removal of the SAM from an upper portion of the surface structures(s). Applying a short-chain SAM which attaches to the then exposed upper portion of the surface structures allows application of the binding agent while minimising the binding of the binding agent to the short chain SAM at the surface structure tips/upper portions. A final step of applying a charge to the electrode layer then deprotects or removes the short chain SAM from the upper portion thus leaving an electrode layer surface (sensing surface) substantially free of SAM or binding agent. This process has been found by the inventors to provide a clean sensing surface and maximise the detection of the electroactive species binding at the binding surface at the sensing surface.

Figure 22:
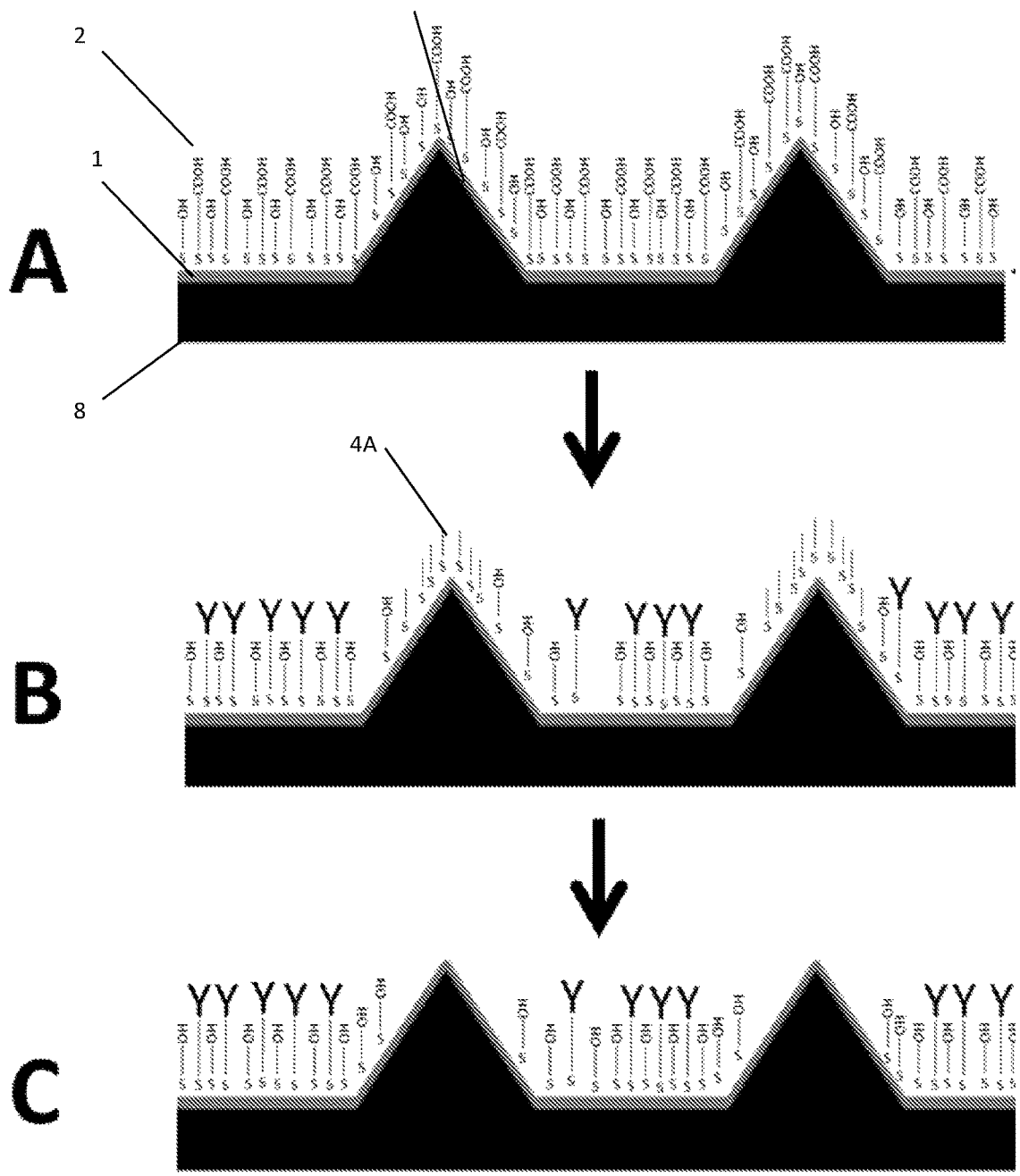
FIG. 22 shows a sensor prepared using a SAM as the binding layer and functionalisation/defunctionalisation to an array with a differentially functionalised surface structure sensing surface compared to the binding layer.

In one embodiment of a similar invention shown in FIG. 22A, a sensor is prepared using a SAM as the binding layer 2 on an electrode layer 1 on a support substrate 8. The electrode layer surface (preferably gold) is coated with a mixed SAM binding layer 2, for example one comprising SAM-OH and SAM-COOH (shown as s-OH; s-COOH) which coats the entire exposed surface of the electrode layer. A current is applied (as demonstrated in Example 4) which removes (not shown in figure) the mixed SAM from the upper portion of the surface structures 4A then in FIG. 22B, the exposed upper portions of the surface structures are backfilled with a short chain SAM (s-OH) such as an alkane SAM and a binding agent (Y). The binding agent preferentially attaches to the long chain SAM molecules in the mixed SAM on the binding layer around the base of the surface structures. In FIG. 22C, the short chain (e.g. alkane) SAM is removed from the sensing surface (i.e. the upper portions of the surface structures). Following the production of the sensor, it can be used for assays as described herein.

Calibration of a sensor is typically achieved by comparing the target analyte (TA) sensor response to a series of target analyte standards. This process involves making up a stock solution of the TA at a known concentration, and performing series dilution to give a range of standards that span the anticipated concentration of the TA within the sample. A comparison of the sample TA response to the standards allows the concentration of TA in the sample to be estimated. However, this can be complicated by multiple factors including sample handling, dilution errors and/or interference by the sample matrix (e.g. milk, blood, seawater). In every analysis, considerable effort goes into minimising the impacts of these factors by a skilled technician to ensure that the observed response is accurate, and the comparison against the standards is a true reflection of concentration.

The inventors have found that a self-calibrating sensor can be produced by using a configuration of two or more sensing surfaces situated progressively further from the binding site of the target analyte. This self-calibration uses the concepts described above relating to measurement of a response effected by binding of the target analyte to a binding agent.

Accordingly, in a further aspect, the invention provides a sensor comprising:
 a. a support substrate, optionally with surface structure(s) formed on it;
 b. an electrode layer deposited on the support substrate and optionally the surface structure(s);
 c. a first sensing surface on a first electrode layer, and at least a second sensing surface on a second electrode layer, wherein the sensing surfaces are adapted to contact a sample;
 d. a binding region on the support substrate and optionally the electrode layer, wherein the wherein the binding region is separated from the first and second sensing surfaces;
wherein, in use, a binding agent attached to a binding layer at the binding region contacts a sample containing a target analyte.

In an embodiment of the second aspect, the binding region is defined by an area of magnetic field established by a magnetic element on, in, or under the support substrate which, in use, attracts and attaches magnetic particles to the support substrate, wherein the magnetic particles include a binding layer adapted to contact a sample containing a target analyte.

Preferably the binding region has at least one magnetic element on, in, or under the support substrate. This magnetic element attracts the magnetic particles to attach them to the binding region.

In further embodiments, the sensor further comprises a third, fourth, fifth or further sensing surfaces respectively situated on a third, fourth, fifth or further electrode layer, wherein each electrode layer is electrically isolated from one another; wherein the separation distance between the binding region and the respective sensing surface progressively increases as the number of electrode layers increases. The subsequent electrode layers and associated sensing surfaces are positioned progressively further away from the binding region. When deployed in a flow environment, the electrodes are positioned on the sensor along an axis substantially defined by the direction of flow of the sample. The use of magnetic particles comprising binding agents which bind with a target analyte at a binding region is specifically envisaged within this aspect of the invention and all its relevant embodiments.

There may be any number of sensing surfaces connected to discrete electrode layers. The sensor is adapted to detect a detectable response at at least the first and the second sensing surfaces, and preferably at all of the sensing surfaces in order to detect comparable response measurements following binding of a target analyte to a binding agent. The increasing distance of each sensing surface or sensing group attached to a discrete electrode layer enables the response to be compared and a calibration curve to be determined (provided the original concentration of the target analyte in the sample is known).

It will be appreciated that the sensing surfaces will typically be a part of a sensing group electrically connected to a single discrete electrode layer from which response measurements can be measured independently of the other electrode layers.

By providing two or more sensing surfaces on electrically isolated electrode layers, simultaneous multiple measurements of detectable responses can be made on the same sample. This provides a means of not only performing experimental replicates but also enables the self-calibration of the sensor response. FIGS. 7 and 8 depict an example of multiple electrode detection. FIG. 7.1 shows a sample containing the TA (open circle) being passed over the binding layer with binding agent attached. The TA selectively binds to the binding agents at the binding site. FIG. 7.2 shows a standard solution containing a known concentration of a ligand labelled target analyte—TA-HRP (closed circle) being passed over the sensor. The labelled target analyte binds to available biding agents.

Figure 10A:
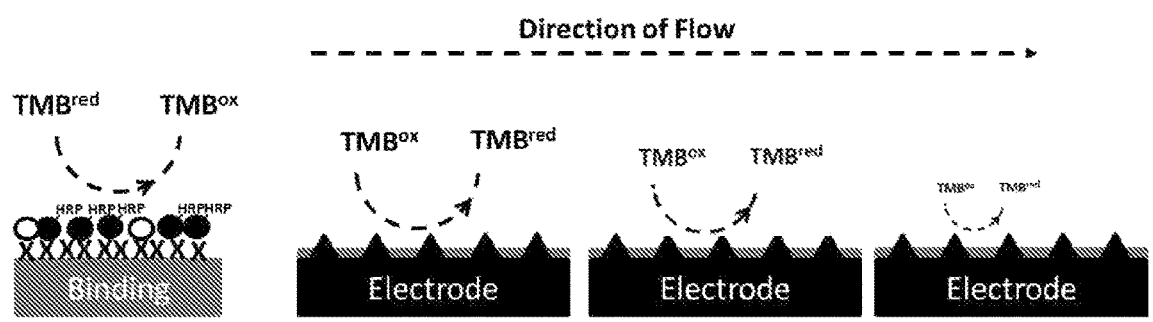
FIG. 10A shows integration of the tip electrode arrays into the split sensor.
Figure 10B:
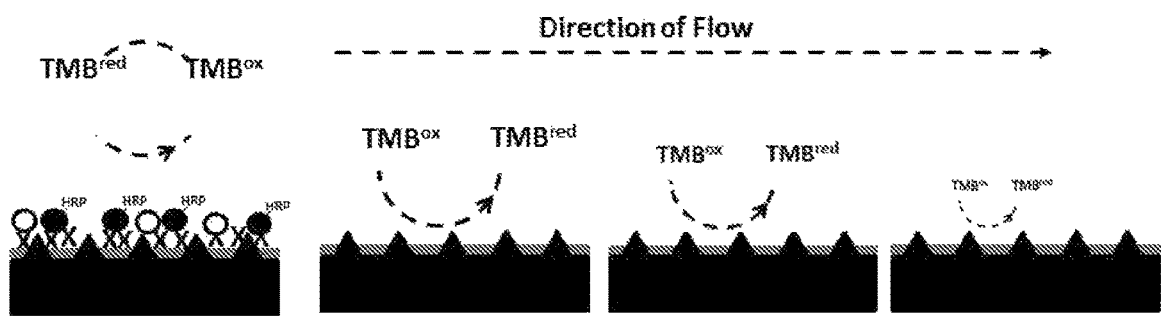
FIG. 10B shows the use of a microelectrode array as the binding region and integration of the tip electrode arrays into the split sensor.

FIG. 8 shows the introduction of an electroactive substrate in the presence of an activating species (in this embodiment TMB plus $H_2O_2$) to the sensor which is passed over the binding layer then the sensing surfaces. The electroactive substrate is oxidised by the ligand (HRP) under both low TA loading (FIG. 8A) and high TA loading (FIG. 8B), and then reduced on the surface of successive electrodes. The reduction on the surface of electrodes is achieved by the application of a reductive potential (as described above). The size of the detectable response of the electroactive species on contacting (i.e. being oxidised or reduced) the sensing surface is indicated by the size of the arrow showing reduction of TMB. A similar arrangement is shown in FIGS. 10A and 10B although in these embodiments, an array of tips (surface structures with sensing surfaces protruding above the binding/inert layer) is used to achieve greater sensitivity of the multiple electrode layer sensor. Similarly, FIG. 10B shows the use of a microelectrode array as the binding layer/binding region where the electroactive species is generated. This is similar to that described in FIG. 8 except the sensor array shown in FIG. 10B eliminates the requirement to add a regeneration species e.g. $H_2O_2$ to regenerate the ligand catalyst (HRP) as this can be generated by holding the electrode array at a suitable reductive potential, for example less than about −300 mV, or about −400 mV. Accordingly, in a further embodiment, the invention provides a method of detecting binding of a target analyte in a sample to a binding agent as described herein, and regenerating a ligand catalyst by application of a reductive potential at the sensing surface such that the need for a regeneration species is minimised or avoided altogether.

FIG. 9 shows the type of data that would be expected to be obtained from the multiple electrode response at low TA concentration (Sample Conc. A) and high TA concentration (Sample Conc. B). Each decays at a point corresponding to the amount of the electroactive species (in this case $TMB^{ox}$) generated following binding of the labelled target analyte to the binding agent in solution. This equates to the concentration of bound ligand-labelled TA (in this case HRP), and is inversely proportion to the amount of unlabelled TA in the sample. In this way the concentration of the target analyte is established without the need for a standard curve to be generated.

The inventors have built a computer model to predict the signal attenuation at the sensing surfaces following electroactive species generation. The model takes into account variables including distances between the binding region and the sensing surface, flowrate, concentration and temperature.

Figure 14:
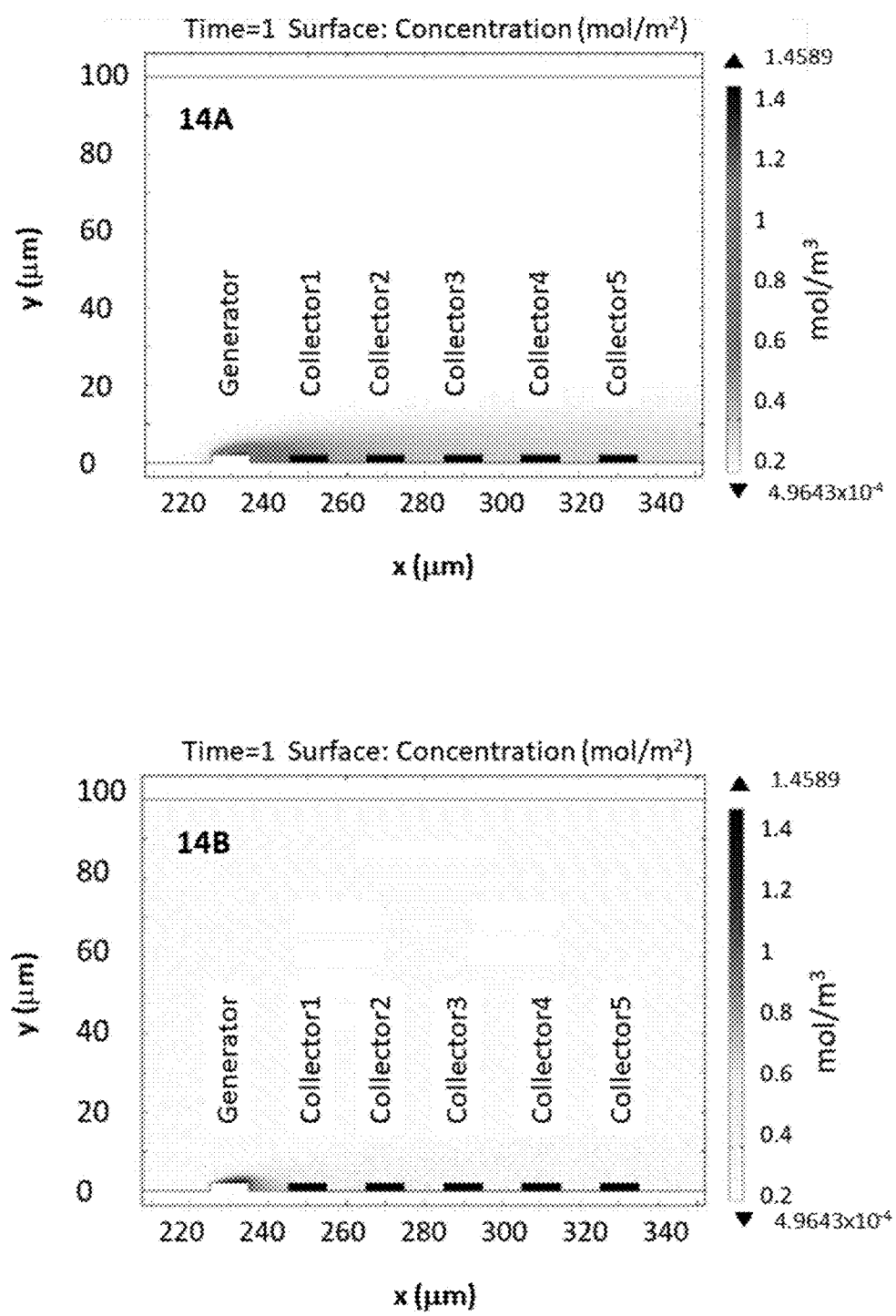
FIGS. 14A-14C show an example of the modelling data for the generation of the electroactive species and the output current (FIG. 14C) expected for 2 concentrations, FIG. 14A—30 mol($m^2$s) and FIG. 14B—5 mol($m^2$s).

FIGS. 14A, 14B, and 14C show modelling data for the generation of the electroactive species TMB oxidised at the 'Generator' (binding region) and reduced at the 'Collectors' (sensing surfaces on the electrode layers) for a high concentration (FIG. 14A) and low concentration (FIG. 14B). FIG. 14C shows how the output current is expected to be observed at concentration 1 and concentration 2.

In one embodiment, the first separation distance is between about 1 nm and 5 mm, and the second separation distance is between about 1 nm and about 5 mm. In particular embodiments, the first and/or second separation distances (or inter-sensing surface distances) are between about 30 nm and 1 mm, between about 100 nm and 500 µm, between about 1 µm and 200 µm or between about 20 µm and 100 µm. The separation distance may be between about 30 nm and about 5 mm, between about 100 nm and about 5000 µm, between about 1 µm and about 1000 µm or between about 20 µm and about 100 µm, about 30 nm and about 5000 µm, about 100 nm and about 5 mm, about 1 µm and about 100 µm, about 20 µm and about 1000 µm, about 20 µm and about 5000 µm; 1 µm and about 5 mm.

In one embodiment, a first inter-sensing surface distance between the first sensing surface and the second sensing surface is between about 30 nm and 1 mm. Subsequent inter-sensing surface distances between adjacent sensing surfaces (each connected to a discrete electrode layer) are preferably between about 30 nm and 1 mm.

The sensor may comprise any number of electrode surfaces. In particular embodiments, the sensor comprises two or more, preferably between 2 and 10 (eg 2 3 4 5 6 7 8 9 10), discrete electrode layers each connected to a measurement electrode. Preferably the sensor comprises between 5 and 8 electrode layers. Preferably between 3 and 8, 4 and 9, 5 and 7, 2 and 8.

In one embodiment, any of the electrode layers are electrically isolated from the binding region or other electrode layers with an isolating material or gap. Isolating material such as a SAM or photoresist.

The features, variations and embodiments described herein in relation to the non-self-calibrating sensor are all applicable and intended to be read in combination with the features of the self-calibrating sensor.

Accordingly, in a further aspect, the invention provides a method of determining the concentration of a target analyte in a sample, the method comprising:
  a. providing a sensor comprising:
    a support substrate, optionally with surface structure(s) formed on it;
    an electrode layer deposited on the support substrate and optionally the surface structure(s);

a first sensing surface on a first electrode layer, and at least a second sensing surface on a second electrode layer, wherein the sensing surfaces are adapted to contact a sample;

a binding region on the support substrate and optionally the electrode layer, wherein the binding region is separated from the first and second sensing surfaces with at least one binding agent attached to a binding layer on a magnetic particle b. contacting the binding agent at the binding region with a sample containing the target analyte;

c. measuring a change at two or more measurement electrodes, each measurement electrode being electrically connected to an electrode layer and at least one sensing surface, the measurement electrodes being electrically isolated from each other;

d. measuring the change in a detectable response as a function of separation distance from the binding site;

e. optionally comparing the change in response with the change in response from a known concentration of a target analyte from a control sample; and f. determining the concentration of the target analyte in the sample;

wherein binding of the target analyte to the binding agent at the binding region produces an electroactive species which mediates a detectable response at the sensing surface.

This self-calibration aspect of the invention has considerable versatility due to the ability to customise the system by adjustment of several factors including:

1. The amount of the electroactive species e.g. $TMB_{ox}$ that is produced at the binding site, which is dictated by:
   a. the surface area of the binding region; and
   b. the number and availability of binding agents in the binding region;
2. The flow rate within the microfluidic channel. In particular embodiments of the invention, the flow is no flow, or is at a constant flow. In one embodiment, the flow is pulsed or ramped.
3. The sample handling methodologies available through microfluidic sample handling, for example hydrodynamic and centrifugal focusing;
4. Voltage control to drive the redox processes;
5. Distances between the binding region and the sensing surface(s).

One of the main advantages of the approach is that calibration is performed on the actual sample, thus eliminating errors associated with sample handling and matrix effects.

In one further embodiment, a protective coating is applied to the downstream sensing surfaces and only removed prior to detection of the electroactive species.

The example shown in FIG. 7 is that of a competitive assay based on TA and TA-HRP which effectively compete for access to the capture agent. The system is however not limited to competitive assays and is applicable, but not limited to other types of ELISA assay for example:

Sandwich assays, in which the binding agent is bound to the binding region, the TA binds to the binding agent, and a second binding agent with a ligand (e.g. HRP) is bound to the TA. In this way the TA is "sandwiched" between two binding agents; or Displacement assays, where the binding agent is bound to the binding region and TA-ligand is bound onto the binding agent. Exposure to the sample containing the TA results in the TA replacing the TA-HRP.

The only requirement is that the concentration of the electroactive species detected by the sensing surfaces corresponds either directly or inversely to the concentration of the target analyte.

Figure 25:
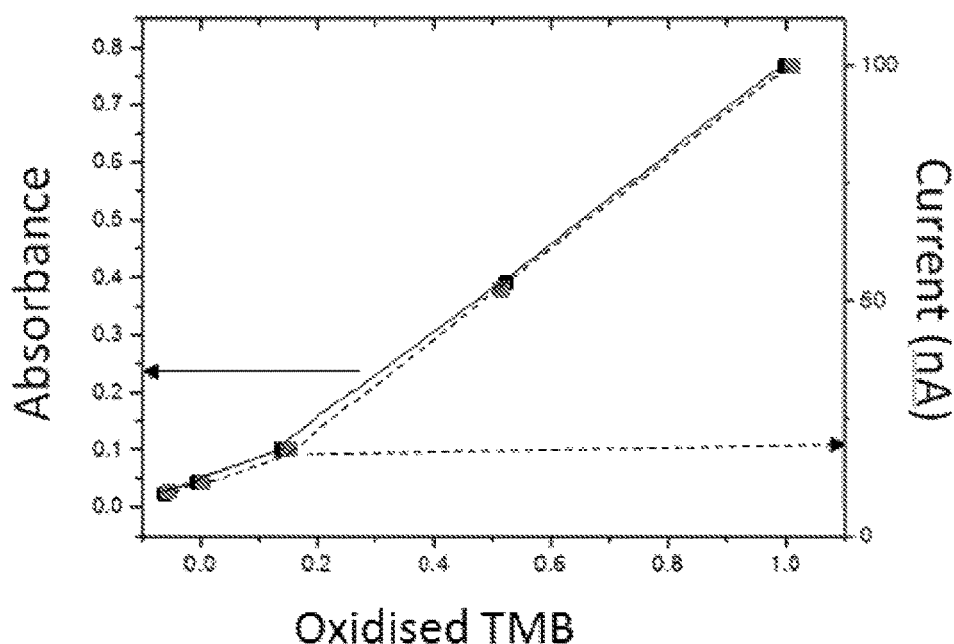
FIG. 25 shows the accuracy and sensitivity of the present invention method when used for detection of oxidised TMB in an ELISA (optical) versus electrochemical detection.

FIG. 25 illustrates the accuracy and sensitivity of the present invention method when used for detection of oxidised TMB in an ELISA versus electrochemical detection. It can be seen that the results closely mirror each other thus validating the assay of the present invention. The electrochemical detection technique of the present invention is however at least two orders of magnitude more sensitive because current can be measured to picoAmps rather than the optical detection limits with typical optical detection technologies.

Additional factors affecting the response curve could also include the method used to elicit the sensor response. This would depend on the type of sensor employed and whether or not the response is obtained directly via an interaction between the sensor and the TA or a secondary process for example a secondary/tertiary reaction at subsequent electrodes.

The features of the self-calibrating sensor are as described above in relation to the other sensors of the invention. For example FIG. 10 shows surface structures with a triangular cross-section and an apex although these structures may be as described above in relation to other aspects.

The invention may also be seen to include a method of detecting binding of a target analyte in a sample to a binding agent, the method comprising:

a. providing a sensor comprising:
   i. a support substrate;
   ii. at least one surface structure protruding from an upper surface of the support substrate, wherein the surface structure includes an electrode layer;
   iii. a sensing surface on the electrode layer, wherein the sensing surface is adapted to contact the sample;
   iv. a binding region on the support substrate, wherein the binding region is also adapted to contact the sample and is separated from the sensing surface and comprises a magnetic field;

b. attaching a magnetic particle to the binding region, wherein the magnetic particle comprises at least one binding agent attached to a binding layer on the magnetic particle;

c. contacting the binding agent and the sensing surface with a sample containing a target analyte;

d. allowing the target analyte to bind to the binding agent to produce a detectable response at the sensing surface;

e. measuring a change at a measurement electrode electrically connected to the at least one sensing surface;

wherein binding of the target analyte to the binding agent produces an electroactive species which mediates the detectable response at the sensing surface and measuring a change detectable response at a measurement electrode electrically connected to the at least one sensing surface;

and wherein the separation distance between the binding region and the sensing surface is between about 1 nm and 50 mm, the surface structures are separated from each other by about 50 nm to about 2000 µm apex to apex, and/or the width of the surface structure where it joins the support substrate is between about 20 nm to about 5000 µm, and/or the width of the apex of each surface structure is preferably between about 1 nm to about 5000 micron.

The invention may also be seen to include a method of determining the concentration of a target analyte in a sample, the method comprising:
  a. providing a sensor comprising:
    i. a support substrate comprising a binding region;
    ii. at least one surface structure protruding from an upper surface of the support substrate, wherein the surface structure includes an electrode layer;
    iii. a sensing surface on the electrode layer, wherein the sensing surface is adapted to contact the sample;
    iv. a magnetic element;
    v. a binding region on the support substrate, wherein the binding region includes a binding layer and is also adapted to contact the sample and is separated from the sensing surface and comprises a magnetic field created by the magnetic element;
  b. attaching at least one binding agent to the binding layer at the binding region;
  c. contacting the sensor including the binding agent and at least one sensing surface with a sample containing the target analyte;
  d. measuring a change at two or more measurement electrodes, each measurement electrode being electrically connected to an electrode layer and at least one sensing surface, the measurement electrodes being electrically isolated from each other;
  e. measuring the change in a detectable response as a function of separation distance from the binding site where binding of the binding agent to the target analyte occurs;
  f. comparing the change in response with the change in response from a known concentration of a target analyte from a control sample; and
  g. determining the concentration of the target analyte in the sample;
  wherein binding of the target analyte to the binding agent produces an electroactive species which mediates a detectable response at the sensing surface,
  and wherein the separation distance between the binding region and the sensing surface is between about 1 nm and 50 mm, the surface structures are separated from each other by about 50 nm to about 2000 μm apex to apex, and/or the width of the surface structure where it joins the support substrate is between about 20 nm to about 5000 μm, and/or the width of the apex of each surface structure is preferably between about 1 nm to about 5000 micron.

The invention may also be seen to include a method of production of a sensor comprising:
  a. providing a support substrate with at least one surface structure protruding from an upper surface of the support substrate;
  b. depositing an electrode layer on an upper surface of the at least one surface structure;
  c. depositing an inert layer on the electrode layer such that one or more portion of the electrode layer remains exposed to form at least one sensing surface on the electrode layer, wherein the inert layer comprises a material substantially inert to the components of a sample to be analysed;
  d. forming a binding region on the support substrate wherein the binding region is adapted to attach at least one binding agent electrostatically, covalently or magnetically;
  wherein the sensing surface is separated from the binding region by a separation distance sufficient, in use, for a detectable response to be detected at the sensing surface following binding of a target analyte to the binding agent.

It is preferred that the surface structures are separated from each other by about 50 nm to about 2000 μm apex to apex, and/or the width of the surface structure where it joins the support substrate is between about 20 nm to about 5000 μm, and/or the width of the apex of each surface structure is preferably between about 1 nm to about 5000 micron.

It is preferred that the at least one surface structure is integral with the support substrate.

It is preferred that a protective coating is applied to the electrode layer.

It is preferred that the sensing surfaces are formed by deposition of a binding layer or an inert layer on the support substrate or surface structures leaving an upper portion of the surface structures free of binding layer or inert layer thus resulting in the surface of the electrode layer on the upper portion of the surface structure being exposed as the sensing surface.

It is preferred that the the binding layer or inert layer is deposited adjacent to the electrode layer.

It is preferred that the the inert layer is electrically conductive and is connected to at least one electrode capable of applying a potential to the inert layer.

It is preferred that the the step of depositing a binding layer on either the electrode layer or the support substrate comprises applying a SAM binding layer.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the scope of the invention.

EXAMPLES

Materials for all Examples

PBS pallets, $K_3FeCN_6$, $K_4FeCN_6$, NHS, EDC, TMB and thiols where purchased from Sigma Aldrich and were used as received. Horseradish peroxidase-P4 (HRP-P4) was synthesised using the methodology of Monerris et al. 2012. P4 Antibody was purchased from BioRad (Mouse Anti Progesterone 7720-1430).

Example 1—the Absorption of Progesterone Antibody onto SU8

Aim

Demonstrate the binding of the binding agent progesterone antibody onto binding layer SU8 using an optical assay format with HRP-P4 and TMB.

Method

The binding layer SU8 was spun coat (4000 rpm) onto the substrate material (glass slides), to give an approximately 0.2-0.4 µm thick layer. The surfaces were washed with ethanol and dried with nitrogen. The test area was defined using 6 mm diameter PMMA wells. P4 antibody (75 µl of 20 µg/ml in PBS) was added into the wells, and incubated at 25° C. for 1 hour. Excess antibody was removed by rinsing the surface with wash buffer (tween PBS) (3×5 min). The surface was incubated with ethanolamine solution as a blocking agent (100 µl from 1M solution in Tris buffer pH 8.5) for 1 hr to block non-specific binding. The assay was performed using 75 µl of HRP-P4 (200 ng/ml) and incubating for 1 h. After washing with wash buffer (6×2 ml) for 5 min, the surfaces were incubated with 100 µl of TMB solution (0.1 mg/ml, 0.006% $H_2O_2$) for 20 min. TMB solution was transferred into a 96-well plate and 20 µl of $H_2SO_4$ (2M) was added. The absorbance measurement was taken at 450 nm.

Results

The results are shown in FIG. 15 and indicate that the antibody binds on both gold and SU8 surfaces; however SU8 showed higher binding affinity. In order to check non-specific binding the surfaces were exposed directly to HRP or ethanolamine and HRP. While HRP-P4 strongly binds to the surfaces, binding was effectively blocked by ethanolamine.

In the examples below, the redox processes typically use constant voltage to drive the reaction. These could however also be driven using cyclic voltammetry or constant current as would be known by somebody skilled in the art.

Also the examples below typically occur at the cathode, however they would also be applicable to reactions at the anode as would be known to somebody skilled in the art Conclusion SU8 coated shows to have the desired properties for direct binding of the antibody without the need for surface modification.

Example 2—Optical Detection of Progesterone

Aim:

To demonstrate use of an SU8 coated surface to detect P4 using an Elisa format.

Method

An SU8 coated glass slide surface was coated with P4 antibody and backfilled with ethanolamine using the protocol defined in Example 1. HRP-P4 incubation was performed in the presence of P4 standard solutions (0, 5, 10, 15, 20, 25, 50 and 100 ng/ml) for 1 hour. The surface was then washed 6 times for 5 min each with wash buffer. TMB and H2SO4 were then added and spectrophotometric measurements were carried out as in Example 1.

Result

Figure 16:
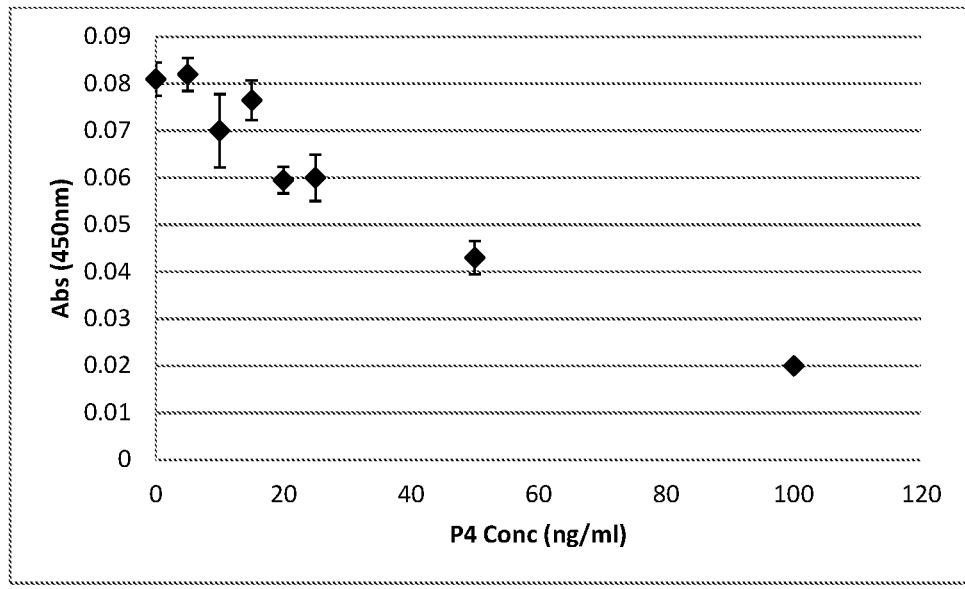
FIG. 16 shows a P4 Standard curve by spectrophotometric assay on SU8.

The results are shown in FIG. 16.

Conclusion

The results indicated that a P4 assay could be performed using the P4 antibody non-covalently bound to SU8.

Example 3—the Detection of Progesterone with an Electrochemical Platform in which the Sensor Surface is a Series of Tips Protruding from the Binding Region Aim To use the optimised conditions in Examples 1 and 2 to perform a P4 assay using electrochemical measurement in which the sensing surfaces (gold) are within the binding region on an SU8 binding layer.

Method

The methodology used in Example 1 was applied to an array of 20 µm tips (such as the one shown in FIG. 12) protruding from an SU8 binding layer. The antibody was applied only at the measurement electrode as a 3 µl droplet to create a binding region with binding agent attached. Before electrochemical measurement was performed, the entire sensor surface was washed with wash buffer 6 times for 5 min. Amperometric measurement was taken at −200 mV (vs Ag/AgCl) in TMB solution (0.1 mg/ml, 0.006% $H_2O_2$) for 3 min.

Results

Figure 17:
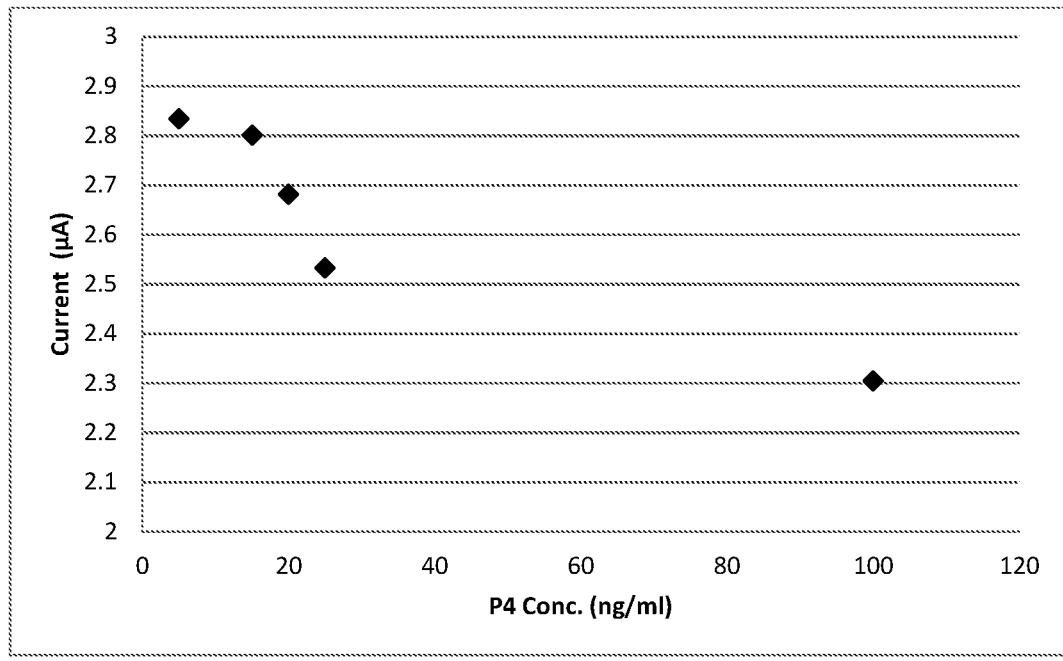
FIG. 17 shows a P4 Standard curve by electrochemical assay where the sensor surfaces are within the binding region (SU8).

FIG. 17 shows a P4 Standard curve by electrochemical assay where the sensing surfaces are within the binding region (SU8).

Conclusion

The results indicated that an electrochemical P4 assay could be performed where the sensing surfaces are within the binding region.

Example 4—the Removal of a Self-Assembled Monolayer (SAM) Protective Coating

Aim

The aim was to use the reversible adsorption of SAM on gold to act as a protective coating for the sensing surface that can be electrochemically removed to provide a clean surface prior to electrochemical measurement.

Method

Gold electrodes were cleaned using reactive ion etching (RIE) with $O_2$ plasma (2 min) and were immediately immersed into a thiol solution (0.1M in ethanol) for 60 minutes. The surface was rinsed with ethanol and then deionized water. The SAM was cathodically desorbed in PBS by either cycling from 0.1 V to −1.1 V (vs Ag/AgCl) at 20 mVs$^{-1}$, or by holding the voltage at −1 V (vs Ag/AgCl) for at least 20 minutes.

The formation of SAM on gold and its electrochemical desorption was determined by cycling in Ferri/ferro cyanide (0.5 M) solution in PBS by scanning from 0.6 to −0.2 V, (vs Ag/AgCl) at 20 mV/s.

Results

Figure 18:
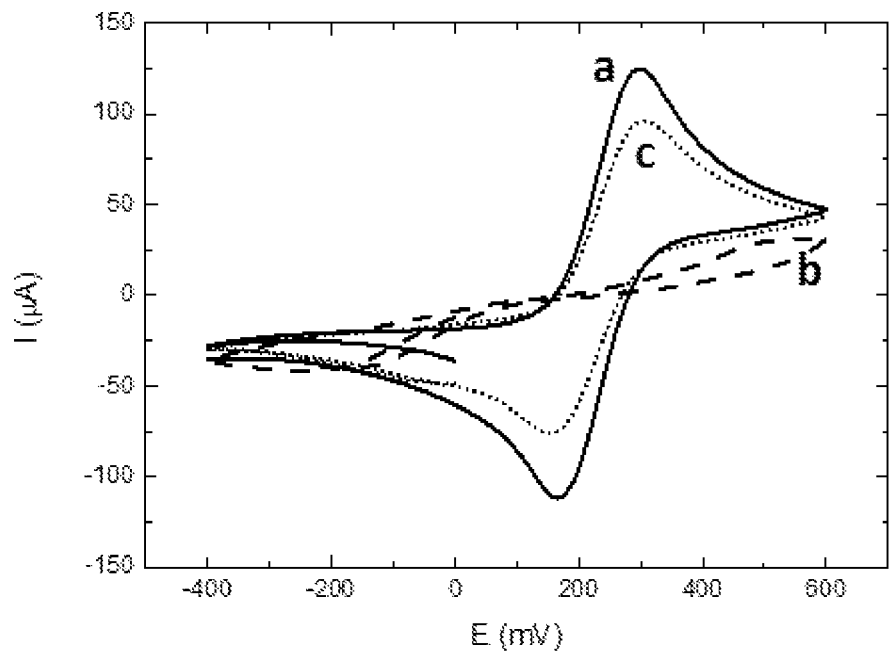
FIG. 18 shows a cyclic voltammetry scan for the uncoated gold electrode (a, black line), the SAM-coated gold electrode (b, large dash line) and the cleaned gold electrode (c, dotted line) electrode.

FIG. 18 shows a cyclic voltammetry scan for the uncoated gold electrode (a, black line), the SAM-coated gold electrode (b, large dash line) and the cleaned gold electrode (c, dotted line) electrode.

Conclusions

The results indicated that the SAM was effectively removed from the flat electrode after 20 minutes. The reason scan (c) is not identical to the original scan (a) is thought to be due to trace amounts of SAM remaining on the surface. The level of cleanliness is however sufficient for measurement and $H_2O_2$ production from $O_2$ reduction.

Example 5—Electrochemical Detection of P4 on a Flat Electrode Separated from the Binding Region Aim To illustrate the use of electrochemical detection of progesterone using a format in which the sensing surface is separate from the binding region, and showing the effect of in situ $H_2O_2$ formation.

Method

Adjacent gold electrodes (WA and WB) with 10 µm separation were cleaned using RIE with $O_2$ plasma (3×), and immersed into a thiol solution (0.1M in ethanol) for 60 minutes. The electrodes were rinsed with ethanol and then deionized water. The SAM was selectively removed from one of the electrodes (WA) in PBS as described in Example 4. P4 antibody (binding agent) was immobilised on a cleaned electrode (WA) (binding layer) followed by exposure to HRP-P4 (ligand-labelled target analyte) as described in Example 1. The SAM was then removed from the second electrode (WB)(sensing surfaces) as described in example 4.

Part A: The Effect of In Situ $H_2O_2$ Production.

TMB (reduced) was added to the sensors in the absence of $H_2O_2$ and the redox response from oxidised TMB was measured at by holding each of the electrodes at −200 mV and then −400 mV (vs Ag/AgCl).

Part B: P4 Assay.

The electrodes prepared in part A were incubated with P4 (5 ng/mL) for 30 min to allow exchange with HRP-P4 bound to antibody. TMB (reduced) was added and the electrochemical response from oxidised TMB was measured at −400 mV (vs Ag/AgCl). This process was repeated sequentially with 30 and 100 ng/mL P4 solutions.

Results

Part A

Figure 19:
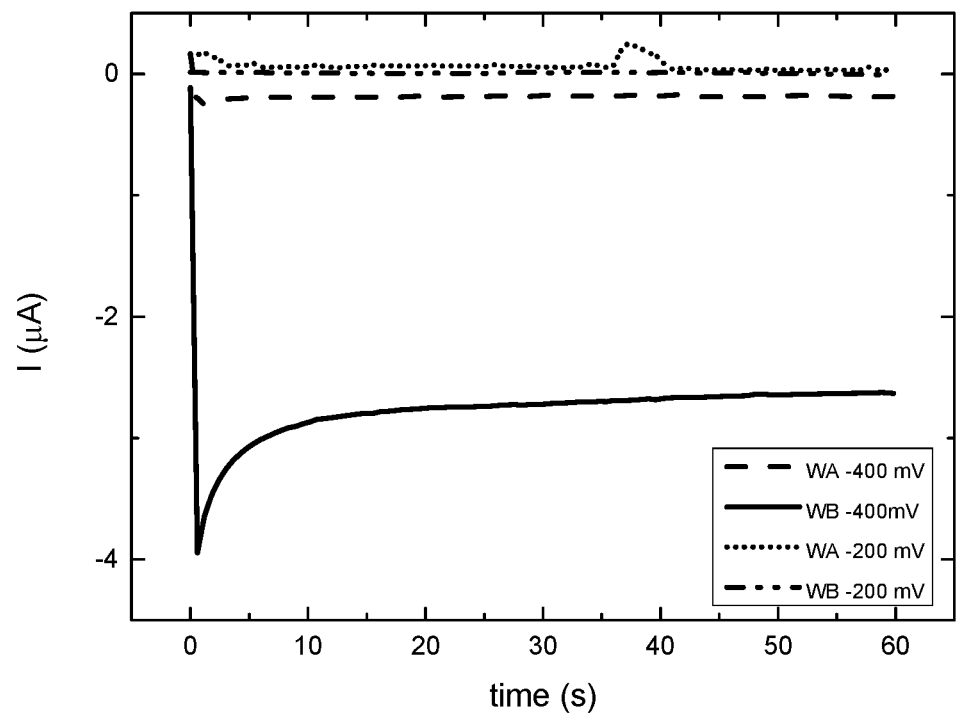
FIG. 19 shows the electrochemical response from WA and WB held at either −200 or −400 mV in presence of reduced TMB.

FIG. 19 shows the electrochemical response from WA and WB held at either −200 or −400 mV in presence of reduced TMB. At −200 mV both working electrodes (WA, dotted line and WB, dashed dotted line) showed no current response due to TMB reduction without the addition of $H_2O_2$ for regeneration of HRP-P4. At −400 mV WA (dashed line) shows low current response for TMB oxidation as the surface is blocked by the presence of the antibody, and correlates with what is currently used in electrochemical sensors, i.e. the capture agent is placed directly on top of the electrode. At −400 mV WB (solid line) shows significant current response due to both generation of $H_2O_2$ to reactivate HRP-P4 and redox cycling of TMB which results in a pseudo steady state condition and current enhancement.

Part B

Figure 20:
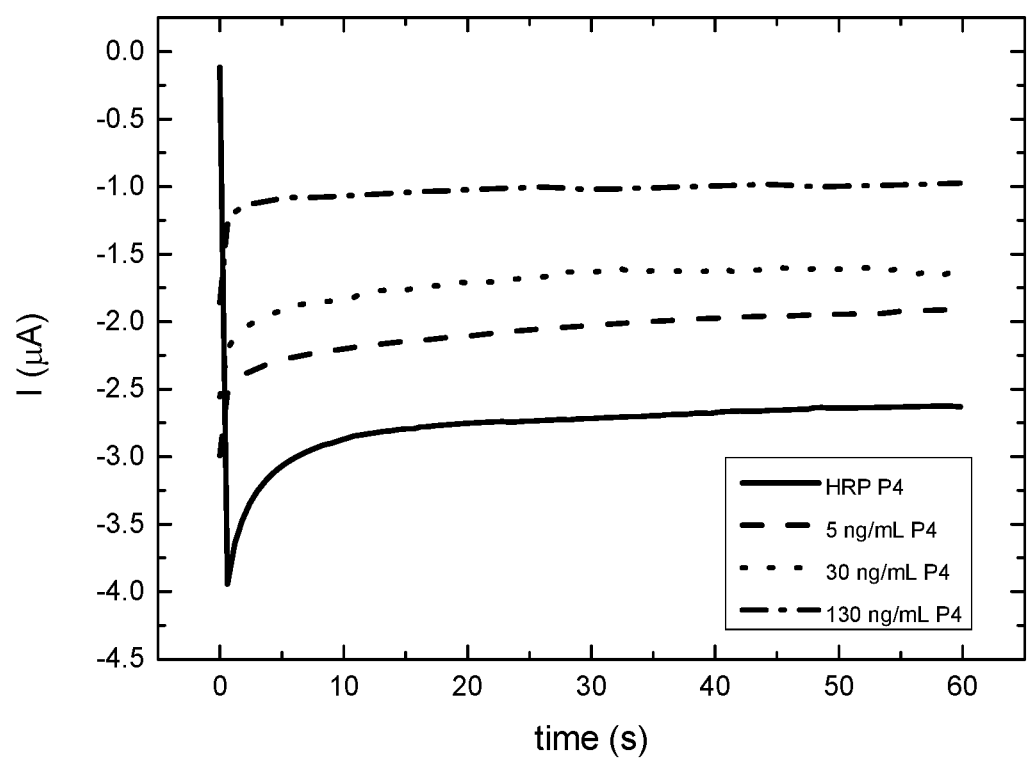
FIG. 20 shows TMB reduction response due to exchange of HRP-P4 bound to surface immobilised antibody with known concentration of P4 without added external $H_2O_2$, at −400 mV.
Figure 21:
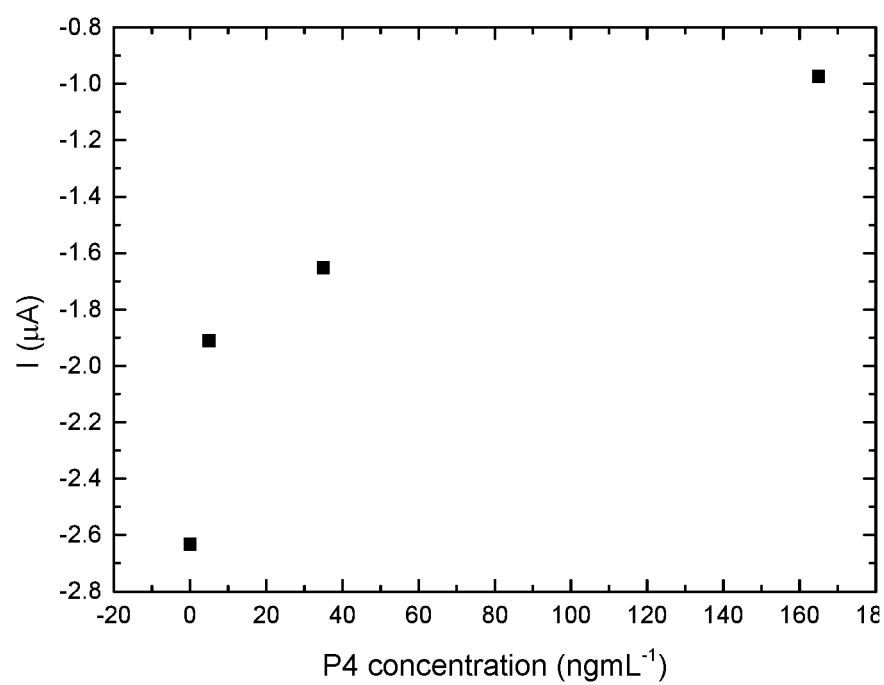
FIG. 21 shows current response after 60s measurement.

FIG. 20 shows TMB reduction response due to exchange of HRP-P4 bound to surface immobilised antibody with known concentration of P4 without added external $H_2O_2$, at −400 mV. FIG. 21 shows current response after 60s measurement.

Conclusion

The result indicated that separating binding region from the sensing surface resulted in a significant current enhancement with improved sensitivity and signal to noise ratio. The results also illustrated the use of the sensor to detect P4 in a sample.

Example 6—Use of Magnetic Particles in a Competitive Assay Format

Aim: To Demonstrate the Use of Magnetic Beads in a Competitive Assay Format in Microfluidics A 200 µl mixture containing magnetic beads bound P4 primary antibody, P4 labelled HRP and a milk sample with unknown P4 concentration was mixed in an ELISA well. The solution was drawn via syringe pump at 0.5 µl/min across a sensor array in which a magnetic element is in place directly under the sensing surface as depicted in FIG. 23. The bound beads were washed with buffer solution, and then exposed to a solution of TMB/H2O2. The measured current is proportional to the amount of bound HRP and hence indirectly proportional to the unknown concentration of P4 in the sample.

Example 7—Use of Magnetic Beads in a Competitive Assay Fluidic Format

Figure 28:
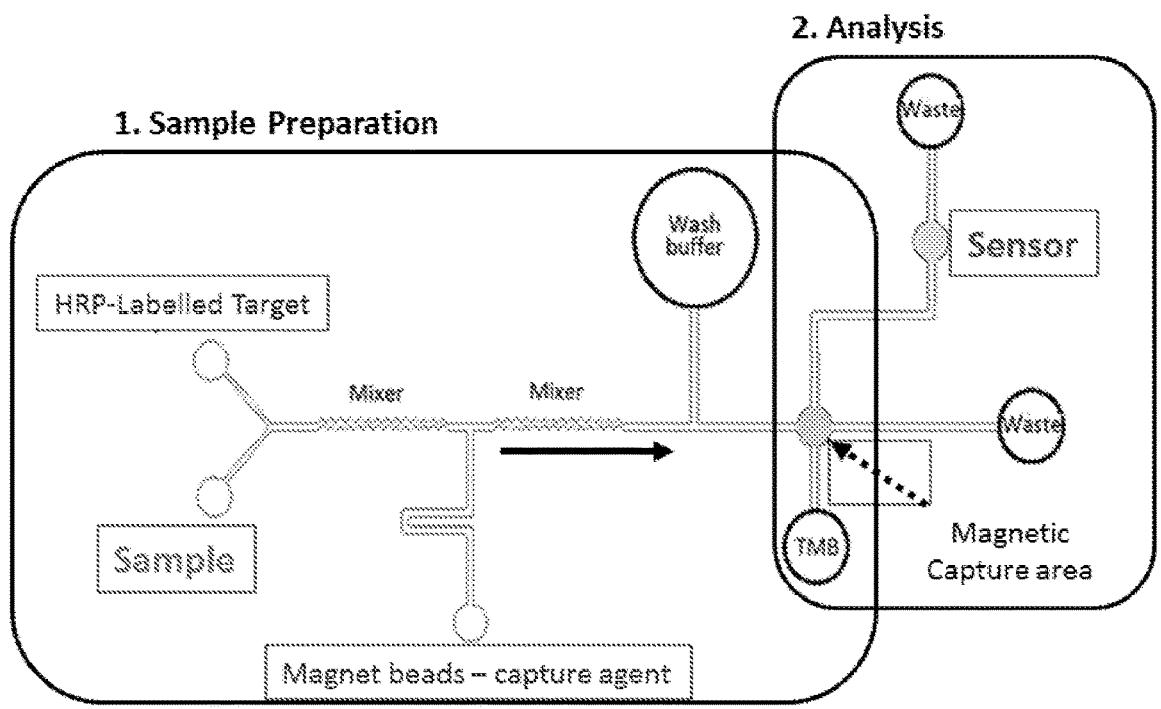
FIG. 28A shows a fluidic based analysis of the competitive assay—Example 7.
FIG. 28B shows an illustration of the use of magnetic beads in a displacement assay—Example 8.

Aim: To Demonstrate the Use of Magnetic Beads in a Competitive Assay Format in Microfluidics The fluidic based analysis of the competitive assay is depicted in FIG. 28A. Solutions containing, 100 µl magnetic beads bound with P4 primary antibody, and P4 labelled HRP (100 µl) in phosphate buffer was mixed with samples with different P4 concentrations (Sample) in buffer using the mixer region of microfluidics using a syringe pump (at 0.5 µl/min). The mixed solution was then passed across the Magnetic Captured area, to trap the beads against the wall of the fluidics. The trapped magnetic beads were then washed with buffer solution. A solution of TMB/H2O2 was passed over the beads, which was then directed over the Sensor area by changing an inline solenoid valve. The electrochemical measurement was carried out using a 2-terminal measurement at −200 mV vs stainless steel electrode.

As in example 6, the measured current was proportional to the amount of bound HRP, with the exception of a delay in response due to the time taken to flow the solution from the Magnetic Capture area to the Sensor.

Example 8—Use of Magnetic Particles in a Displacement Assay Format

Figure 28B:
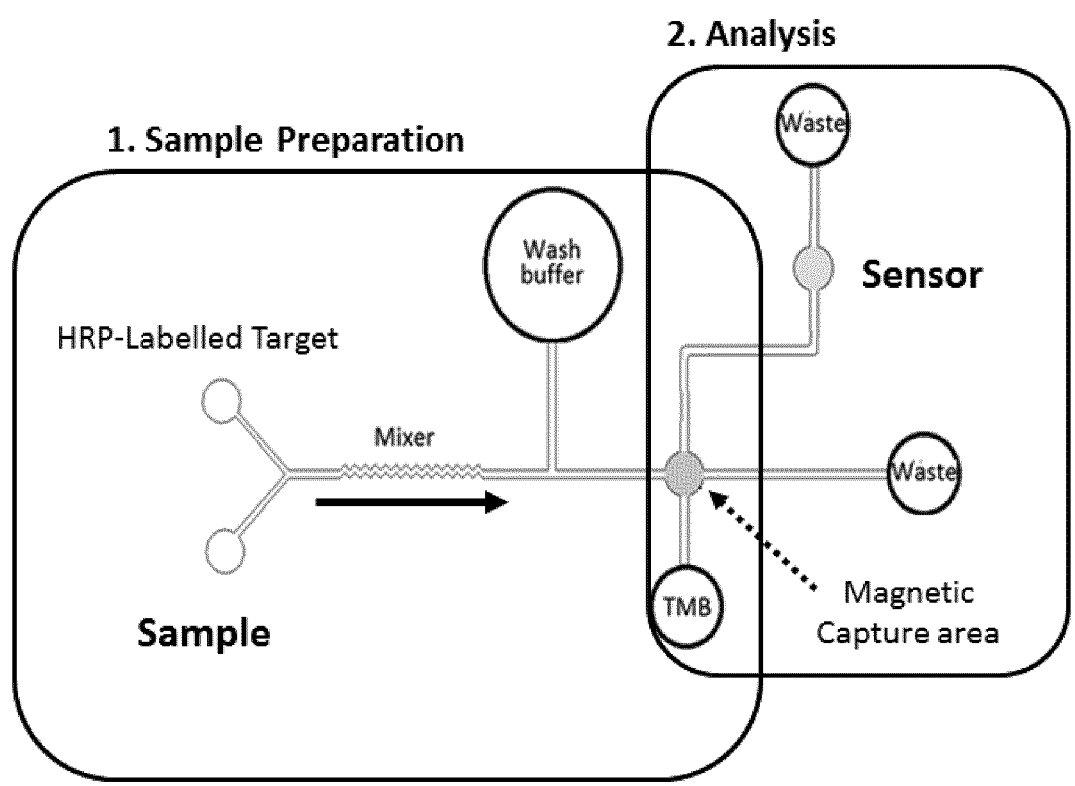

Aim: To Demonstrate the Use of Magnetic Beads in a Displacement Assay Format in Microfluidics This process is illustrated in FIG. 28B. A solution containing, 100 µl magnetic beads bound with P4 primary antibody, and P4 labelled HRP (Magnetic bead HRP-labelled target) in phosphate buffer was mixed with samples with different P4 concentrations (Sample) in buffer using the mixer region of microfluidics using a syringe pump (at 0.5 µl/min). The mixed solution was then passed across the Magnetic Captured area, to trap the beads against the wall of the fluidics. The trapped magnetic beads were then washed with buffer solution. A solution of TMB/H2O2 was passed over the beads, which was then directed over the Sensor area by changing an inline solenoid valve. The electrochemical measurement was carried out using a 2-terminal measurement at −200 mV vs stainless steel electrode. Again the measured current was proportional to the amount of bound HRP, with the exception of a delay in response due to the time taken to flow the solution from the Magnetic Capture area to the Sensor.

Example 9—Stepwise "Attachment", Removal and Replacement of Magnetic Beads

Aim

To demonstrate the stepwise attachment, removal and replacement of magnetic beads for the detection of progesterone Method Magnetic beads comprising of protein G: P4 antibody: P4-HRP complex mixed through the system depicted in FIGS. 28A-28B, and bound to the Magnetic Capture area. The beads were then washed with buffer solution, and then exposed to a solution of TMB/H2O2 which was directed over the Sensor and measured using a 2-terminal measurement at −200 mV vs stainless steel. The magnet was then removed to liberate and the beads were washed to waste by buffer solution. The process was repeated with a fresh set of beads.

Results

Figure 29:
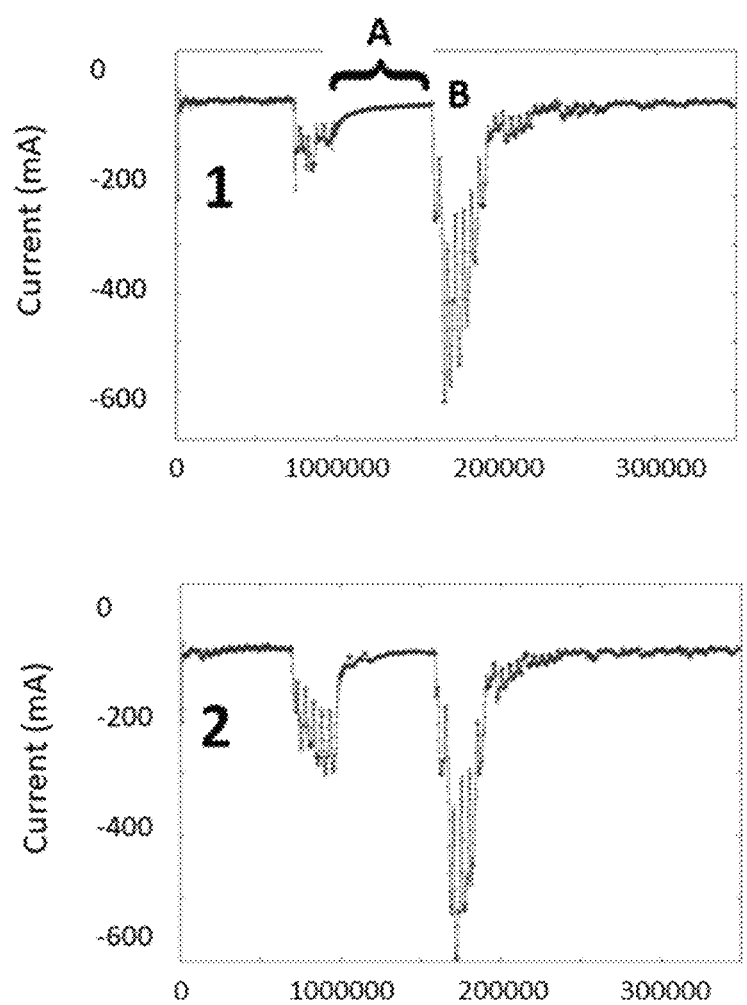
FIG. 29 shows amperometric response of sensor to beads being bound and released—Example 9.

FIG. 29 shows the 2 terminal amperometric response of the sensor to successive sets of beads (1 and 2) being bound and then released within the system. The results show the pulsing of the peristaltic pump. Region A corresponds to a 1 minute incubation time of TMB over the HRP bound beads, and region B shows the response of the sensor to the TMB after incubation. The optimal response was determined by integration of the peak under region B and showed reproducibility of >97%.

Conclusions

The results indicated the successful binding, releasing and rebinding of the beads, and that successive aliquots of beads gave very similar responses.

Example 10—Magnetic Cleaning Followed by Sensing

Aim

To demonstrate the re-configurable nature of the approach

Method

The method follow the following process:
1. Capture the beads on a first magnet as shown in FIG. 24,
2. Cleaned the beads with buffer,
3. Release the beads,
4. Capture the beads on a second magnet as shown in FIG. 23 placed directly under the sensor.

Magnetic beads comprising of protein G: P4 antibody: P4-HRP complex were mixed through the system depicted in FIG. 28, and bound to the Magnetic Capture area. The beads were washed with buffer solution to waste, and then released to be captured on a second magnetic placed under the sensor. TMB/H2O2 was directed over the Sensor and the response measured using a 2-terminal measurement at −200 mV vs stainless steel. The second magnet was removed and the beads were washed to waste by buffer solution.

Results

The responses were similar to those previously reported, and showed an excellent correlation to the optical responses as shown in FIG. 30.

Conclusions

The results indicated the successful binding, washing, releasing, recapture and measurement of the TBM responses.

REFERENCES

Blagoi, Keller, Johansson, Boisen, Dufva (2008). Functionalization of SU-8 Photoresist Surfaces with IgG Proteins. Applied Surface Science 255 (2008) 2896-2902.

Grieshaber et al. (2008). Electrochemical Biosensors—Sensor Principles and Architectures. Sensors (Basel). 8(3), 1400-1458.

Monerris et al. (2012). Integrated electrochemical immunosensor with gold nanoparticles for the determination of progesterone. Sensors and Actuators B: Chemical 166-167: 586-592.

The invention may be seen to include any of the following clauses:

1. A sensor comprising:
   a. a support substrate;
   b. at least one surface structure protruding from an upper surface of the support substrate, wherein the surface structure includes an electrode layer;
   c. a sensing surface on the electrode layer, wherein the sensing surface is adapted to contact a sample;
   d. a binding region on the support substrate, wherein the binding region is separated from the sensing surface;
   wherein, in use, a binding agent attached to a binding layer at the binding region contacts a sample containing a target analyte.

2. A sensor as in clause 1 wherein the binding layer at the binding region is a functional surface on a magnetic particle wherein the magnetic particle is attached to the support substrate by a magnetic field.

3. A sensor comprising:
   a. a support substrate, optionally with surface structure (s) formed on it;
   b. an electrode layer deposited on the support substrate and optionally the surface structure(s);
   c. a first sensing surface on a first electrode layer, and at least a second sensing surface on a second electrode layer, wherein the sensing surfaces are adapted to contact a sample;
   d. a binding region on the support substrate and optionally the electrode layer, wherein the wherein the binding region is separated from the first and second sensing surfaces;
   wherein, in use, a binding agent attached to a binding layer at the binding region contacts a sample containing a target analyte.

4. A sensor as in clause 3 wherein the binding layer comprises a binding region separated from the sensing surfaces and adjacent to the first sensing surface on a first electrode layer; and wherein the first sensing surface is adjacent to the second sensing surface on the second electrode layer; and
   wherein a first separation distance of the first sensing surface from the binding region is less than a second separation distance of the second sensing surface from the binding region; and
   wherein the first and second electrode layers are electrically isolated from one another.

5. A sensor as in any one of the preceding clauses wherein the electrode layer is deposited on an upper surface of the surface structure(s).

6. A sensor as in any one of the preceding clauses wherein binding region comprises a region of the support substrate adapted to attach one or more magnetic particles.

7. A sensor as in any one of the preceding clauses wherein the sensing surface is on an upper surface of an electrode layer on a surface structure protruding from the support substrate.

8. A sensor as in any one of the preceding clauses wherein the surface structure(s) comprises an apex at the top of the surface structure.

9. A sensor as in any one of the preceding clauses wherein the binding layer comprises a functional surface on one or more magnetic particles attached to the support substrate.

10. A sensor as in any one of the preceding clauses wherein the binding region comprises at least one magnetic element on, in, or under the support substrate.

11. A sensor as in any one of the preceding clauses wherein the binding region comprises a magnetic field adapted to attract and attach magnetic particles to the support substrate.

12. A sensor as in any one of the preceding clauses wherein the sensor comprises a measurement electrode electrically connected to one or more sensing surfaces or sensing groups via the electrode layer.

13. A sensor as in any one of the preceding clauses wherein the binding layer comprises a functional surface on a magnetic particle, wherein the binding layer is adapted to attach a binding agent.
14. A sensor as in any one of the preceding clauses wherein the sensing surface and the binding region are housed in a microfluidic system.
15. A sensor as in any one of the preceding clauses wherein the sensing surface and binding region are in separate compartments of a microfluidic system.
16. A sensor as in any one of the preceding clauses wherein the binding layer or the binding region is adjacent to a first sensing surface on a first electrode layer; and
    wherein the first sensing surface is adjacent to a second sensing surface on a second electrode layer; and
    wherein a first separation distance of the first sensing surface from the binding layer or the binding region is less than a second separation distance of the second sensing surface from the binding layer or the binding region; and
    wherein the first and second electrode layers are electrically isolated from one another.
17. A method of production of a sensor comprising:
    a. providing a support substrate with at least one surface structure protruding from an upper surface of the support substrate;
    b. depositing an electrode layer on an upper surface of the at least one surface structure;
    c. depositing an inert layer on the electrode layer such that one or more portion of the electrode layer remains exposed to form at least one sensing surface on the electrode layer, wherein the inert layer comprises a material substantially inert to the components of a sample to be analysed;
    d. forming a binding region on the support substrate wherein the binding region is adapted to attach a magnetic particle to the support substrate by positioning a magnetic element or a magnetic element positioning means on, in, or under the support substrate to facilitate the establishment of a magnetic field capable of attracting the magnetic particle;
    e. optionally attaching a magnetic particle to the binding region;
    f. optionally attaching a binding agent to a functional surface on a binding layer on the magnetic particle,
    wherein the sensing surface is separated from the binding region by a separation distance sufficient, in use, for a detectable response to be detected at the sensing surface following binding of a target analyte to the binding agent.
18. A method as in clause 17 wherein the at least one surface structure is integral with the support substrate.
19. A method as in clause 17 or 18 wherein the method of production further comprises attaching a magnetic element and/or a magnetic element positioning means to the sensor.
20. A method as in any one of clauses 17 to 19 wherein a protective coating is applied to the electrode layer.
21. A method as in any one of clauses 17 to 20 wherein the sensing surfaces are formed by deposition of a binding layer or an inert layer on the support substrate or surface structures leaving an upper portion of the surface structures free of binding layer or inert layer thus resulting in the surface of the electrode layer on the upper portion of the surface structure being exposed as the sensing surface.
22. A method as in any one of clauses 17 to 21 wherein the surface structure(s) are formed with an apex at the top of the surface structure.
23. A method as in any one of clauses 17 to 22 wherein the binding layer or inert layer is deposited adjacent to the electrode layer.
24. A method as in any one of clauses 17 to 23 wherein the inert layer is electrically conductive and is connected to at least one electrode capable of applying a potential to the inert layer.
25. A method as in any one of clauses 17 to 24 wherein the sensing surface is formed by deposition of an inert layer on the support substrate and surface structures such that a sensing surface is formed on the electrode layer on the surface structures.
26. A method as in any one of clauses 17 to 25 wherein the step of depositing a binding layer on either the electrode layer or the support substrate comprises applying a SAM binding layer.
27. A method as in any one of clauses 17 to 26 wherein the sensing surface and the binding region are formed in a microfluidic system.
28. A method as in any one of clauses 17 to 27 wherein the sensing surface and the binding region are formed in separate compartments of a microfluidic system.
29. A method of detecting binding of a target analyte in a sample to a binding agent, the method comprising:
    a. providing a sensor as defined in any one of clauses 1 to 16 or comprising:
        i. a support substrate;
        ii. at least one surface structure protruding from an upper surface of the support substrate, wherein the surface structure includes an electrode layer;
        iii. a sensing surface on the electrode layer, wherein the sensing surface is adapted to contact a sample;
        iv. a binding region on the support substrate, wherein the binding region is separated from the sensing surface and comprises a magnetic field;
    b. attaching a magnetic particle to the binding region, wherein the magnetic particle comprises at least one binding agent attached to a binding layer on the magnetic particle;
    c. contacting the binding agent with a sample containing a target analyte;
    d. allowing the target analyte to bind to the binding agent to produce a detectable response at the sensing surface;
    e. measuring a change at a measurement electrode electrically connected to the at least one sensing surface;
    wherein binding of the target analyte to the binding agent produces an electroactive species which mediates the detectable response at the sensing surface.
30. A method of determining the concentration of a target analyte in a sample, the method comprising:
    a. providing a sensor as defined in any one of clauses 1 to 16 or comprising:
        i. a support substrate comprising a binding region;
        ii. at least one surface structure protruding from an upper surface of the support substrate, wherein the surface structure includes an electrode layer;
        iii. a sensing surface on the electrode layer, wherein the sensing surface is adapted to contact a sample;
        iv. a binding region on the support substrate, wherein the binding region is separated from the sensing surface and comprises a magnetic field;

b. attaching at least one binding agent to a binding layer at the binding region;
c. contacting the sensor including the binding agent and at least one sensing surface with a sample containing the target analyte;
d. measuring a change at two or more measurement electrodes, each measurement electrode being electrically connected to an electrode layer and at least one sensing surface, the measurement electrodes being electrically isolated from each other;
e. measuring the change in a detectable response as a function of separation distance from the binding site where binding of the binding agent to the target analyte occurs;
f. comparing the change in response with the change in response from a known concentration of a target analyte from a control sample; and
g. determining the concentration of the target analyte in the sample;
wherein binding of the target analyte to the binding agent produces an electroactive species which mediates a detectable response at the sensing surface.

31. A method as in clause 29 or 30 wherein the electroactive substrate contacts a ligand labelled target analyte which results in oxidation of the electroactive substrate to yield an electroactive species which elicits a detectable response at the sensing surface by contact with the sensing surface held at a reductive potential.

32. A method as in any one of clauses 29 to 31 wherein the binding layer is on a magnetic particle attached to a binding region on the support substrate, wherein the binding region is defined by an area of magnetic field established by a magnetic element on, in or under the support substrate which, in use, attracts and attaches magnetic particles to the support substrate.

33. A method as in any one of clauses 29 to 32 wherein the sample is applied by flowing the sample across the surface of the sensor.

34. A method as in any one of clauses 29 to 33 wherein the method comprises:
a. providing a sensor as defined in any one of clauses 1 to 16 or comprising:
   i. a support substrate comprising a binding region;
   ii. at least one surface structure protruding from an upper surface of the support substrate, wherein the surface structure includes an electrode layer;
   iii. a sensing surface on the electrode layer, wherein the sensing surface is adapted to contact a sample;
   iv. a binding region on the support substrate, wherein the binding region is separated from the sensing surface and comprises a magnetic field
b. attaching at least one binding agent to a binding layer;
c. labelling the target analyte with a ligand;
d. contacting the sensor, binding agent and at least one sensing surface with a sample containing a predetermined amount of the labelled target analyte, and an unlabelled target analyte such that a competitive assay occurs;
e. applying an electroactive substrate to the sensor, such that a portion of the electroactive substrate is oxidised or reduced by the bound labelled target analyte;
f. measuring a change at a measurement electrode electrically connected to the at least one sensing surface;
wherein binding of the labelled or unlabelled target analyte to the binding agent produces an electroactive species which mediates a detectable response at the sensing surface.

35. A method as in any one of clauses 29 to 34 wherein the method further comprises regenerating a ligand catalyst by application of a reductive potential at the sensing surface.

36. A method as in any one of clauses 29 to 35 wherein the method comprises use of a sensor with two or more sensing surfaces on two or more electrode layers at increasing distance from the binding region; and
wherein the step of measuring a change comprises measuring a change at two or more measurement electrodes, each measurement electrode being electrically connected to an electrode layer and at least one sensing surface, the measurement electrodes being electrically isolated from each other; wherein the method further comprises:
measuring the change in the detectable response as a function of separation distance from the binding site;
comparing the change in the detectable response with the change in response from a known concentration of a target analyte from a control sample; and determining the concentration of the target analyte in the sample.

37. A method as in any one of clauses 29 to 36 wherein the sensing surface and the binding region are housed within a microfluidic system.

38. A method as in any one of clauses 29 to 37 wherein the sensing surface and the binding region are housed in separate compartments of a microfluidic system.

39. A method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach at least one binding agent electrostatically, covalently or magnetically;
wherein the sensing surface is separated from the binding region by a separation distance sufficient, in use, for a detectable response to be detected at the sensing surface following binding of a target analyte to the binding agent.

40. A method as in clause 39 wherein the surface structures are separated from each other by about 50 nm to about 2000 µm apex to apex, and/or the width of the surface structure where it joins the support substrate is between about 20 nm to about 5000 µm, and/or the width of the apex of each surface structure is preferably between about 1 nm to about 5000 micron.

41. A method as in clause 39 or 40 wherein the at least one surface structure is integral with the support substrate.

42. A method as in any one of clause 39 to 41 wherein a protective coating is applied to the electrode layer.

43. A method as in any one of clauses 39 to 42 wherein the sensing surfaces are formed by deposition of a binding layer or an inert layer on the support substrate or surface structures leaving an upper portion of the surface structures free of binding layer or inert layer thus resulting in the surface of the electrode layer on the upper portion of the surface structure being exposed as the sensing surface.

44. A method as in clause 43 wherein the binding layer or inert layer is deposited adjacent to the electrode layer.

45. A method as in clause 43 or 44 wherein the inert layer is electrically conductive and is connected to at least one electrode capable of applying a potential to the inert layer.

46. A method as in any one of clauses 39 to 45 wherein the step of depositing a binding layer on either the electrode layer or the support substrate comprises applying a SAM binding layer.

47. A method of increasing the accuracy of sensing a target analyte in a sample, the method including the steps of providing a sensor comprising:
   a. a support substrate;
   b. at least one surface structure protruding from an upper surface of the support substrate, wherein the surface structure includes an electrode layer;
   c. a sensing surface on the electrode layer, wherein the sensing surface is adapted to contact the sample;
   d. a binding region on the support substrate, wherein the binding region is separated from the sensing surface;
   e. contacting the binding agent with the sample containing the target analyte;
   f. allowing the target analyte to bind to the binding agent to produce a detectable response at the sensing surface;
   g. measuring a change at a measurement electrode electrically connected to the at least one sensing surface;
   wherein binding of the target analyte to the binding agent produces an electroactive species which mediates the detectable response at the sensing surface and improves the accuracy of sensing the target analyte in the sample.

48. The method according to clause 47 wherein the separation distance between the binding region and the sensing surface is between about 1 nm and about 50 mm.

49. A method of determining the concentration of a target analyte in a sample, the method comprising:
   a. providing a sensor comprising:
      i. a support substrate comprising a binding region;
      ii. at least one surface structure protruding from an upper surface of the support substrate, wherein the surface structure includes an electrode layer;
      iii. a sensing surface on the electrode layer, wherein the sensing surface is adapted to contact the sample;
      iv. a magnetic element;
      v. a binding region on the support substrate, wherein the binding region includes a binding layer and is also adapted to contact the sample and is separated from the sensing surface and comprises a magnetic field created by the magnetic element;
   b. attaching at least one binding agent to the binding layer at the binding region;
   c. contacting the sensor including the binding agent and at least one sensing surface with a sample containing the target analyte;
   d. measuring a change at two or more measurement electrodes, each measurement electrode being electrically connected to an electrode layer and at least one sensing surface, the measurement electrodes being electrically isolated from each other;
   e. measuring the change in a detectable response as a function of separation distance from the binding site where binding of the binding agent to the target analyte occurs;
   f. comparing the change in response with the change in response from a known concentration of a target analyte from a control sample; and
   g. determining the concentration of the target analyte in the sample;
   wherein binding of the target analyte to the binding agent produces an electroactive species which mediates a detectable response at the sensing surface,
   and wherein the separation distance between the binding region and the sensing surface is between about 1 nm and 50 mm, the surface structures are separated from each other by about 50 nm to about 2000 µm apex to apex, and/or the width of the surface structure where it joins the support substrate is between about 20 nm to about 5000 µm, and/or the width of the apex of each surface structure is preferably between about 1 nm to about 5000 micron.

50. A method of detecting binding of a target analyte in a sample to a binding agent, the method comprising:
   a. providing a sensor comprising:
      i. a support substrate;
      ii. at least one surface structure protruding from an upper surface of the support substrate, wherein the surface structure includes an electrode layer;
      iii. a sensing surface on the electrode layer, wherein the sensing surface is adapted to contact the sample;
      iv. a binding region on the support substrate, wherein the binding region is also adapted to contact the sample and is separated from the sensing surface and comprises a magnetic field;
   f. attaching a magnetic particle to the binding region, wherein the magnetic particle comprises at least one binding agent attached to a binding layer on the magnetic particle;
   g. contacting the binding agent and the sensing surface with a sample containing a target analyte;
   h. allowing the target analyte to bind to the binding agent to produce a detectable response at the sensing surface;
   wherein binding of the target analyte to the binding agent produces an electroactive species which mediates the detectable response at the sensing surface and measuring a change at a measurement electrode electrically connected to the at least one sensing surface;
   and wherein the separation distance between the binding region and the sensing surface is between about 1 nm and 50 mm, the surface structures are separated from each other by about 50 nm to about 2000 µm apex to apex, and/or the width of the surface structure where it joins the support substrate is between about 20 nm to about 5000 µm, and/or the width of the apex of each surface structure is preferably between about 1 nm to about 5000 micron.

51. A sensor comprising:
   a. a support substrate;
   b. at least one surface structure protruding from an upper surface of the support substrate, wherein the surface structure includes an electrode layer;

c. a sensing surface on the electrode layer, wherein the sensing surface is adapted to contact a sample containing a target analyte;
d. a binding region on the support substrate, wherein the binding region is separated from the sensing surface;
wherein, in use, a binding agent attached to a binding layer at the binding region is also adapted to contact the sample containing the target analyte.

52. A sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact a sample containing a target analyte;
d. a binding region on the support substrate, wherein the binding region is separated from the sensing surface;
wherein, in use, a binding agent attached to the binding layer at the binding region is also adapted to contact the sample containing the target analyte; and wherein the sensor is adapted to detect a detectable response at the sensing surface following binding of the target analyte to a binding agent attached to the binding layer.

53. A method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach at least one magnetic particle to the support substrate by positioning a magnetic element or a magnetic element positioning means on, in, or under the support substrate to facilitate the establishment of a magnetic field capable of attracting the magnetic particle;
e. optionally attaching a magnetic particle to the binding region;
f. optionally attaching a binding agent to a functional surface on a binding layer on the magnetic particle;
wherein the sensing surface is separated from the binding region by a separation distance sufficient, in use, for a detectable response to be detected at the sensing surface following binding of a target analyte to the binding agent.

54. A sensor as in clause 51 or 52 wherein attachment of the binding agent to the binding region is either electrostatic, covalent or via a magnetic bead to which the binding agent has been attached.

The invention may further be seen to include any of the following paragraphs:

Para. 1. A sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact a sample containing a target analyte;
d. a binding region on the support substrate, wherein the binding region is separated from the sensing surface;
wherein, in use, a binding agent attached to a binding layer at the binding region is also adapted to contact the sample containing the target analyte.

Para. 2. A sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact a sample containing a target analyte;
d. a binding region on the support substrate, wherein the binding region is separated from the sensing surface;
wherein, in use, a binding agent attached to the binding layer at the binding region is also adapted to contact the sample containing the target analyte; and wherein the sensor is adapted to detect a detectable response at the sensing surface following binding of the target analyte to a binding agent attached to the binding layer.

Para. 3. A sensor as in Para. 1 or 2 wherein attachment of the binding agent to the binding region is electrostatic, covalent or via a magnetic bead to which the binding agent has been attached.

Para. 4. A sensor as in Para. 1 or 2 wherein the sensor includes a magnetic element and the binding layer at the binding region is a functional surface on a magnetic particle wherein the magnetic particle is attached to the support substrate by a magnetic field created by the magnetic element.

Para. 5. A sensor as in any one of Paras. 1-4 wherein the separation distance between the binding region and the sensing surface is between about 1 nm and 50 mm, and/or the surface structures are separated from each other by about 50 nm to about 2000 μm, and/or the width of the surface structure where it joins the support substrate is between about 20 nm to about 5000 μm, and/or the width of the apex of each surface structure is preferably between about 1 nm to about 5000 micron.

Para. 6. A sensor as in any one of Paras. 1-5 wherein the electrode layer is deposited on an upper surface of the surface structure(s).

Para. 7. A sensor as in any one of Paras. 1-6 wherein the binding layer comprises a functional surface on one or more magnetic particles attached to the support substrate.

Para. 8. A sensor as in any one of Paras. 1-7 wherein the sensor comprises a measurement electrode electrically connected to one or more sensing surfaces or sensing groups via the electrode layer.

Para. 9. A sensor as in any one of Paras. 1-8 wherein the binding layer or the binding region is adjacent to a first sensing surface on a first electrode layer; and
wherein the first sensing surface is adjacent to a second sensing surface on a second electrode layer; and
wherein a first separation distance of the first sensing surface from the binding layer or the binding region is less than a second separation distance of the second sensing surface from the binding layer or the binding region; and wherein the first and second electrode layers are electrically isolated from one another.

Para. 10. A sensor as in any one of Paras. 1-9 wherein the support substrate is integral with the surface structure(s).

Para. 11. A sensor as in any one of Paras. 1-10 wherein the sensing surface and the binding layer are separated by an inert material or a gap.

Para. 12. A method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach at least one magnetic particle to the support substrate by positioning a magnetic element or a magnetic element positioning means on, in, or under the support substrate to facilitate the establishment of a magnetic field capable of attracting the magnetic particle;
e. optionally attaching a magnetic particle to the binding region;
f. optionally attaching a binding agent to a functional surface on a binding layer on the magnetic particle;
wherein the sensing surface is separated from the binding region by a separation distance sufficient, in use, for a detectable response to be detected at the sensing surface following binding of a target analyte to the binding agent.

Para. 13. A method as in Para. 12 wherein the separation distance between the binding region and the sensing surface is between about 1 nm and 50 mm, and/or the surface structures are separated from each other by about 50 nm to about 2000 μm apex to apex, and/or the width of the surface structure where it joins the support substrate is between about 20 nm to about 5000 μm, and/or the width of the apex of each surface structure is preferably between about 1 nm to about 5000 micron.

Para. 14. A method as in clause 12 or 13 wherein the at least one surface structure is integral with the support substrate.

Para. 15. A method as in any one of Paras. 12-14 wherein the method of production further comprises attaching a magnetic element and/or a magnetic element positioning means to the sensor.

Para. 16. A method as in any one of Paras. 12-15 wherein a protective coating is applied to the electrode layer.

Para. 17. A method as in any one of Paras. 12-16 wherein the sensing surfaces are formed by deposition of a binding layer or an inert layer on the support substrate or surface structures leaving an upper portion of the surface structures free of binding layer or inert layer thus resulting in the surface of the electrode layer on the upper portion of the surface structure being exposed as the sensing surface.

Para. 18. A method as in Para. 17 wherein the binding layer or inert layer is deposited adjacent to the electrode layer.

Para. 19. A method as in any one of Paras. 17-18 wherein the inert layer is electrically conductive and is connected to at least one electrode capable of applying a potential to the inert layer.

Para. 20. A method as in any one of Paras. 17-19 wherein the step of depositing a binding layer on either the electrode layer or the support substrate comprises applying a SAM binding layer.

Para. 21. A method of detecting binding of a target analyte in a sample to a binding agent, the method comprising:
a. providing a sensor comprising:
i. a support substrate;
ii. at least one surface structure protruding from an upper surface of the support substrate, wherein the surface structure includes an electrode layer;
iii. a sensing surface on the electrode layer, wherein the sensing surface is adapted to contact the sample;
iv. a binding region on the support substrate, wherein the binding region is also adapted to contact the sample and is separated from the sensing surface and comprises a magnetic field;
i. attaching a magnetic particle to the binding region, wherein the magnetic particle comprises at least one binding agent attached to a binding layer on the magnetic particle;
j. contacting the binding agent and the sensing surface with a sample containing a target analyte;
k. allowing the target analyte to bind to the binding agent to produce a detectable response at the sensing surface;
wherein binding of the target analyte to the binding agent produces an electroactive species which mediates the detectable response at the sensing surface and measuring a change at a measurement electrode electrically connected to the at least one sensing surface;
and wherein the separation distance between the binding region and the sensing surface is between about 1 nm and 50 mm, the surface structures are separated from each other by about 50 nm to about 2000 μm apex to apex, and/or the width of the surface structure where it joins the support substrate is between about 20 nm to about 5000 μm, and/or the width of the apex of each surface structure is preferably between about 1 nm to about 5000 micron.

Para. 22. A method of determining the concentration of a target analyte in a sample, the method comprising:
a. providing a sensor comprising:
i. a support substrate comprising a binding region;
ii. at least one surface structure protruding from an upper surface of the support substrate, wherein the surface structure includes an electrode layer;
iii. a sensing surface on the electrode layer, wherein the sensing surface is adapted to contact the sample;
iv. a magnetic element;
v. a binding region on the support substrate, wherein the binding region includes a binding layer and is also adapted to contact the sample and is separated from the sensing surface and comprises a magnetic field created by the magnetic element;
b. attaching at least one binding agent to the binding layer at the binding region;
c. contacting the sensor including the binding agent and at least one sensing surface with a sample containing the target analyte;

d. measuring a change at two or more measurement electrodes, each measurement electrode being electrically connected to an electrode layer and at least one sensing surface, the measurement electrodes being electrically isolated from each other;

e. measuring the change in a detectable response as a function of separation distance from the binding site where binding of the binding agent to the target analyte occurs;

f. comparing the change in response with the change in response from a known concentration of a target analyte from a control sample; and g. determining the concentration of the target analyte in the sample;

wherein binding of the target analyte to the binding agent produces an electroactive species which mediates a detectable response at the sensing surface, and wherein the separation distance between the binding region and the sensing surface is between about 1 nm and 50 mm, the surface structures are separated from each other by about 50 nm to about 2000 μm apex to apex, and/or the width of the surface structure where it joins the support substrate is between about 20 nm to about 5000 μm, and/or the width of the apex of each surface structure is preferably between about 1 nm to about 5000 micron.

Para. 23. A method of detecting binding of a target analyte in a sample to a binding agent, the method comprising:
a. providing a sensor as defined in any one of Paras. 1 to 11;
b. labelling the target analyte in the sample with a ligand;
c. contacting the sensor with the sample containing a pre-determined amount of the labelled target analyte, and an unlabelled target analyte;
d. applying an electroactive substrate to the sensor, such that a portion of the electroactive substrate is oxidised or reduced by the bound labelled target analyte;
wherein binding of the labelled or unlabelled target analyte to the binding agent produces an electroactive species which mediates a detectable response at the sensing surface and measuring a change at a measurement electrode electrically connected to at least one sensing surface.

Para. 24. The method of Para. 23 wherein the electroactive substrate is TMB.

Para. 25. A method as in Paras. 23 or 24 wherein the electroactive substrate contacts a ligand labelled target analyte which results in oxidation of the electroactive substrate to yield an electroactive species which elicits a detectable response at the sensing surface by contact with the sensing surface held at a reductive potential.

Para. 26. A method as in any one of Paras. 22 to 25 wherein the binding layer is on a magnetic particle attached to a binding region on the support substrate, wherein the binding region is defined by an area of magnetic field established by a magnetic element on, in or under the support substrate which, in use, attracts and attaches magnetic particles to the support substrate.

Para. 27. A method as in any one of Paras. 22 to 26 wherein the sample is applied by flowing the sample across the surface of the sensor in a microfluidic environment.

Para. 28. A method of detecting a target analyte in a sample wherein the method comprises:
a. providing a sensor comprising:
  i. a support substrate comprising a binding region;
  ii. at least one surface structure protruding from an upper surface of the support substrate, wherein the surface structure includes an electrode layer;
  iii. a sensing surface on the electrode layer, wherein the sensing surface is adapted to contact a sample;
  iv. a binding region on the support substrate, wherein the binding region is separated from the sensing surface and comprises a magnetic field
b. attaching at least one binding agent to a binding layer;
c. labelling the target analyte with a ligand;
d. contacting the sensor, binding agent and at least one sensing surface with a sample containing a pre-determined amount of the labelled target analyte, and an unlabelled target analyte such that a competitive assay occurs;
e. applying an electroactive substrate, for example TMB in the presence of H2O2, to the sensor, such that a portion of the electroactive substrate is oxidised or reduced by the bound labelled target analyte;
wherein binding of the labelled or unlabelled target analyte to the binding agent produces an electroactive species which mediates a detectable response at the sensing surface and measuring a change at a measurement electrode electrically connected to the at least one sensing surface.

Para. 29. A method as in any one of Paras. 20 to 28 wherein the method comprises use of a sensor with two or more sensing surfaces on two or more electrode layers at increasing distance from the binding region.

Para. 30. A method according to Para. 29 wherein the step of measuring a change comprises measuring a change at two or more measurement electrodes, each measurement electrode being electrically connected to an electrode layer and at least one sensing surface, the measurement electrodes being electrically isolated from each other; wherein the method further comprises:
measuring the change in the detectable response as a function of separation distance from the binding site;
comparing the change in the detectable response with the change in response from a known concentration of a target analyte from a control sample; and
determining the concentration of the target analyte in the sample.

Para. 31. A method of production of a sensor comprising:
a. providing a support substrate with at least one surface structure protruding from an upper surface of the support substrate;
b. depositing an electrode layer on an upper surface of the at least one surface structure;
c. depositing an inert layer on the electrode layer such that one or more portion of the electrode layer remains exposed to form at least one sensing surface on the electrode layer, wherein the inert layer comprises a material substantially inert to the components of a sample to be analysed;
d. forming a binding region on the support substrate wherein the binding region is adapted to attach at least one binding agent electrostatically, covalently or magnetically;
wherein the sensing surface is separated from the binding region by a separation distance sufficient, in use, for a detectable response to be detected at the sensing surface following binding of a target analyte to the binding agent.

Para. 32. A method as in Para. 31 wherein the surface structures are separated from each other by about 50 nm to about 2000 µm apex to apex, and/or the width of the surface structure where it joins the support substrate is between about 20 nm to about 5000 µm, and/or the width of the apex of each surface structure is preferably between about 1 nm to about 5000 micron.

Para. 33. A method as in Para. 31 or 32 wherein the at least one surface structure is integral with the support substrate.

Para. 34. A method as in any one of Paras. 31 to 33 wherein a protective coating is applied to the electrode layer.

Para. 35. A method as in any one of Paras. 31 to 34 wherein the sensing surfaces are formed by deposition of a binding layer or an inert layer on the support substrate or surface structures leaving an upper portion of the surface structures free of binding layer or inert layer thus resulting in the surface of the electrode layer on the upper portion of the surface structure being exposed as the sensing surface.

Para. 36. A method as in Para. 35 wherein the binding layer or inert layer is deposited adjacent to the electrode layer.

Para. 37. A method as Para. 35 or 36 wherein the inert layer is electrically conductive and is connected to at least one electrode capable of applying a potential to the inert layer.

Para. 38. A method as in any one of Paras. 35 to 37 wherein the step of depositing a binding layer on either the electrode layer or the support substrate comprises applying a SAM binding layer.

Para. 39. A method of increasing the accuracy of sensing a target analyte in a sample, the method including the steps of providing a sensor comprising:
a. a support substrate;
b. at least one surface structure protruding from an upper surface of the support substrate, wherein the surface structure includes an electrode layer;
c. a sensing surface on the electrode layer, wherein the sensing surface is adapted to contact the sample;
d. a binding region on the support substrate, wherein the binding region is separated from the sensing surface;
e. contacting the binding agent with the sample containing the target analyte;
f. allowing the target analyte to bind to the binding agent to produce a detectable response at the sensing surface;
g. measuring a change at a measurement electrode electrically connected to the at least one sensing surface;
wherein binding of the target analyte to the binding agent produces an electroactive species which mediates the detectable response at the sensing surface and improves the accuracy of sensing the target analyte in the sample.

Para. 40. The method according to Para. 39 wherein the separation distance between the binding region and the sensing surface is between about 1 nm and about 50 mm.

The invention claimed is:

1. A microfluidic or fluidic sensing system comprising:
a support substrate;
at least one surface structure protruding from an upper surface of the support substrate, the at least one surface structure including an electrode layer;
a sensing surface on the electrode layer, the sensing surface configured to detect an electroactive species;
a first channel originating at a sample inlet and terminating at a first inlet of a chamber configured to capture magnetic particles;
a second channel extending from a first outlet of the chamber to the sensing surface, the first outlet being physically separated from the first inlet;
a third channel originating at a second outlet of the chamber and terminating at a waste section, the second outlet being physically separated from the first outlet and being physically separated from the first inlet, and the third channel being separated from the second channel along the entire lengths of the second and third channels; and
a fourth channel originating at an electroactive substrate inlet and terminating at a second inlet of the chamber, the fourth channel configured to transport an electroactive substrate to the chamber, the second inlet being physically separated from the first inlet, being physically separated from the first outlet, and being physically separated from the second outlet, and the fourth channel being separated from the first, second, and third channels along the entire lengths of the first, second, and third channels;
wherein the electroactive species is configured to be generated in the chamber following exposure of the electroactive substrate to a target analyte bound to a binding agent attached to the magnetic particles, the electroactive species transported via the second channel to the sensing surface.

2. The system of claim 1, wherein the microfluidic or fluidic sensing system includes a magnetic element, wherein the magnetic particles are attached to the support substrate by a magnetic field created by the magnetic element in the chamber.

3. The system of claim 1, wherein the electrode layer is deposited on an upper surface of the at least one surface structure.

4. The system of claim 1, wherein the microfluidic or fluidic sensing system comprises a measurement electrode electrically connected to the sensing surface or to a sensing group via the electrode layer, the sensing group comprising a plurality of sensing surfaces.

5. The system of claim 1:
wherein a first sensing surface is adjacent to a second sensing surface on a second electrode layer; and
wherein a first separation distance of the first sensing surface from the chamber is less than a second separation distance of the second sensing surface from the chamber; and
wherein the first and second electrode layers are electrically isolated from one another.

6. The system of claim 1, wherein the support substrate is integral with the at least one surface structure.

7. The system of claim 1, wherein the microfluidic or fluidic sensing system comprises a buffer compartment adapted to provide buffer to wash the chamber following binding of the target analyte to the binding agent attached to the magnetic particles.

8. The system of claim 1, wherein the microfluidic or fluidic sensing system comprises a valve adapted to direct the electroactive species over or to the sensing surface.

9. The system of claim 1, wherein the microfluidic or fluidic sensing system comprises a compartment adapted to provide a ligand to label the target analyte to produce a labelled target analyte.

10. The system of claim 1, further comprising a valve configurable to allow fluid flow in the second channel or the third channel.

11. The system of claim 1, further comprising a sample preparation compartment and an analysis compartment.

12. The system of claim 11, wherein the sensing surface is positioned in the analysis compartment.

13. The system of claim 1, wherein the first channel and the chamber are part of a first stage of the microfluidic or fluidic sensing system, and the sensing surface and the second channel are part of a second stage of the microfluidic or fluidic sensing system.

14. The system of claim 13, wherein the first stage has a first flow path that is separated from a second flow path of the second stage such that the chamber is isolated from the sensing surface.

15. The system of claim 14, further comprising a valve configurable to allow the first flow path in the first stage or the separate second fluid path in the second stage.

16. The system of claim 1, wherein the sensing surface is an electroactive sensing surface.

17. The system of claim 1, comprising a valve configured to direct the electroactive species from the chamber to the sensing surface.

18. The system of claim 1, wherein the chamber is configured to trap the magnetic particles while the electroactive species is transported to the sensing surface, and the chamber is configured to release the magnetic particles to the waste section after the sensing surface has detected the electroactive species.

19. The system of claim 1, wherein the waste section is a first waste section, and wherein the second channel extends past the sensing surface and to a second waste section.

20. A microfluidic or fluidic sensing system comprising:
a support substrate;
at least one surface structure protruding from an upper surface of the support substrate, the at least one surface structure including an electrode layer;
a sensing surface on the electrode layer;
a first channel originating at a sample inlet and terminating at a first inlet of a chamber;
a second channel extending from a first outlet of the chamber to the sensing surface; and
a third channel originating at a second outlet of the chamber and terminating at a waste section, the second outlet being physically separated from the first outlet and being physically separated from the first inlet, and the third channel being separated from the second channel along the entire lengths of the second and third channels.

21. The system of claim 20, comprising a fourth channel, the fourth channel extending from an electroactive substrate inlet to a second inlet of the chamber, the second inlet being physically separated from the first inlet, being physically separated from the first outlet, and being physically separated from the second outlet, the electroactive substrate inlet separate from the sample inlet.

22. The system of claim 21, wherein the system is adapted to be connected via a microfluidic or fluidic channel in a flow environment.

23. The system of claim 20, comprising a mixer in the first channel, the mixer configured to mix a target analyte and a binding agent attached to magnetic particles.

24. The system of claim 20, comprising a magnetic particles inlet connected to the first channel.

25. The system of claim 20, wherein the sensing surface is an electroactive species sensing surface.

26. The system of claim 20, comprising two or more sensing surfaces situated progressively further from the chamber along the second channel.

27. The system of claim 20, wherein the waste section is configured to receive magnetic particles released from the chamber.

28. The system of claim 20, wherein the chamber is configured to capture magnetic particles, the magnetic particles being attached to a binding agent to bind with a target analyte.

29. The system of claim 28, configured to transport an electroactive species generated at the chamber to the sensing surface while the magnetic particles remain captured at the chamber.

30. The system of claim 28, wherein the third channel is configured to transport the magnetic particles to the waste section.

31. The system of claim 20, wherein the second channel is configured to transport an electroactive species generated at the chamber to the sensing surface.

32. The system of claim 31, wherein the electroactive species is generated in the chamber following exposure of an electroactive substrate to a target analyte bound to a binding agent attached to magnetic particles.

33. The system of claim 31, comprising a valve to allow direction of the transport of the electroactive species to the sensing surface.

34. The system of claim 31, wherein the sensing surface is configured to sense the electroactive species as the electroactive species flows over the sensing surface.

* * * * *